(12) United States Patent
Imamura

(10) Patent No.: US 8,284,496 B2
(45) Date of Patent: Oct. 9, 2012

(54) ZOOM OPTICAL SYSTEM AND ELECTRONIC PICKUP APPARATUS USING THE SAME

(75) Inventor: Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 44 days.

(21) Appl. No.: 12/932,915

(22) Filed: Mar. 8, 2011

(65) Prior Publication Data

US 2011/0222168 A1    Sep. 15, 2011

(30) Foreign Application Priority Data

Mar. 10, 2010  (JP) ................................ 2010-052477
Mar. 10, 2010  (JP) ................................ 2010-052478

(51) Int. Cl.
  *G02B 15/14*  (2006.01)
(52) U.S. Cl. ......... 359/687; 359/715; 359/740; 359/774
(58) Field of Classification Search ............... 359/687, 359/715, 740, 774
  See application file for complete search history.

(56) References Cited

U.S. PATENT DOCUMENTS 6,721,105 B2 * 4/2004 Ohtake et al. ............... 359/676
2007/0242368 A1 * 10/2007 Itoh ............................. 359/687

FOREIGN PATENT DOCUMENTS

JP  2005-181499  7/2005
JP  2007-271711  10/2007

* cited by examiner

*Primary Examiner* — Evelyn A. Lester
(74) *Attorney, Agent, or Firm* — Kenyon & Kenyon LLP

(57) ABSTRACT

A zoom optical system in which: a positive first lens group, a negative second lens group, a positive third lens group, and a positive fourth lens group are arranged in that order from the object side and magnification is changed by properly changing distances between these lens groups; the first lens group consists of only one lens element and the most object-side surface of the first lens group has a convex shape which faces toward the object side; the second lens group includes, in order from the object side, a negative single lens, a negative cemented lens, and a positive single lens; and the following condition (1) or (2) is satisfied:

$$0.2 \leq \Delta D_{w\text{-}w10}/L_t \leq 0.35 \quad (1)$$

$$SF_{G4}=(r_{G4o}+r_{G4i})/(r_{G4o}-r_{G4i})>0 \quad (2)$$

where $\Delta D_{w\text{-}w10}$ denotes the variation in the distance between the first and second lens groups in changing from the wide angle end position to the position in which the focal length is ten times or more as large as that in the wide angle end position, $L_t$ denotes the total length of the optical system in the telephoto end position, $SF_{G4}$ denotes the shape factor of the fourth lens group, $r_{G4o}$ denotes the radius of curvature of the most object-side surface of the fourth lens group, and $r_{G4i}$ denotes the radius of curvature of the most image-side surface of the fourth lens group.

23 Claims, 34 Drawing Sheets

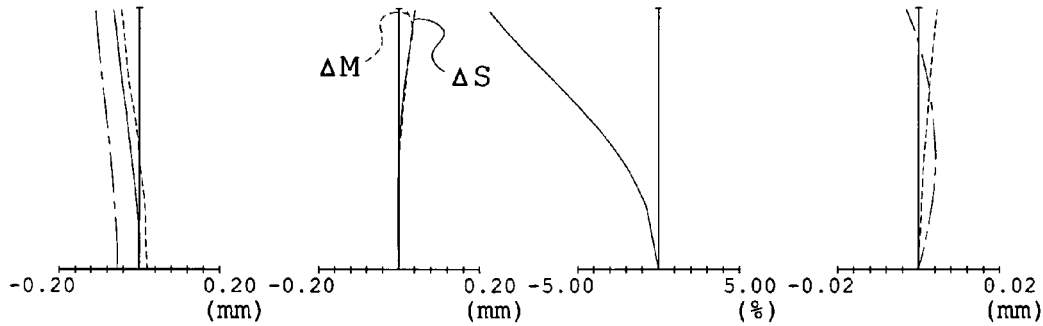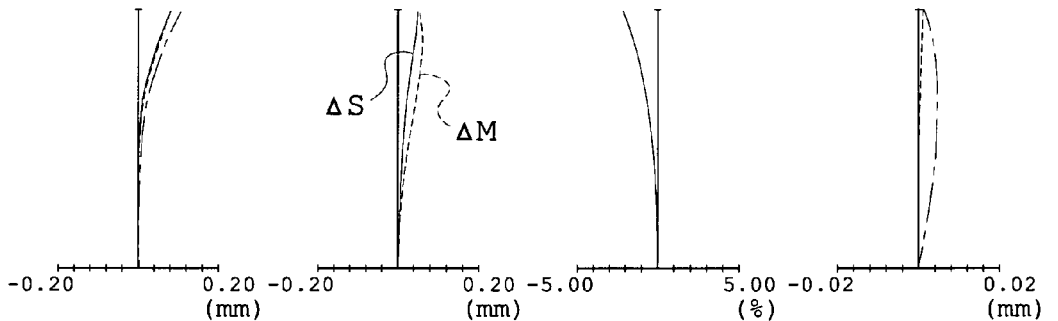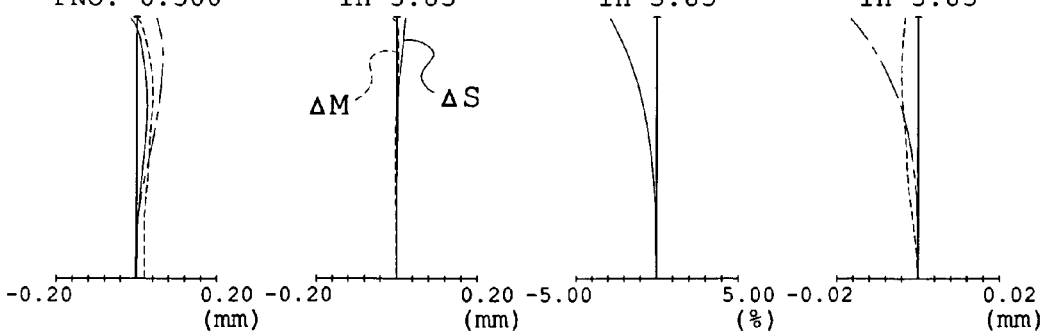

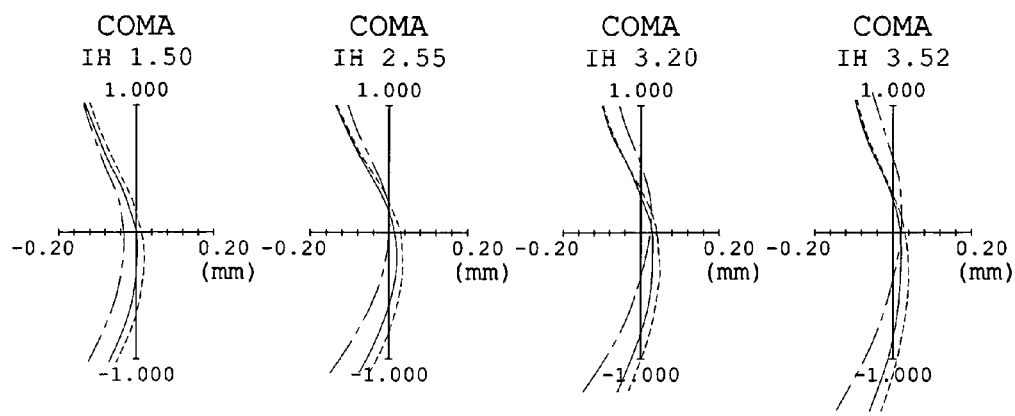
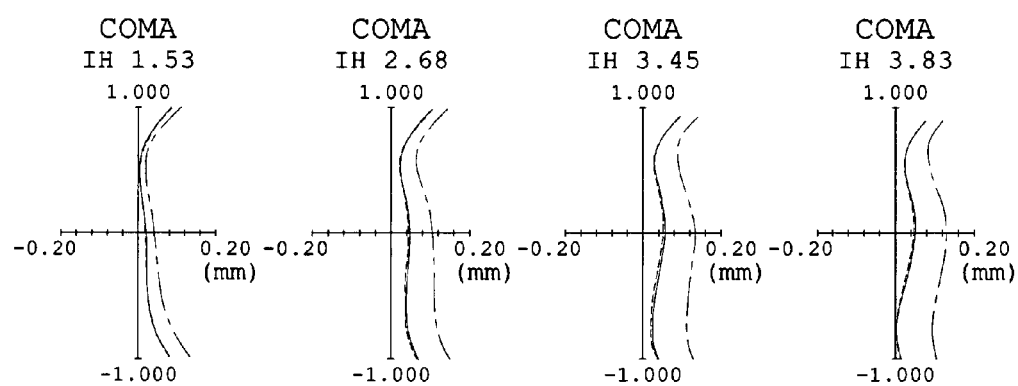
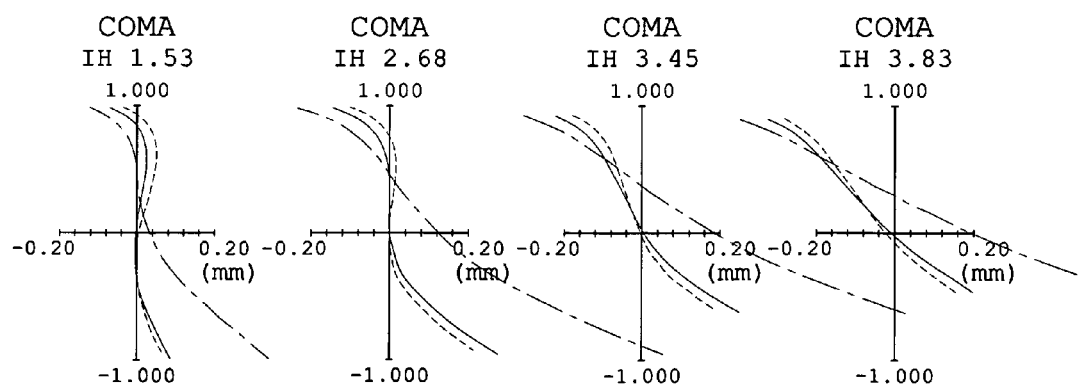

LATERAL
COMA
IH 1.50

LATERAL
COMA
IH 2.55

LATERAL
COMA
IH 3.20

LATERAL
COMA
IH 3.52

LATERAL
COMA
IH 1.53

LATERAL
COMA
IH 2.68

LATERAL
COMA
IH 3.45

LATERAL
COMA
IH 3.83

LATERAL
COMA
IH 1.53

LATERAL
COMA
IH 2.68

LATERAL
COMA
IH 3.45

LATERAL
COMA
IH 3.83

435.84 —·—
656.27 ------
587.56 ———

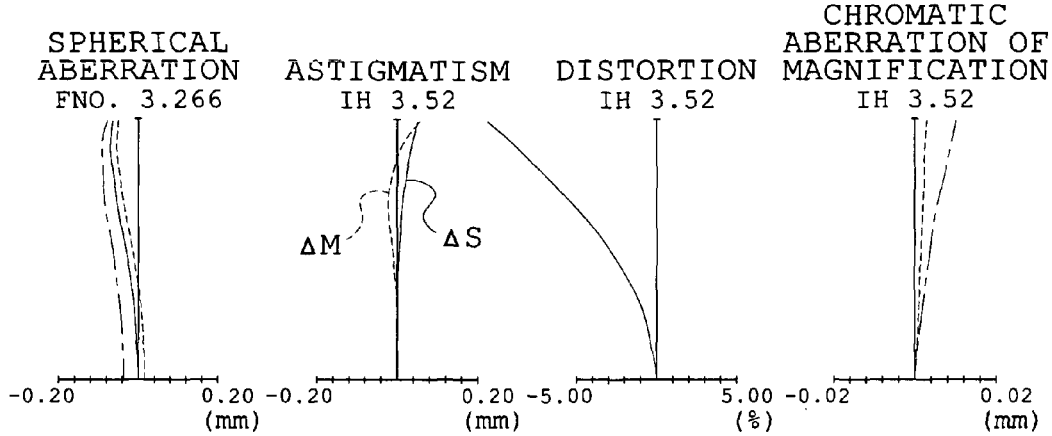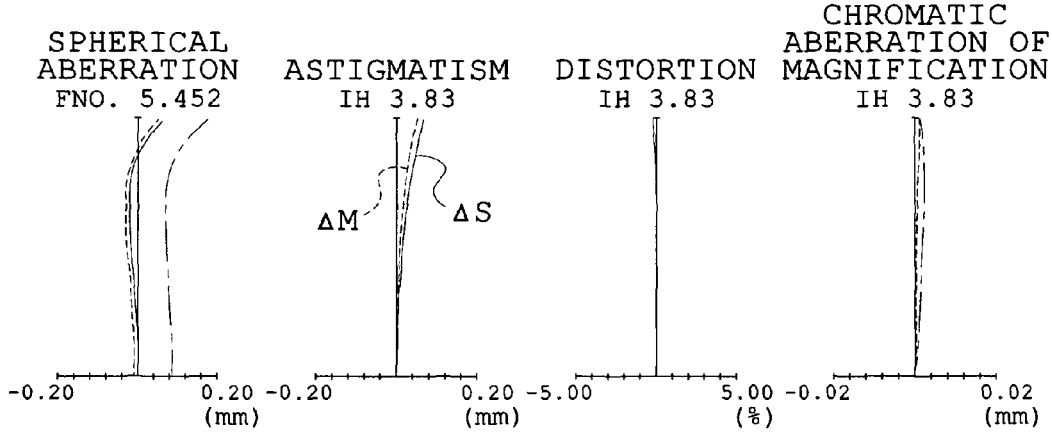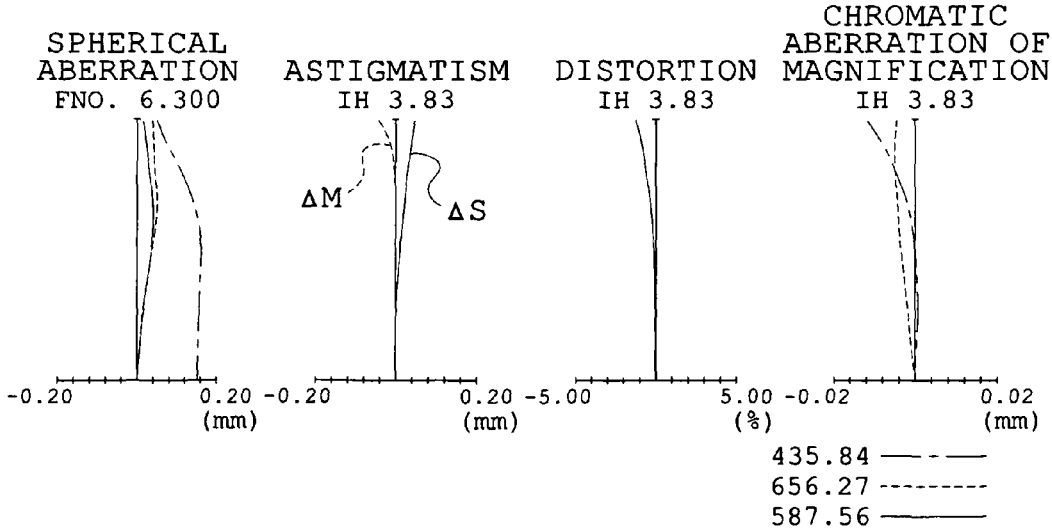

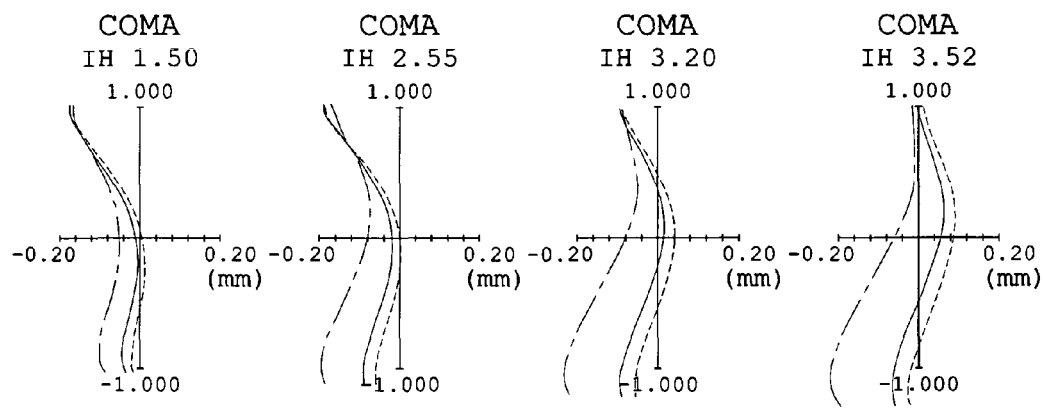
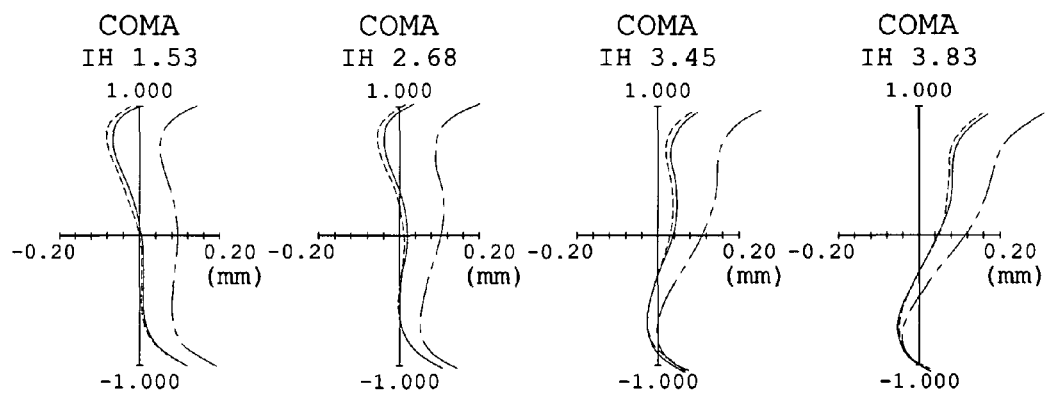
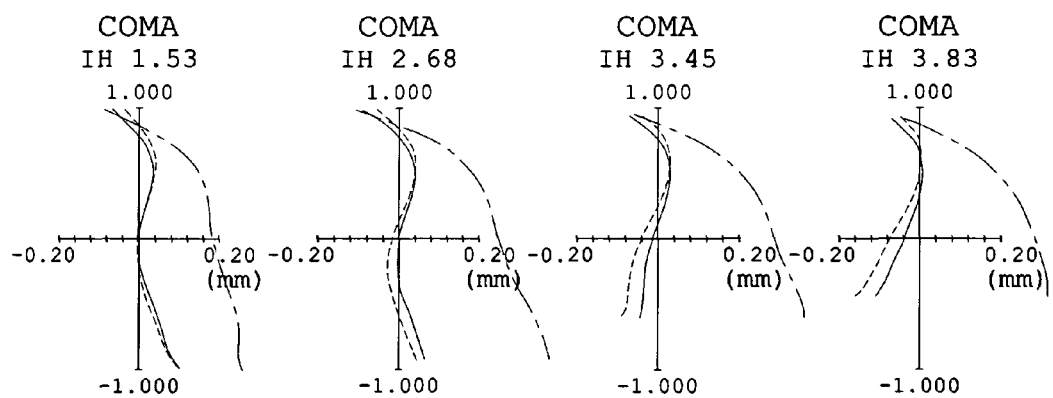

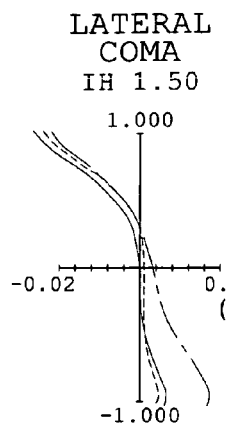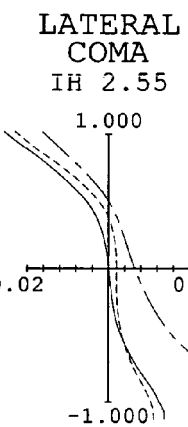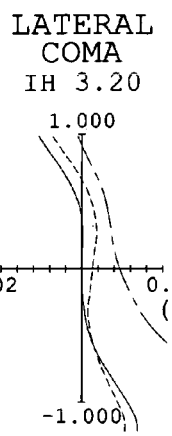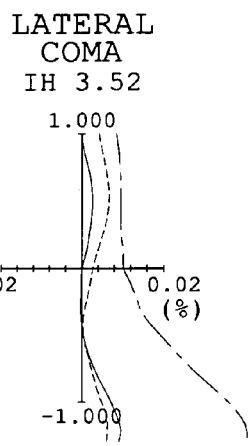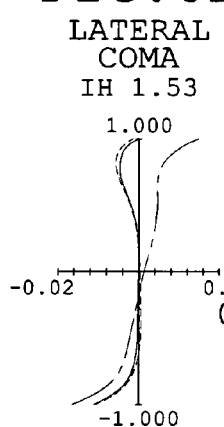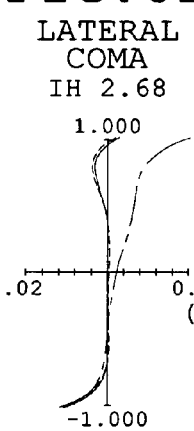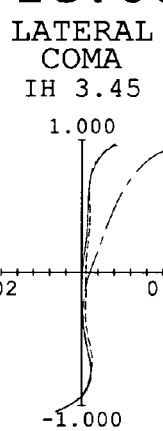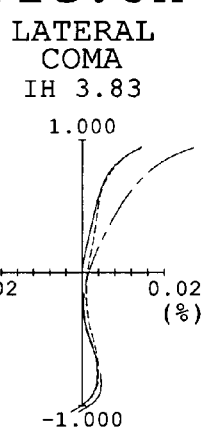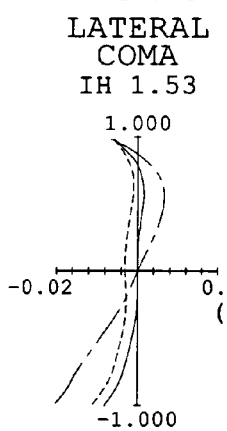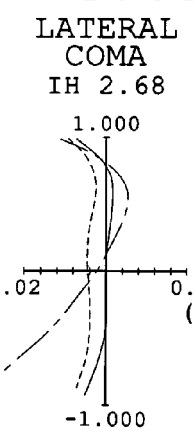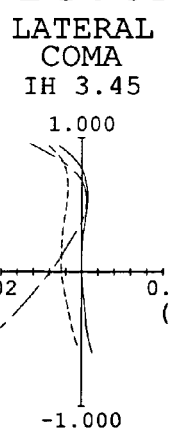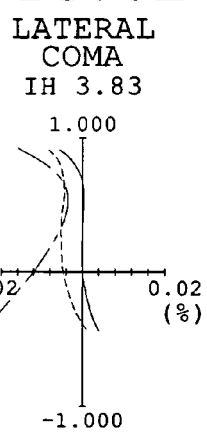
FIG.8A LATERAL COMA IH 1.50
FIG.8B LATERAL COMA IH 2.55
FIG.8C LATERAL COMA IH 3.20
FIG.8D LATERAL COMA IH 3.52
FIG.8E LATERAL COMA IH 1.53
FIG.8F LATERAL COMA IH 2.68
FIG.8G LATERAL COMA IH 3.45
FIG.8H LATERAL COMA IH 3.83
FIG.8I LATERAL COMA IH 1.53
FIG.8J LATERAL COMA IH 2.68
FIG.8K LATERAL COMA IH 3.45
FIG.8L LATERAL COMA IH 3.83
435.84 — · —
656.27 - - - - - -
587.56 ———

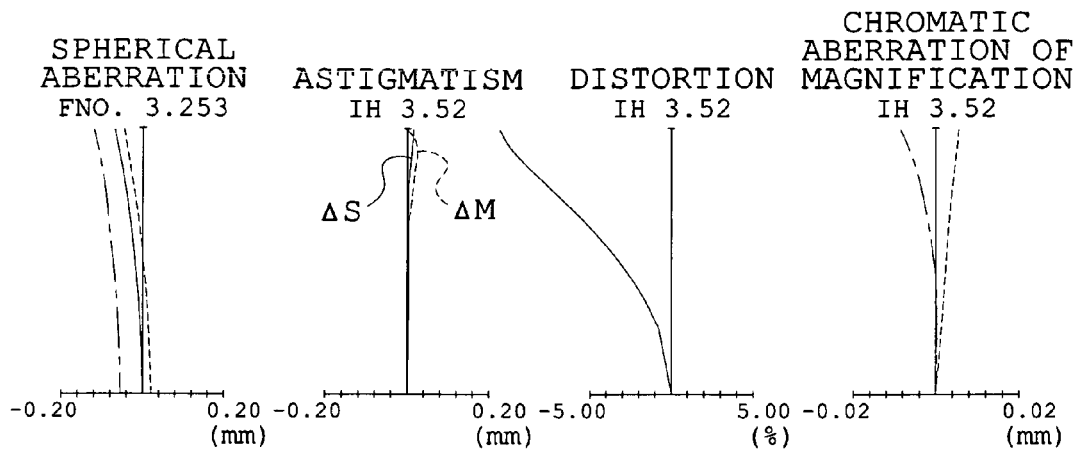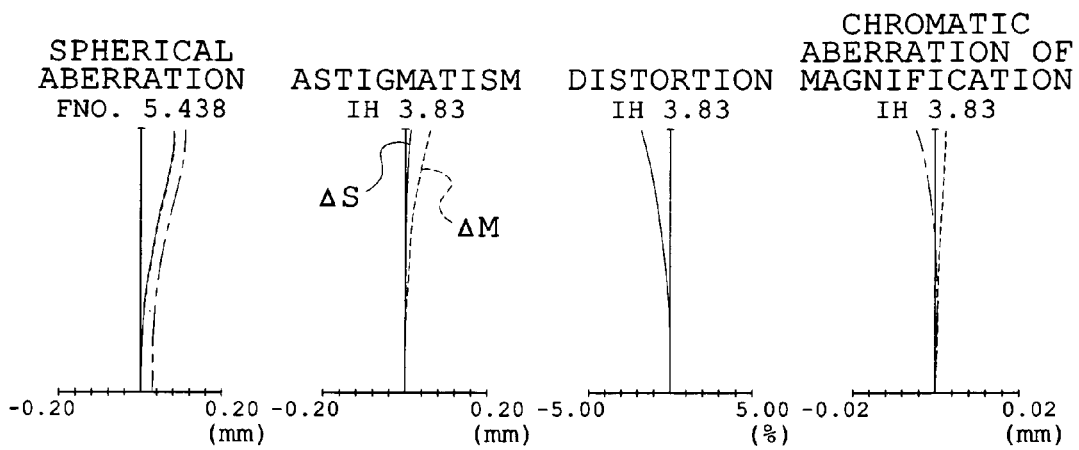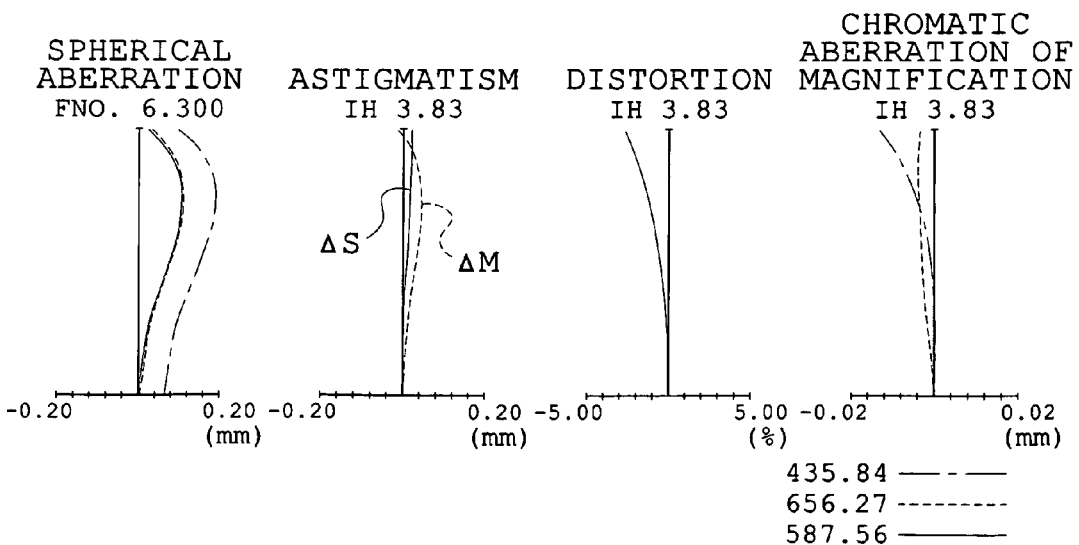

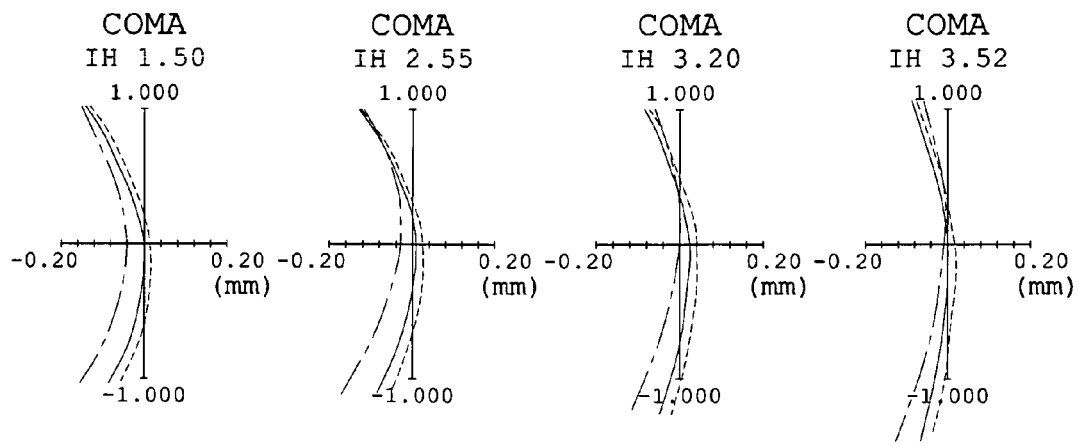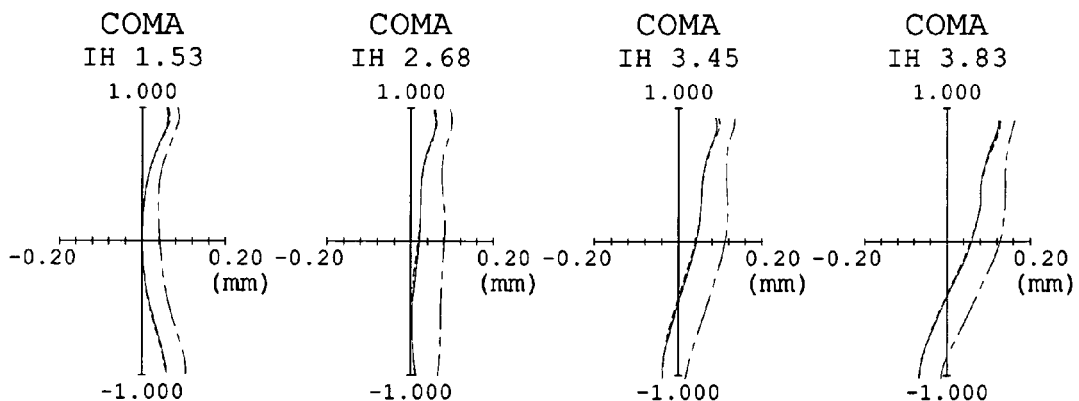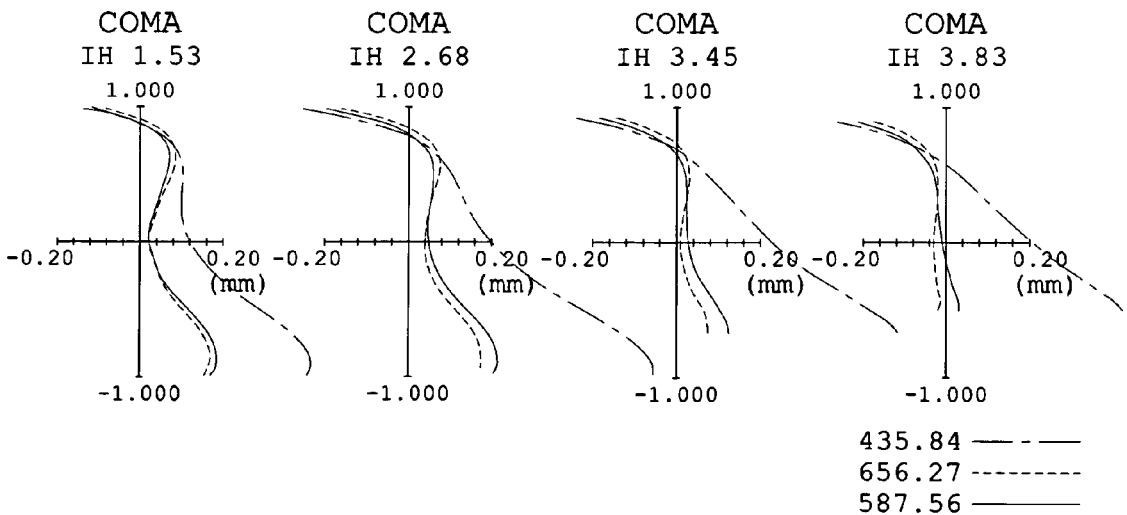

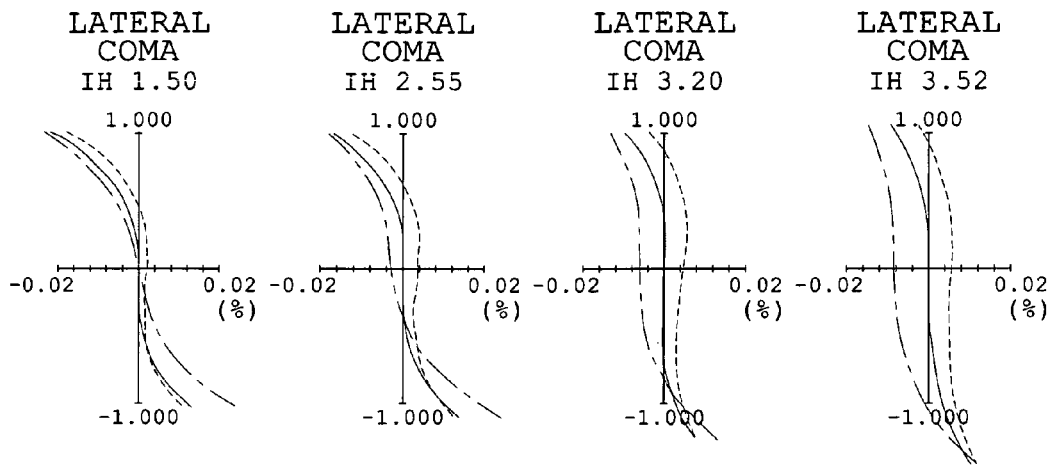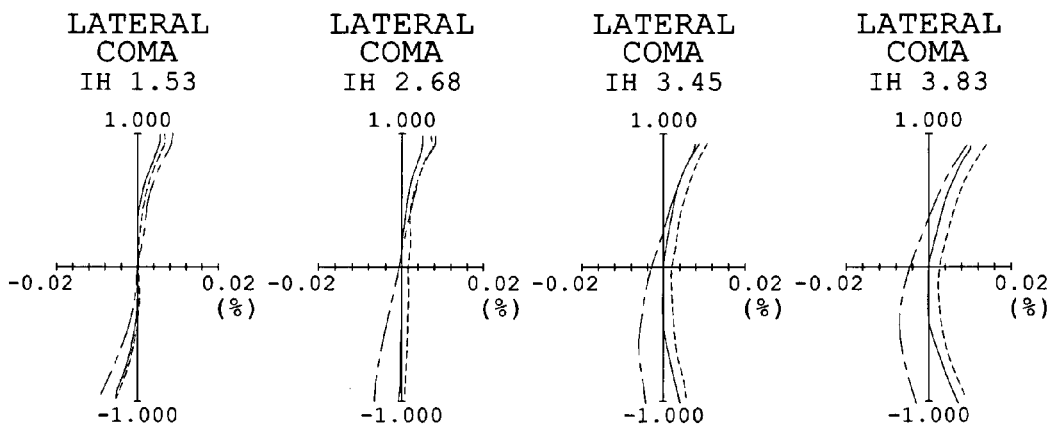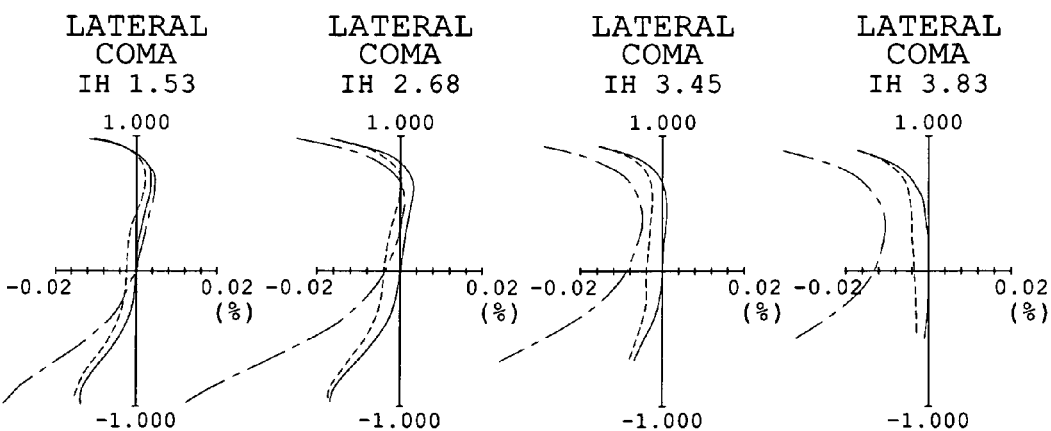

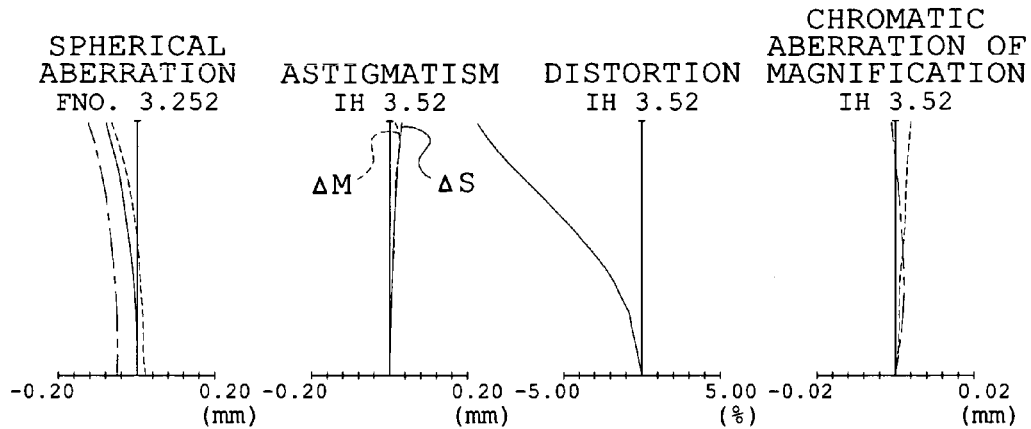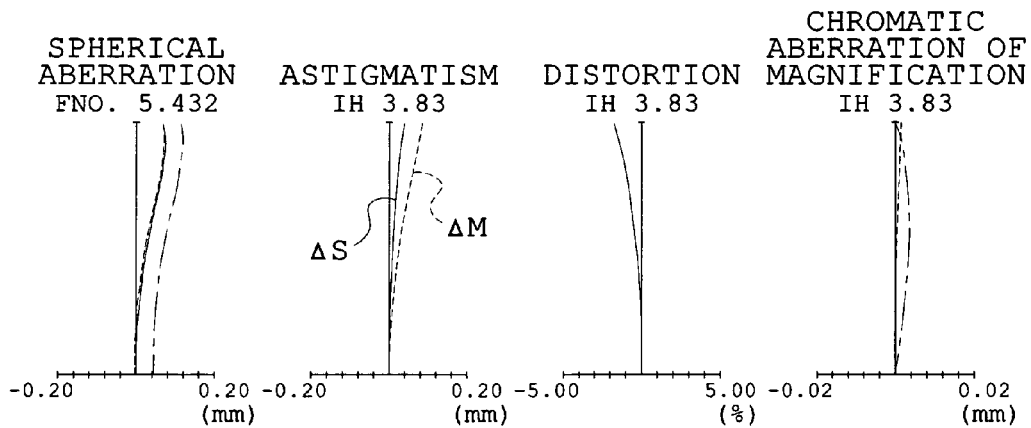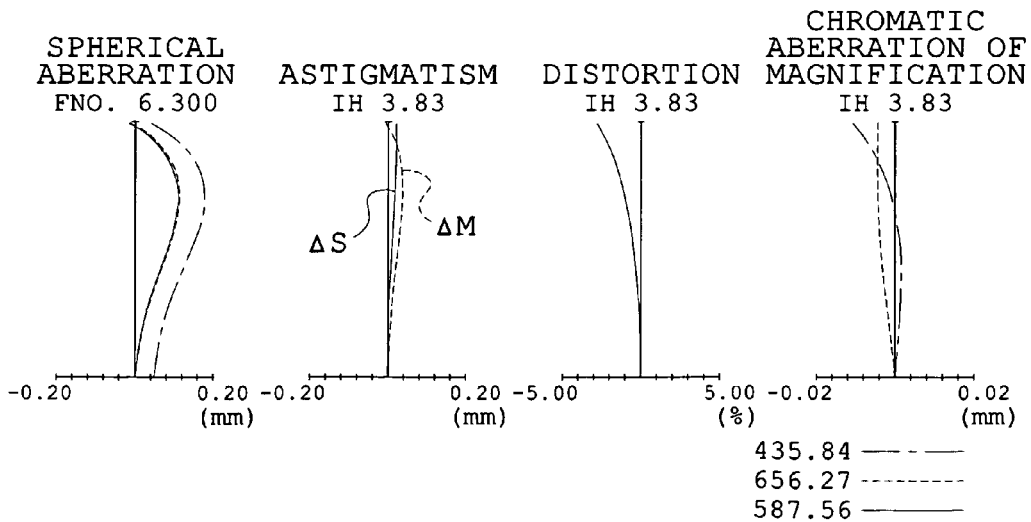

435.84 — - —
656.27 - - - - - - - -
587.56 ———

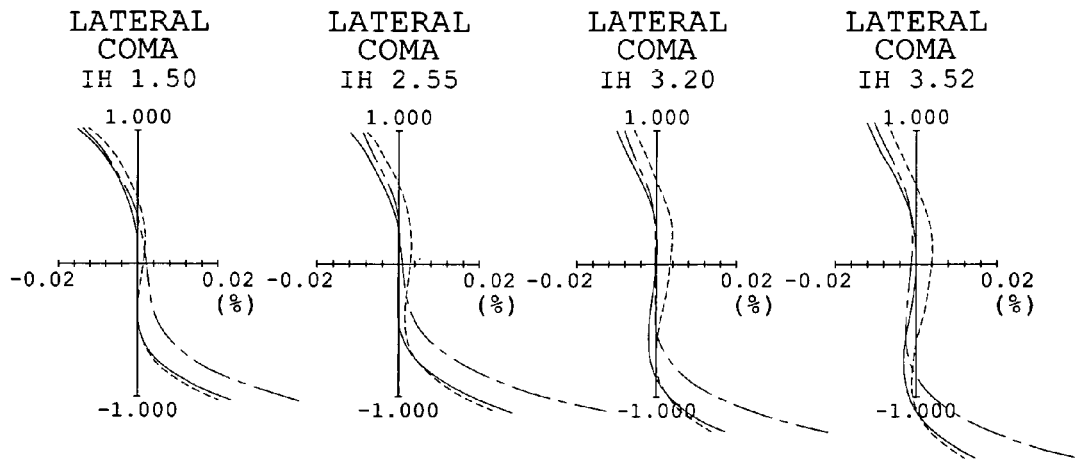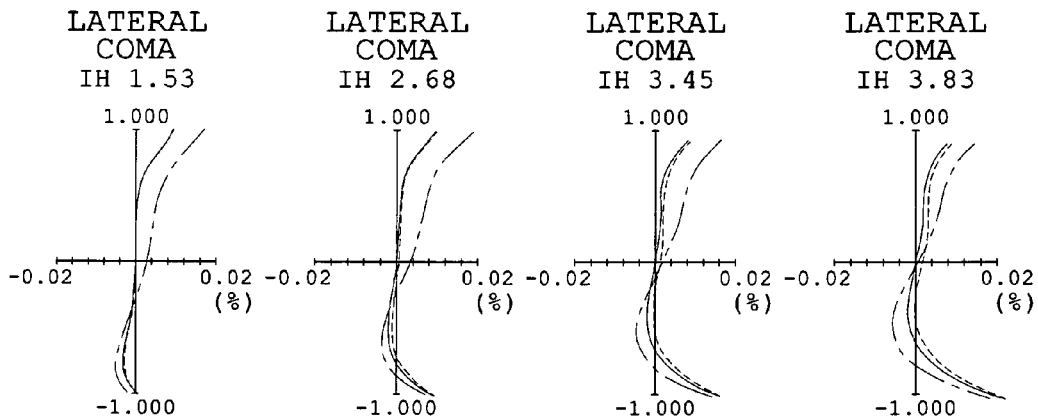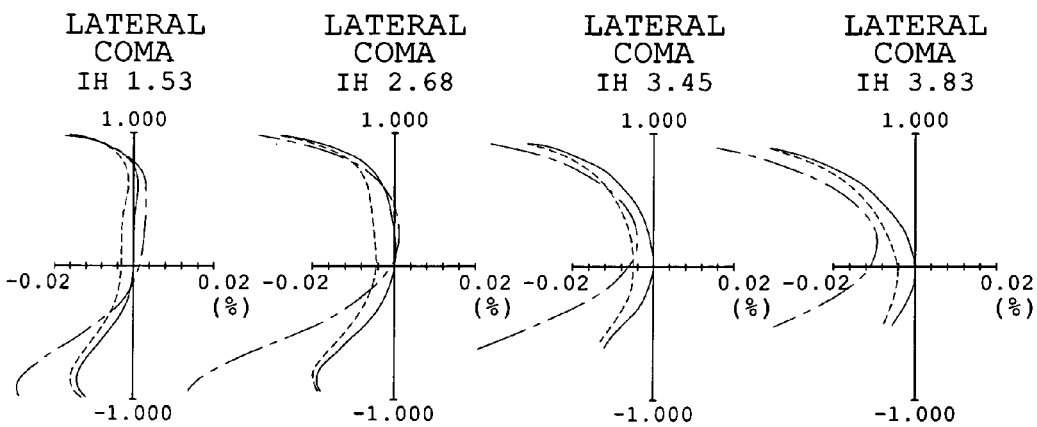

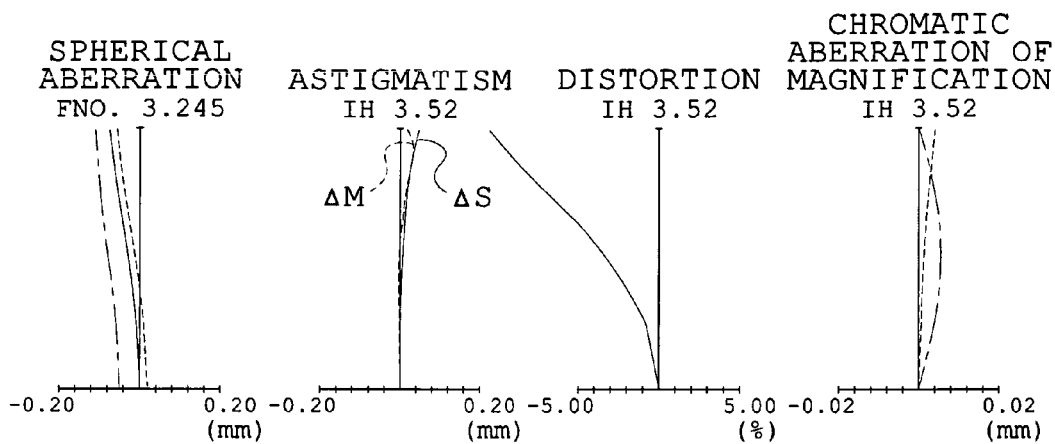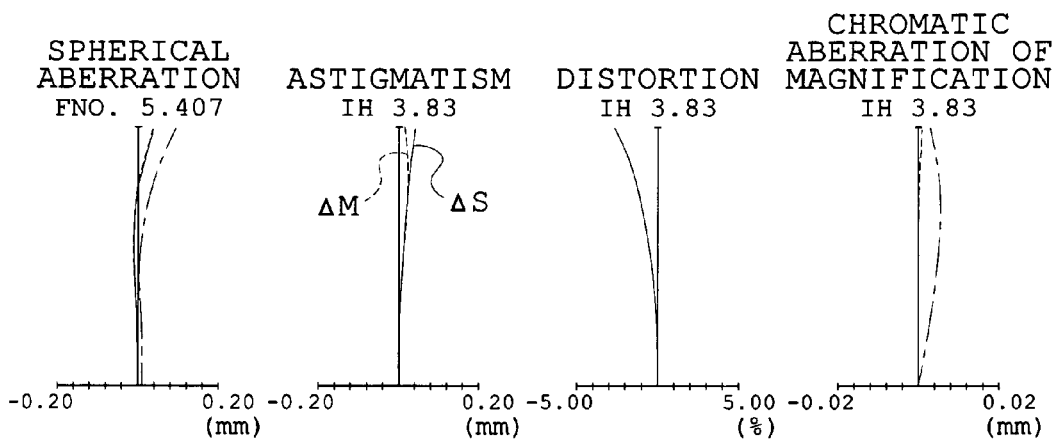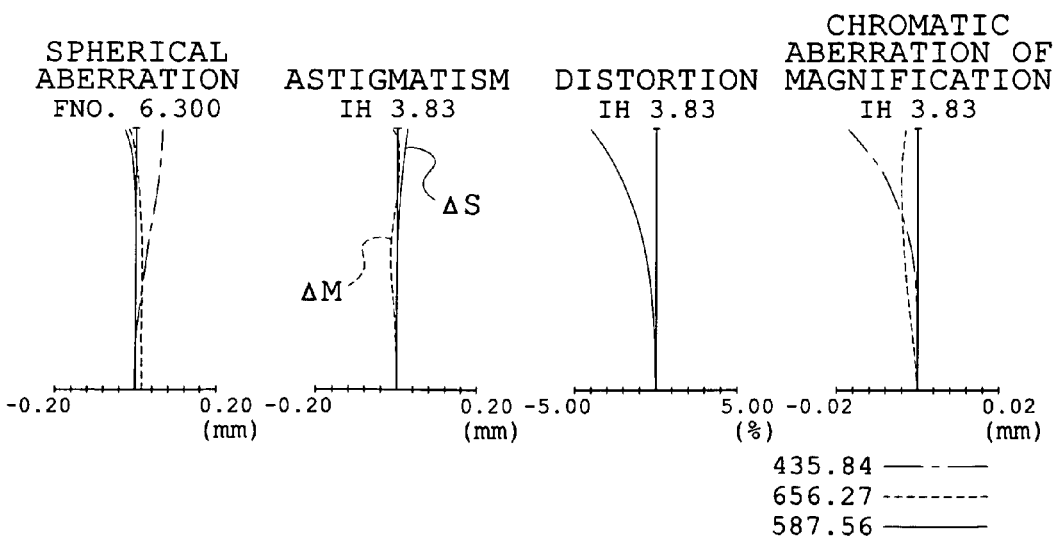

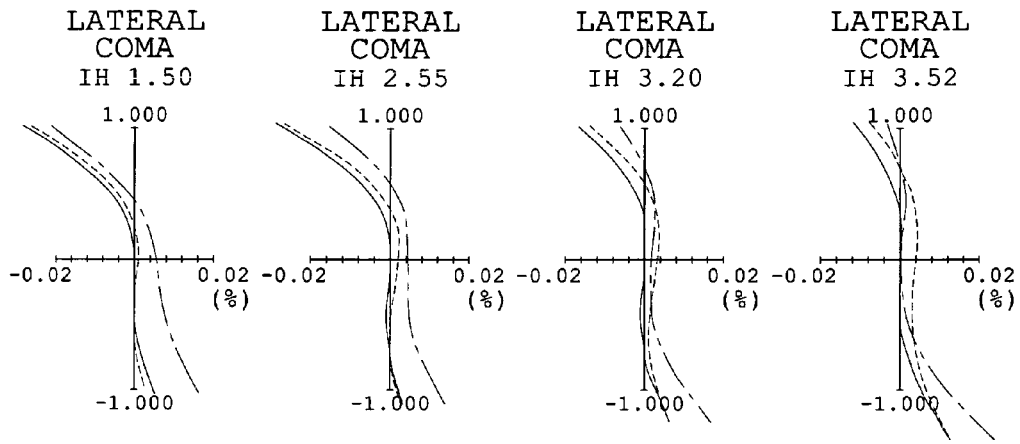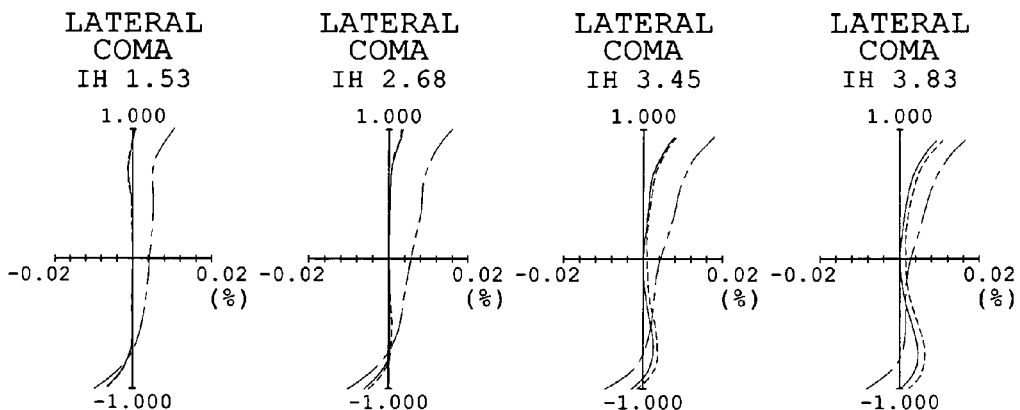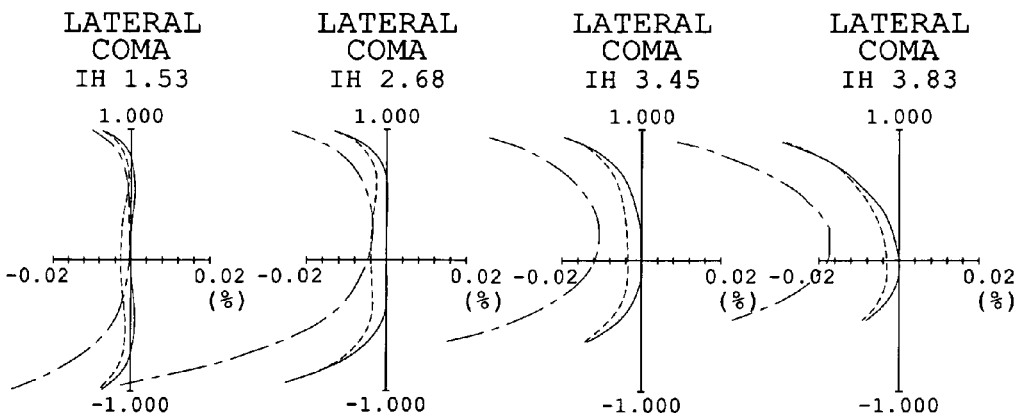

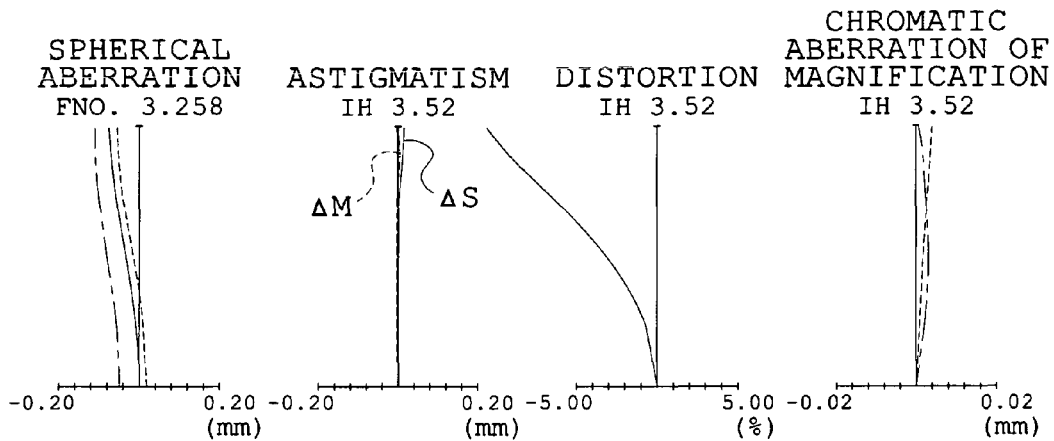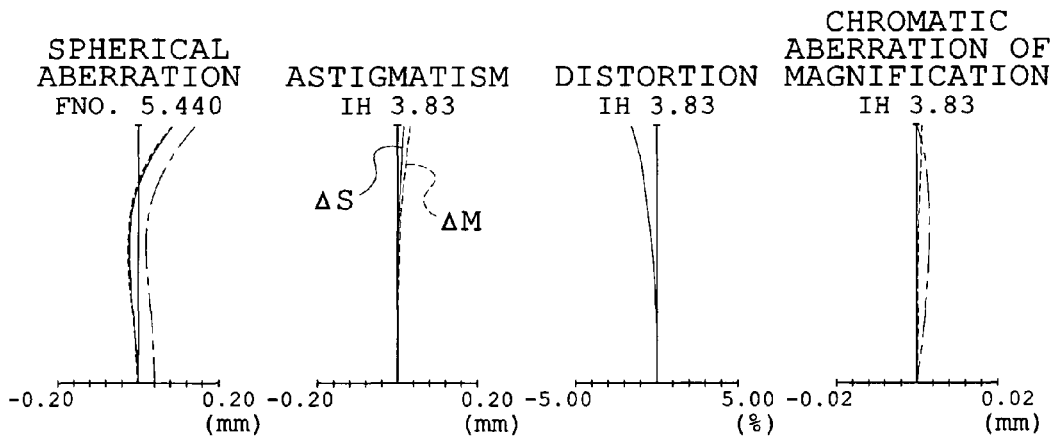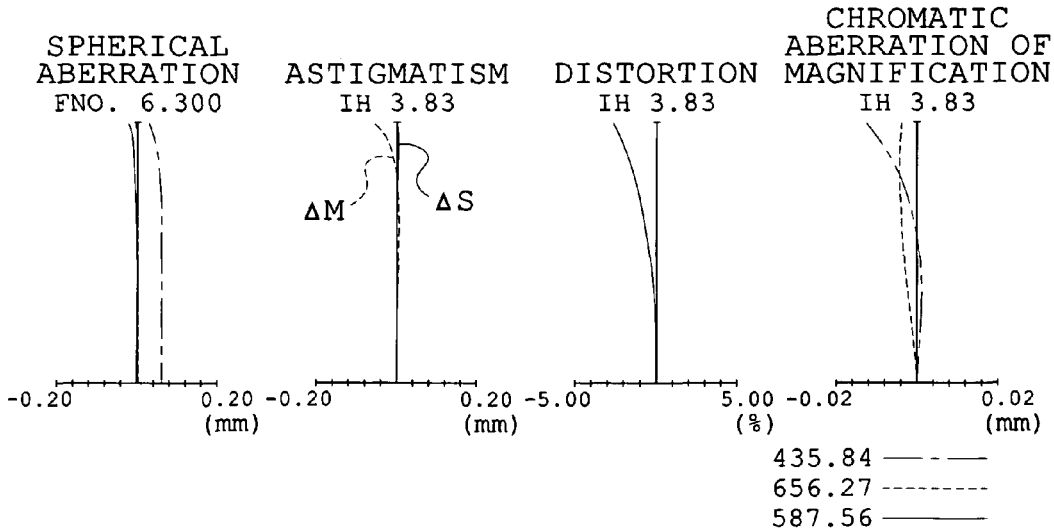

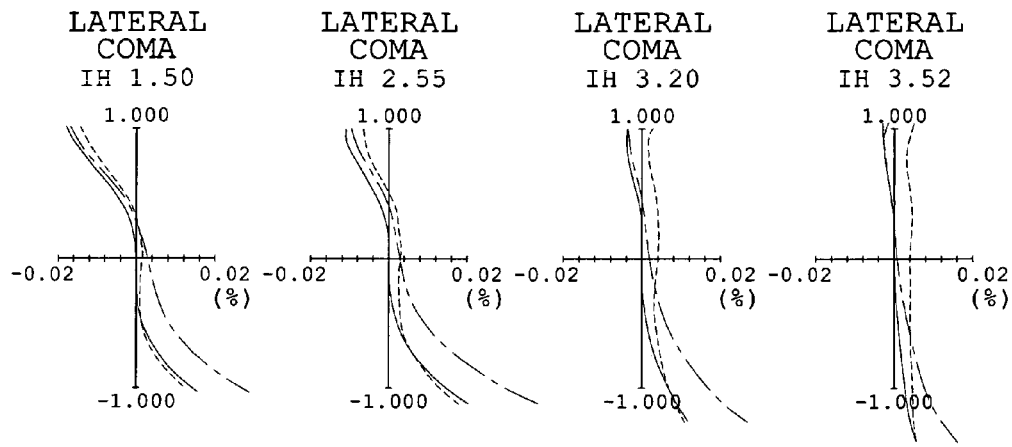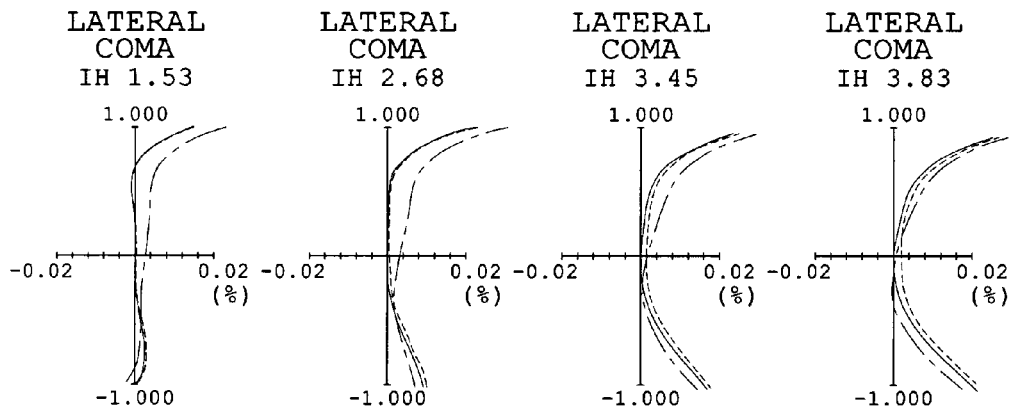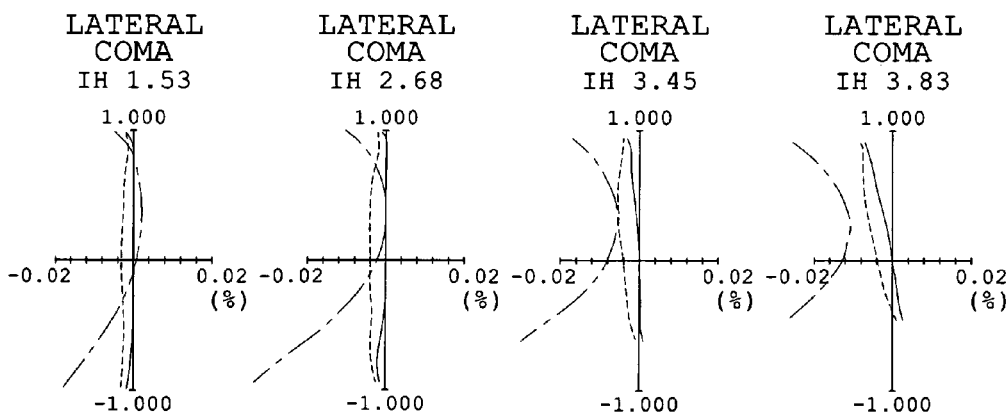

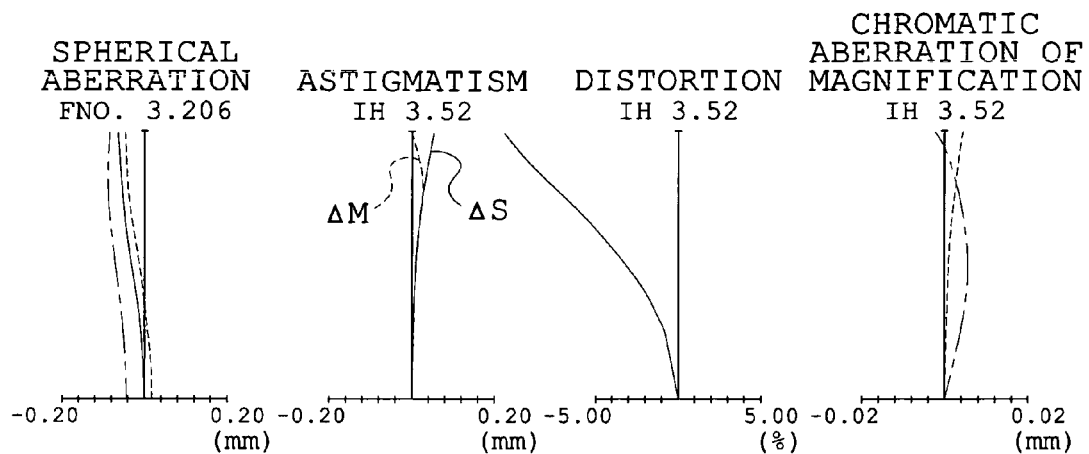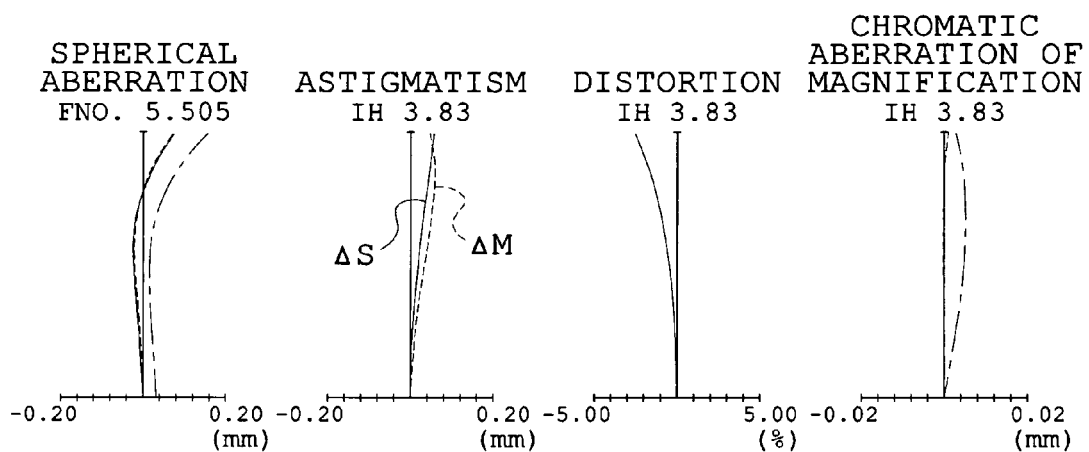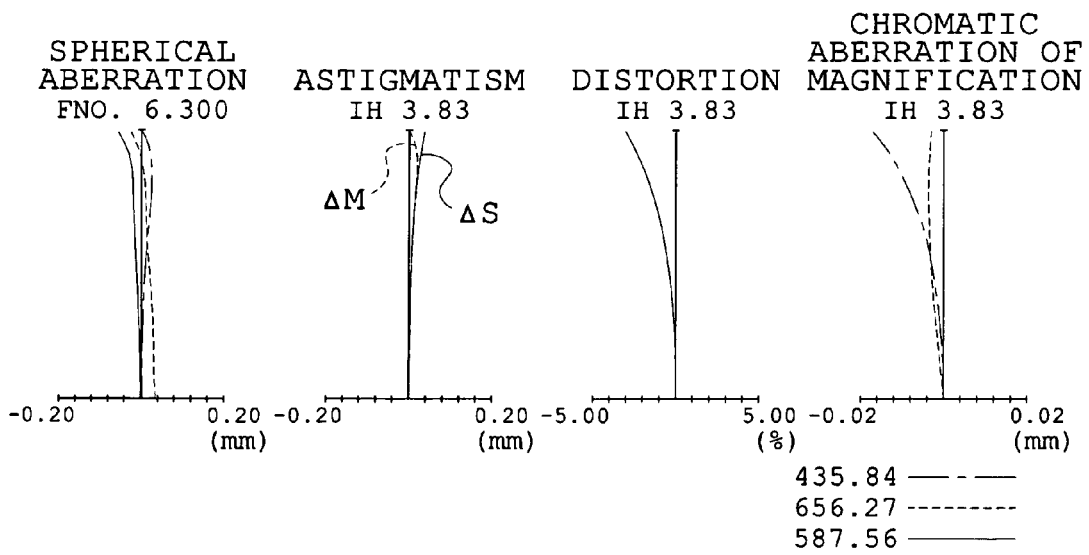

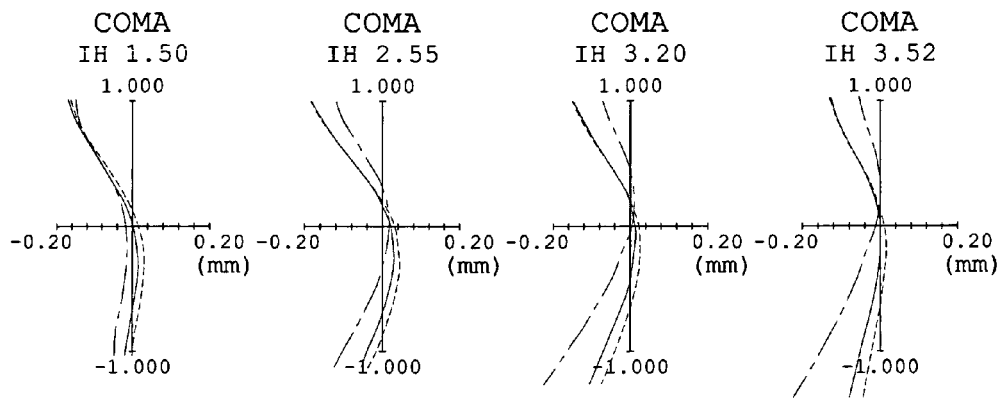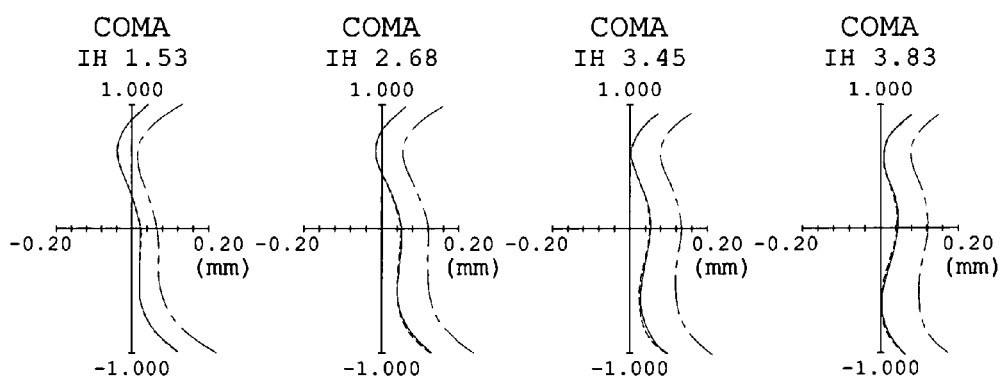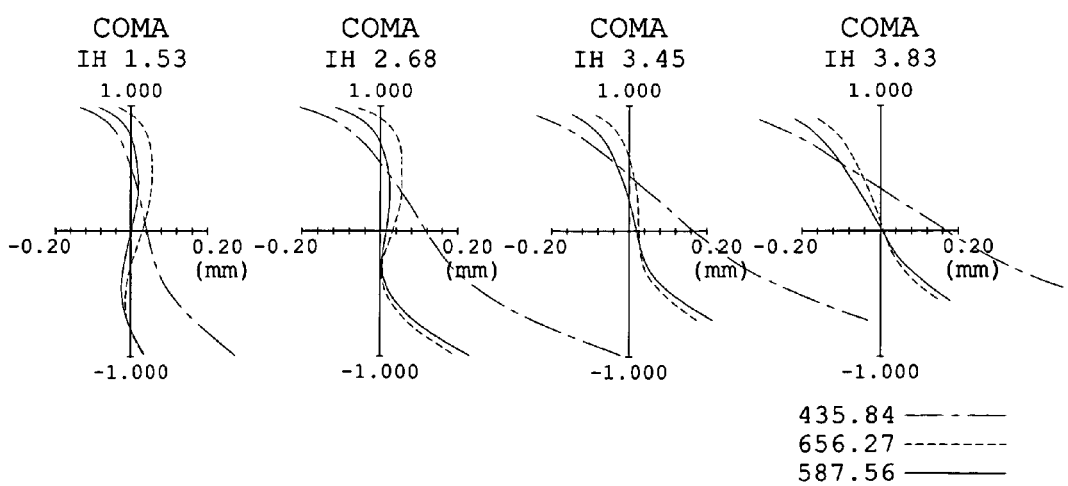

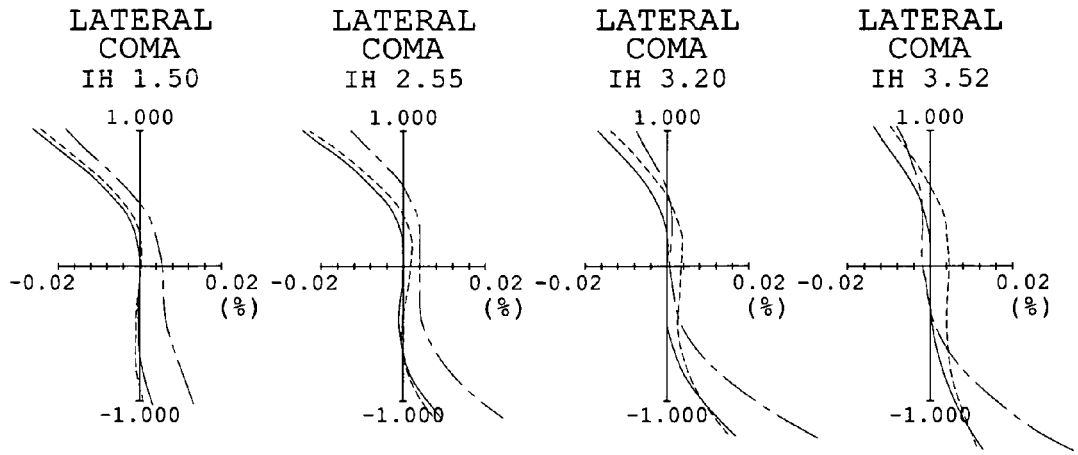
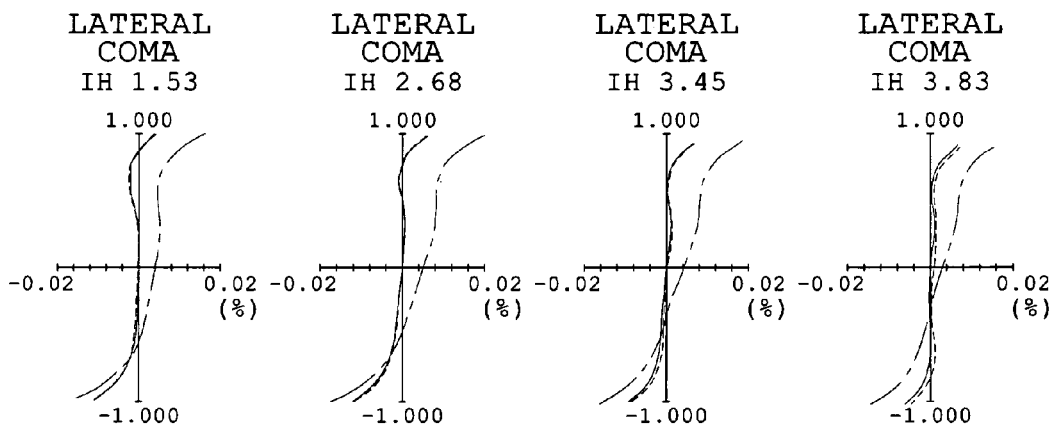
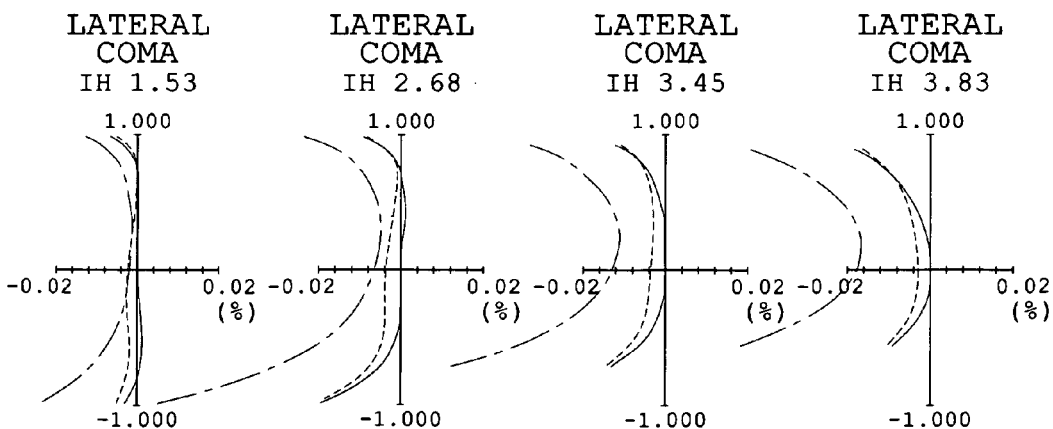

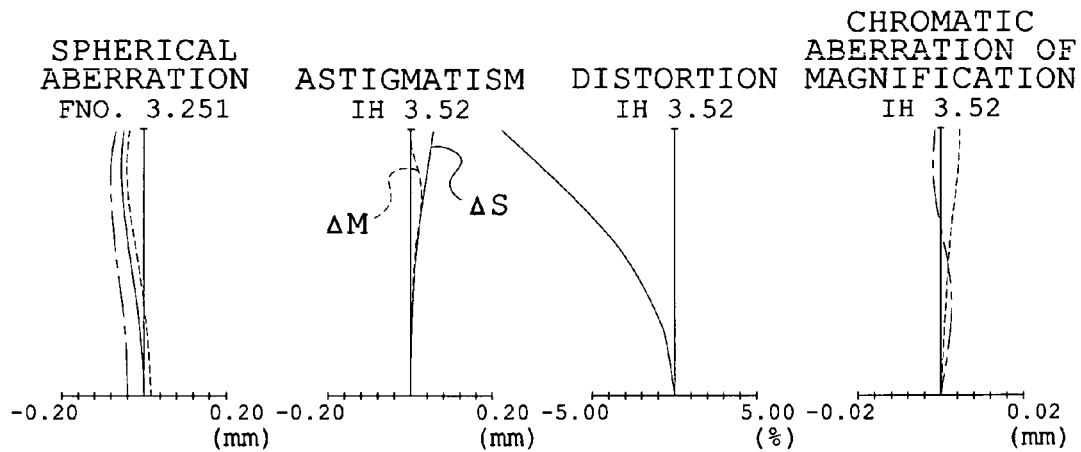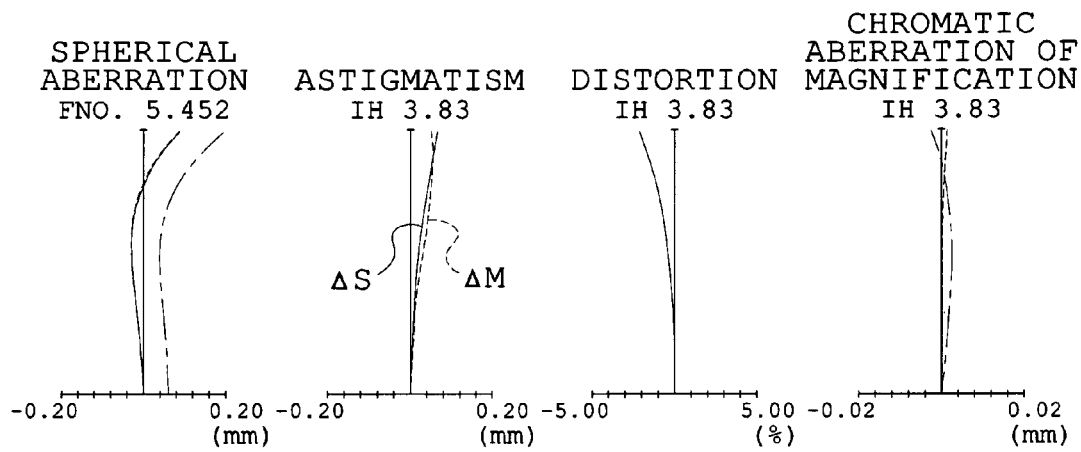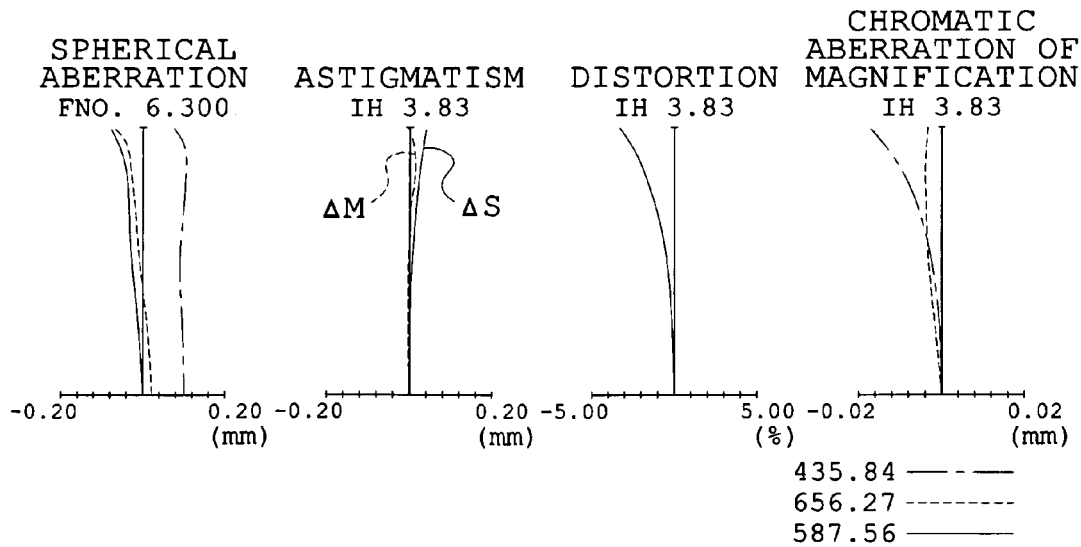

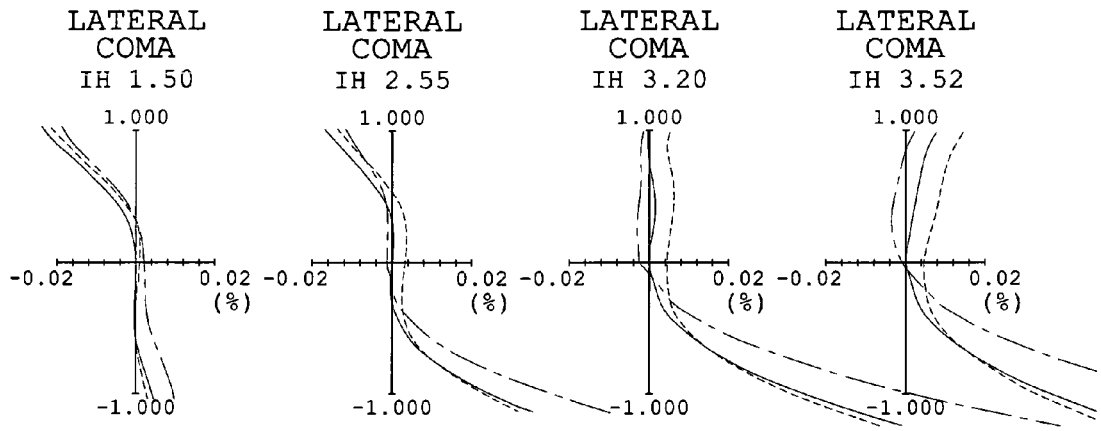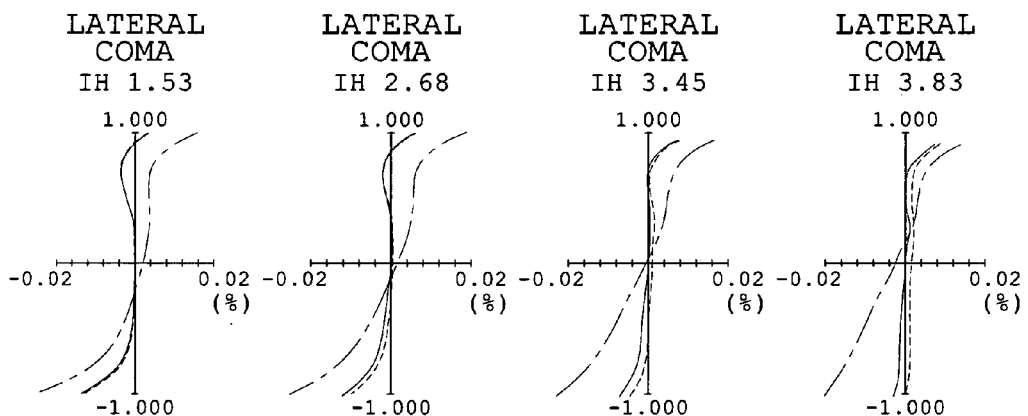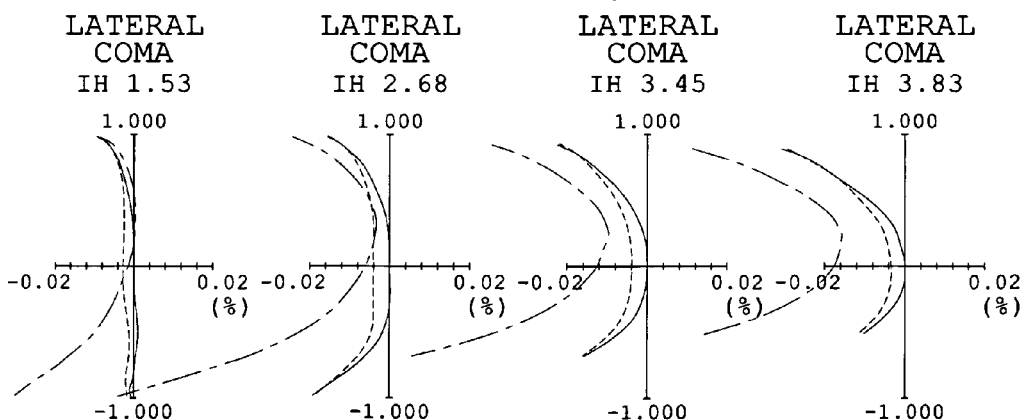

ZOOM OPTICAL SYSTEM AND ELECTRONIC PICKUP APPARATUS USING THE SAME

This application claims benefits of Japanese Patent Application No. 2010-52477 filed in Japan on Mar. 10, 2010 and No. 2010-52478 filed in Japan on Mar. 10, 2010, the contents of which are hereby incorporated by reference.

BACKGROUND OF THE INVENTION

1. Field of the Invention

This invention relates to a zoom optical system and an electronic pickup apparatus using the same.

2. Description of the Related Art

In recent years, it has been known that compact cameras which are designed to become thin include a compact camera in which an optical system is retracted to be stored in the camera housing in a state in which photography is not performed. In order to make such a compact camera more thinner, the thickness within which the optical system is retracted has to be made to become thin.

Now, it is known that constitutions for retracting an optical system include a constitution in which a lens frame for holding the optical system is divided into a plurality of parts so that the lens frame can expand and contract. However, such a constitution requires the large number of the parts into which the lens frame is divided, in order to make a thin thickness for retracting the optical system. As a result, the weight of the whole of the lens frame becomes large, and the divided parts of the lens frame are hard to arrange on the same axis in a state in which the lens frame is not retracted, so that eccentricity is easy to cause in the optical system. Accordingly, in the case where such a constitution is adopted, it is required that the interval at which the lens frame is divided into a plurality of parts is shortened while the number of parts into which the lens frame is divided is being decreased.

And, it is preferred that the total length of the optical system is shortened in both states of the optical system retracting and not retracting, in order to meet these demands. Such optical system is described, for example, in Japanese Patent Kokai No. 2007-271711. The optical system that is described in Japanese Patent Kokai No. 2007-271711 is formed in such a way that the first lens group on the most object side is formed by a cemented lens which is composed of a negative lens and a positive lens. As a result, the first lens group is made to become thin with the occurrence of chromatic aberration restrained.

SUMMARY OF THE INVENTION

A zoom optical system according to the present invention, which is constituted by a plurality of lens groups and in which magnification is changed by properly changing distances between the lens groups, is characterized in that: a positive first lens group, a negative second lens group, a positive third lens group, and a positive fourth lens group are arranged in that order from the object side; the first lens group consists of only one lens element; the second lens group includes, in order from the object side, a negative single lens, a negative cemented lens, and a positive single lens; and the following condition (1) is satisfied:

$$0.2 \leq \Delta D_{w-w10}/L_t \leq 0.35 \quad (1)$$

where $\Delta D_{w-w10}$ denotes the variation in the distance between the first and second lens groups in changing from the wide angle end position to the position in which the focal length is ten times or more as large as that in the wide angle end position, and $L_t$ denotes the total length of the optical system in the telephoto end position.

Also, in a zoom optical system according to the present invention, it is preferred that the following condition (2) is satisfied:

$$SF_{G4} = (r_{G4o} + r_{G4i})/(r_{G4o} - r_{G4i}) > 0 \quad (2)$$

where $SF_{G4}$ denotes the shape factor of the fourth lens group, $r_{G4o}$ denotes the radius of curvature of the most object-side surface of the fourth lens group, and $r_{G4i}$ denotes the radius of curvature of the most image-side surface of the fourth lens group.

Also, in a zoom optical system according to the present invention, it is preferred that the following condition (3) is satisfied:

$$0.2 \leq SF_{G4} \leq 5.0 \quad (3)$$

Also, in a zoom optical system according to the present invention, it is preferred that the third lens group comprises, in order from the object side, a positive single lens and a cemented lens that consists of a positive lens and a negative lens.

Also, in a zoom optical system according to the present invention, it is preferred that the first lens group consists of only one lens element.

Also, in a zoom optical system according to the present invention, it is preferred that the following conditions (4) and (5) are satisfied:

$$SF_{G1o-G4i} = (r_{G1o} + r_{G4i})/(r_{G1o} - r_{G4i}) \quad (4)$$

$$0 \leq SF_{G1o-G4i} \leq 0.4 \quad (5)$$

where $SF_{G1o-G4i}$ denotes the shape factor for the most object-side surface of the first lens group and the most image-side surface of the fourth lens group, $r_{G1o}$ denotes the radius of curvature of the most object-side surface of the first lens group, and $r_{G4i}$ denotes the radius of curvature of the most image-side surface of the fourth lens group.

Also, in a zoom optical system according to the present invention, it is preferred that the second lens group comprises, in order from the object side, a negative single lens, a negative cemented lens, and a positive single lens.

Also, in a zoom optical system according to the present invention, it is preferred that when the second lens group comprises, in order from the object side, a negative single lens, a negative cemented lens, and a positive single lens, the cemented lens of the second lens group consists of a negative lens and a positive lens and the following condition (6) is satisfied:

$$0.1 \leq \phi_{G2n2}/\phi_{G2n1} \leq 1.0 \quad (6)$$

where $\phi_{G2n2}$ denotes the refractive power of the negative lens of the cemented lens in the second lens group, and $\phi_{G2n1}$ denotes the refractive power of the negative single lens in the second lens group.

Also, in a zoom optical system according to the present invention, it is preferred that when the second lens group comprises, in order from the object side, a negative single lens, a negative cemented lens, and a positive single lens, the following condition (7) is satisfied:

$$0.15 \leq |\phi_{G2p2}/\phi_{G2n1}| \leq 0.45 \quad (7)$$

where $\phi_{G2p2}$ denotes the refractive power of the positive single lens in the second lens group, and $\phi_{G2n1}$ denotes the refractive power of the negative single lens in the second lens group.

Also, in a zoom optical system according to the present invention, it is preferred that when the second lens group comprises, in order from the object side, a negative single lens, a negative cemented lens, and a positive single lens, the cemented lens of the second lens group consists of a negative lens and a positive lens and the following condition (8) is satisfied:

$$0.05 \leq nd_{G2n2} - nd_{G2p1} \leq 0.2 \tag{8}$$

where $nd_{G2n2}$ denotes the refractive index of the negative lens of the cemented lens in the second lens group at d line, and $nd_{G2p1}$ denotes the refractive index of the positive lens of the cemented single lens in the second lens group at d line.

Also, in a zoom optical system according to the present invention, it is preferred that when the second lens group comprises, in order from the object side, a negative single lens, a negative cemented lens, and a positive single lens, the cemented lens of the second lens group consists of a negative lens and a positive lens and the following condition (9) is satisfied:

$$20 \leq vd_{G2n2} - vd_{G2p1} \leq 50 \tag{9}$$

where $vd_{G2n2}$ denotes the Abbe's number of the negative lens of the cemented lens in the second lens group at d line, and $vd_{G2p1}$ denotes the Abbe's number of the positive lens of the cemented lens in the second lens group at d line.

Also, in a zoom optical system according to the present invention, it is preferred that when $f_w$ denotes the focal length of the whole of the optical system in the wide angle end position, $f_t$ denotes the focal length of the whole of the optical system in the telephoto end position, and $\sqrt{(f_w \times f_t)}$ denotes the focal length of the whole of the optical system in the middle position, the position of the second lens group in the middle position is nearer to the object side than the positions of the second lens group in the wide angle end position and the telephoto end position.

Also, in a zoom optical system according to the present invention, it is preferred that when $f_w$ denotes the focal length of the whole of the optical system in the wide angle end position, $f_t$ denotes the focal length of the whole of the optical system in the telephoto end position, $\sqrt{(f_w \times f_t)}$ denotes the focal length of the whole of the optical system in the middle position, and the position of the second lens group in the middle position is nearer to the object side than the positions of the second lens group in the wide angle end position and the telephoto end position, the following condition (10) is satisfied:

$$-7.0 \leq \Delta V_{G2w-m}/\Delta V_{G2m-t} \leq -1.2 \tag{10}$$

where $\Delta V_{G2w-m} = |V_{G2m} - V_{G2w}|$ and $\Delta V_{G2m-t} = |V_{G2t} - V_{G2m}|$, $V_{G2w}$ denotes the position of the second lens group in the wide angle end position, $V_{G2m}$ denotes the position of the second lens group in the middle position, $V_{G2t}$ denotes the position of the second lens group in the telephoto end position, and the signs of $\Delta V_{G2w-m}$ and $\Delta V_{G2m-t}$ are regarded as positive when the second lens group moves from the image side to the object side.

Also, in a zoom optical system according to the present invention, it is preferred that the position of the second lens group in the telephoto end position is nearer to the object side than that of the second lens group in the wide angle end position.

Also, in a zoom optical system according to the present invention, it is preferred that when the second lens group comprises, in order from the object side, a negative single lens, a negative cemented lens, and a positive single lens, the cemented surface of the cemented lens in the second lens group are aspherical.

Also in zoom optical system according to the present invention, it is preferred that when the second lens group comprises, in order from the object side, a negative single lens, a negative cemented lens, and a positive single lens, all the surfaces of the cemented lens in the second lens group are aspherical.

Also, in a zoom optical system according to the present invention, it is preferred that when the second lens group comprises, in order from the object side, a negative single lens, a negative cemented lens, and a positive single lens, all the surfaces of the cemented lens in the second lens group are aspherical, and the direction from the object side to the image side on the optical axis is regarded as a positive direction, the aspherical quantities in the effective radiuses of all the surfaces of the cemented lens in the second lens group have negative values.

Also, in a zoom optical system according to the present invention, it is preferred that when the second lens group comprises, in order from the object side, a negative single lens, a negative cemented lens, and a positive single lens and all the surfaces of the cemented lens in the second lens group are aspherical, the following condition (11) is satisfied:

$$10 \leq (ASP_{22c} \times |\Delta vd_{22}|)/(ASP_{22o} + ASP_{22i}) \leq 90 \tag{11}$$

where $ASP_{22c}$ denotes the aspherical quantity in the effective radius of the cemented surface of the cemented lens in the second lens group, $\Delta vd_{22}$ denotes the difference between the Abbe's numbers of the two lenses which form the cemented lens of the second lens group, $ASP_{22o}$ denotes the aspherical quantity in the effective radius of the object-side surface of the cemented lens in the second lens group, and $ASP_{22i}$ denotes the aspherical quantity in the effective radius of the image-side surface of the cemented lens in the second lens group. Besides, the effective radius is the smallest of the effective radiuses of the surfaces of the cemented lens in the second lens group.

Also, in a zoom optical system according to the present invention, it is preferred that the fourth lens group consists of only one lens element.

Also, in a zoom optical system according to the present invention, it is preferred that when the fourth lens group consists of only one lens element, the fourth lens group consists of only one positive single lens.

Also, in a zoom optical system according to the present invention, it is preferred that the following condition (12) is satisfied:

$$0 \leq |\Delta V_{G4w-t}/f_w| \leq 0.1 \tag{12}$$

where $\Delta V_{G4w-t} = |V_{G4t} - V_{G4w}|$, $V_{G4w}$ denotes the position of the fourth lens group in the wide angle end position, $V_{G4t}$ denotes the position of the fourth lens group in the telephoto end position, $f_w$ denotes the focal length of the whole of the optical system in the wide angle end position, and the sign of $\Delta V_{G4w-t}$ is regarded as positive when the fourth lens group moves from the image side to the object side.

Also, in a zoom optical system according to the present invention, it is preferred that the fourth lens group does not move in changing a magnification from the wide angle is end position to the telephoto end position.

Also, in order to achieve the above object, an electronic pickup apparatus according to the present invention is characterized in that the electronic pickup apparatus includes one of the above-described zoom optical systems.

The present invention is capable of offering: a zoom optical system which has a high zoom magnification of 10 or more, in which various aberrations are corrected well with the total length of the zoom optical system kept short in the both states of the zoom optical system retracting and not retracting, and in which variations in various aberrations are small in changing a magnification from the wide angle end position to the telephoto end position; and an electronic pickup apparatus using the same.

These and other features and advantages of the present invention will become apparent from the following detailed description of the preferred embodiments when taken in conjunction with accompanying drawings.

BRIEF DESCRIPTION OF THE DRAWINGS

FIGS. 2A-2D, 2E-2H, and 2I-2L are diagrams showing aberration characteristics in the wide-angle end, middle, and telephoto end positions, respectively, in infinite objective point focusing of the zoom optical system shown in FIG. 1.

FIGS. 3A-3D, 3E-3H, and 3I-3L are diagrams showing coma in the wide-angle end, middle, and telephoto end positions, respectively, in infinite objective point focusing of the zoom optical system shown in FIG. 1.

FIGS. 6A-6D, 6E-6H, and 6I-6L are diagrams showing aberration characteristics in the wide-angle end, middle, and telephoto end positions, respectively, in infinite objective point focusing of the zoom optical system shown in FIG. 5.

FIGS. 7A-7D, 7E-7H, and 7I-7L are diagrams showing coma in the wide-angle end, middle, and telephoto end positions, respectively, in infinite objective point focusing of the zoom optical system shown in FIG. 5.

FIGS. 8A-8D, 8E-8H, and 8I-8L are diagrams showing lateral coma in the wide-angle end, middle, and telephoto end positions, respectively, in infinite objective point focusing of the zoom optical system shown in FIG. 5.

FIGS. 10A-10D, 10E-10H, and 10I-10L are diagrams showing aberration characteristics in the wide-angle end, middle, and telephoto end positions, respectively, in infinite objective point focusing of the zoom optical system shown in FIG. 9.

FIGS. 11A-11D, 11E-11H, and 11I-11L are diagrams showing coma in the wide-angle end, middle, and telephoto end positions, respectively, in infinite objective point focusing of the zoom optical system shown in FIG. 9.

FIGS. 12A-12D, 12E-12H, and 12I-12L are diagrams showing lateral coma in the wide-angle end, middle, and telephoto end positions, respectively, in infinite objective point focusing of the zoom optical system shown in FIG. 9.

FIGS. 14A-14D, 14E-14H, and 14I-14L are diagrams showing aberration characteristics in the wide-angle end, middle, and telephoto end positions, respectively, in infinite objective point focusing of the zoom optical system shown in FIG. 13.

FIGS. 16A-16D, 16E-16H, and 16I-16L are diagrams showing lateral coma in the wide-angle end, middle, and telephoto end positions, respectively, in infinite objective point focusing of the zoom optical system shown in FIG. 13.

FIGS. 18A-18D, 18E-18H, and 18I-18L are diagrams showing aberration characteristics in the wide-angle end, middle, and telephoto end positions, respectively, in infinite objective point focusing of the zoom optical system shown in FIG. 17.

FIGS. 20A-20D, 20E-20H, and 20I-20L are diagrams showing lateral coma in the wide-angle end, middle, and telephoto end positions, respectively, in infinite objective point focusing of the zoom optical system shown in FIG. 17.

FIGS. 22A-22D, 22E-22H, and 22I-22L are diagrams showing aberration characteristics in the wide-angle end, middle, and telephoto end positions, respectively, in infinite objective point focusing of the zoom optical system shown in FIG. 21.

FIGS. 24A-24D, 24E-24H, and 24I-24L are diagrams showing lateral coma in the wide-angle end, middle, and telephoto end positions, respectively, in infinite objective point focusing of the zoom optical system shown in FIG. 21.

FIGS. 26A-26D, 26E-26H, and 26I-26L are diagrams showing aberration characteristics in the wide-angle end, middle, and telephoto end positions, respectively, in infinite objective point focusing of the zoom optical system shown in FIG. 25.

FIGS. 27A-27D, 27E-27H, and 27I-27L are diagrams showing coma in the wide-angle end, middle, and telephoto end positions, respectively, in infinite objective point focusing of the zoom optical system shown in FIG. 25.

FIGS. 28A-28D, 28E-28H, and 28I-28L are diagrams showing lateral coma in the wide-angle end, middle, and telephoto end positions, respectively, in infinite objective point focusing of the zoom optical system shown in FIG. 25.

FIGS. 30A-30D, 30E-30H, and 30I-30L are diagrams showing aberration characteristics in the wide-angle end, middle, and telephoto end positions, respectively, in infinite objective point focusing of the zoom optical system shown in FIG. 29.

FIGS. 32A-32D, 32E-32H, and 32I-32L are diagrams showing lateral coma in the wide-angle end, middle, and telephoto end positions, respectively, in infinite objective point focusing of the zoom optical system shown in FIG. 29.

DETAILED DESCRIPTION OF THE PREFERRED EMBODIMENTS

Figure 1A:
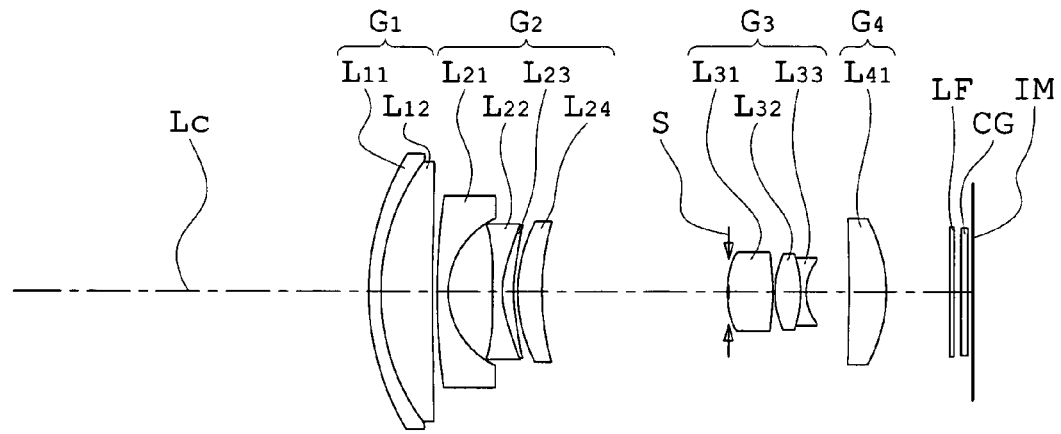
FIGS. 1A, 1B, and 1C are sectional views showing optical constitutions, developed along the optical axis, in the wide-angle end, middle, and telephoto end positions, respectively, in infinite object point focusing of a zoom optical system according to the embodiment 1 of the present invention.

Before undertaking the description of the embodiments of a zoom optical system according to the present invention, constitutions for a zoom optical system according to the present invention and operation effects caused by the constitutions will be explained.

A zoom optical system according to the present invention, which includes a plurality of lens groups and in which magnification is changed by properly changing distances between the lens groups, is characterized in that: a positive first lens group, a negative second lens group, a positive third lens group, and a positive fourth lens group are arranged in that order from the object side; the first lens group consists of only one lens element; the second lens group includes, in order from the object side, a negative single lens, a negative cemented lens, and a positive single lens; and the following condition (1) is satisfied:

$$0.2 \leq \Delta D_{w-w10}/L_t \leq 0.35 \quad (1)$$

where $\Delta D_{w-w10}$ denotes the variation in the distance between the first and second lens groups in changing from the wide angle end position to the position in which the focal length is ten times or more as large as that in the wide angle end position, and $L_t$ denotes the total length of the optical system in the telephoto end position.

As described above, the first lens group consists of only one lens element in a zoom optical system according to the present invention, so that the first lens group can be made to have a thin thickness and the total length of the zoom optical system can be shortened in the both states of the zoom optical system retracting and not retracting.

Also, the second lens group includes a cemented lens in a zoom optical system according to the present invention, so that it is possible to correct chromatic aberration that occurs mainly in the telephoto end position when the total length of the optical system is shortened with a high magnification of 10 or more kept.

Now, in such a constitution of a zoom optical system according to the present invention, when the first lens group consists of only one lens element, aberration cannot be corrected enough by the first lens group in the case where the variable magnification ratio is high, and aberration occurring in the first lens group becomes large. In addition, although an attempt to correct the aberration by the second lens group is made, variations in aberrations in the wide angle end position and the telephoto end position become large when a variation in the distance between the first and second lens groups is large.

Accordingly, a zoom optical system according to the present invention is formed in such a way that the condition (1) is satisfied in the zoom optical system, that is to say, a variation in the distance between the first and second lens groups is smaller than the total length of the optical system in the telephoto end position even in a state in which the zoom optical system has a high magnification of 10 or more.

Because a zoom optical system according to the present invention has such a constitution, variations in aberrations are small in the wide angle end position and the telephoto end position of the zoom optical system according to the present invention. Also, the correction of aberrations can be shared among the first and second lens groups in the zoom optical system according to the present invention, so that it is possible to collect aberrations well. In addition, the total length of the optical system can be shortened in the telephoto end position.

Besides, if $\Delta D_{w-w10}/L_t$ is beyond the upper limit of the condition (1), variation in the distance between the first and second lens groups becomes too large and it is impossible to shorten the total length of the optical system in the telephoto end position. In addition, variations in aberrations become large in changing a magnification from the wide angle end position to the telephoto end position. On the other hand, if $\Delta D_{w-w10}/L_t$ is below the lower limit of the condition (1), the refractive power of the second lens group has to be increased, so that variations in aberrations become large on the contrary.

Also, a zoom optical system according to the present invention, which includes a plurality of lens groups and in which magnification is changed by properly changing distances between the lens groups, is characterized in that: a positive first lens group, a negative second lens group, a positive third lens group, and a positive fourth lens group are arranged in that order from the object side; the most object-side surface of the first lens group has a convex shape which faces toward the object side; and the following condition (2) is satisfied:

$$SF_{G4} = (r_{G4o} + r_{G4i})/(r_{G4o} - r_{G4i}) > 0 \quad (2)$$

where $SF_{G4}$ denotes the shape factor of the fourth lens group, $r_{G4o}$ denotes the radius of curvature of the most object-side surface of the fourth lens group, and $r_{G4i}$ denotes the radius of curvature of the most image-side surface of the fourth lens group.

In general, many lens surfaces in an optical system are a lens surface the concave shape of which faces toward a stop, that is to say, a lens surface in which the center of the sphere forming the lens surface is located on the stop-side. And, the more symmetrical the constitutions of these lens surfaces on the object and image sides become with respect to the stop, the smaller the angle between a light ray incident on each of these lens surfaces and the normal to the each of these lens surfaces becomes, so that the occurrence of aberrations, in particular, distortion and coma can be restrained and the variations in aberrations also become small. In particular, because the heights of light rays which are incident on the most object-side surface and the most image-side surface of an optical system respectively are high, an effect on a reduction in aberration becomes large when the concave shapes of these lens surfaces face toward the stop.

Accordingly, the zoom optical system according to the present invention is formed in such a way that: the most object-side surface of the first lens group has a convex shape which faces toward the object side; and the shape factor of the fourth lens group has a positive value, that is to say, the most image-side surface of the fourth lens group has a convex shape which faces toward the image side.

Because the zoom optical system according to the present invention has such a constitution, the occurrence of and the variations in various aberrations such as distortion and coma can be restrained in the zoom optical system. As a result, even though the zoom optical system is given a variable magnification ratio which makes the zoom optical system have high power, it is possible to restrain aberrations, in particular, in the telephoto end position and in a position of the zoom optical system which is near to the telephoto end position.

In addition, when the zoom optical system according to the present invention has such a constitution, a principal point of the fourth lens group in this case is nearer to the image side than that of the fourth lens group the shape factor of which has a negative value. As a result, even though the distances between the fourth lens group and filters and so on which are arranged on the image side of the fourth lens group (infrared cut filter, low-pass filter, cover glass for sensor, and so on) are not widened too much, the principal point distances between the fourth lens group and the filters and so on can be made to become wide, so that it is possible to shorten the total length of the optical system. Accordingly, when the zoom optical system is given a variable magnification ratio which makes the zoom optical system have high power, it is possible not only to restrain aberrations in the telephoto end position and in a position of the zoom optical system which is near to the telephoto end position but also to keep the total length of the optical system short.

Also, in a zoom optical system according to the present invention, it is preferred that the following condition (3) is satisfied:

$$0.2 \leq SF_{G4} \leq 5.0 \qquad (3)$$

As described above, when the condition (3) is satisfied in the zoom optical system according to the present invention, the total length of the optical system can be easily shortened more without large amounts of aberrations occurring in the most image-side surface of the fourth lens group.

Besides, if $SF_{G4}$ is beyond the upper limit of the condition (3), the radius of curvature of the most image-side surface of the fourth lens group becomes too small, an amount of aberration occurring in the most-image surface of the fourth lens group easily becomes large. On the other hand, if $SF_{G4}$ is below the lower limit of the condition (3), a principal point of the fourth lens group comes nearer to the object side, so that it is hard to secure the distances between the fourth lens group and the filters and so on.

Also, in a zoom optical system according to the present invention, it is preferred that the third lens group comprises, in order from the object side, a positive single lens and a cemented lens that consists of a positive lens and a negative lens.

In the zoom optical system according to the present invention, the third lens group often has a constitution in which the third lens group comprises, in order from the objects side, a positive single lens, a cemented lens that consists of a positive lens and a negative lens, and a positive single lens. Such a constitution makes it possible to correct coma well.

In this case, when the third lens group is formed in such a way that the third lens group consists of, in order from the object side, a positive single lens and a cemented lens that consists of a positive lens and a negative lens and the fourth lens group is formed in such a way that the fourth lens group consists of only a positive single lens, the combination of the third and fourth lens groups makes it possible to easily correct coma, in particular, coma which occurs in the wide angle end position in which the distance between the third and fourth lens groups becomes narrow.

In addition, unless the positive single lens is arranged on the most image side in the third lens group, the positive principal point of the third lens group comes nearer to the object side, so that the distance between the positive principal point of the third lens group and a principal point of the negative lens of the cemented lens of the third lens group can be widened. As a result, the angle of incidence at which light flux enters the negative lens of the cemented lens of the third lens group becomes gradual, so that it is possible to avoid bending light rays largely through the negative lens. Accordingly, it becomes easy to restrain the occurrence of spherical aberration and coma.

Also, off-axis light flux the image height of which is high in the range from the wide angle end position to the telephoto end position passes through a position which is near to a position through which on-axis light flux passes, in the third lens group. As a result, when a cemented lens is arranged in the third lens group, spherical aberration and on-axis chromatic aberration can be corrected well by the cemented surface of the cemented lens.

Also, in a zoom optical system according to the present invention, it is preferred that the first lens group consists of only one lens element.

In the zoom optical system according to the present invention, the first lens group is often given a role in the corrections of off-axis aberrations, in particular, a role of the correction of coma because the angles of incidence at which light rays enter the first lens group are large and the heights of the light rays which enter the first lens group are also high. And, a plurality of lenses must be arranged in the first lens group in order to give the first lens group the role. On the other hand, the heights of light rays that enter the first lens group are high, so that a large and thick lens is often selected as a lens for the first lens group.

As a result, the total length of the zoom optical system becomes long in the both states of the zoom optical system retracting and not retracting. In addition, the weight of the first lens group also becomes heavy, so that motor or the like for moving the lens group must be made to have a large size, and the size of an apparatus having the optical system itself also becomes large.

Accordingly, it is preferred that the number of lenses of the first lens group is as small as possible so that the first lens group has a thin thickness and a light weight. For this reason, it is preferred that the first lens group consists of only one lens element in the zoom optical system according to the present invention. Besides, even though the first lens group is composed of only one lens element, there is no occurrence of a large amount of coma.

Also, in a zoom optical system according to the present invention, it is preferred that the following conditions (4) and (5) are satisfied:

$$SF_{G1o\text{-}G4i} = (r_{G1o} + r_{G4i})/(r_{G1o} - r_{G4i}) \quad (4)$$

$$0 \leq SF_{G1o\text{-}G4i} \leq 0.4 \quad (5)$$

where $SF_{G1o\text{-}G4i}$ denotes the shape factor for the most object-side surface of the first lens group and the most image-side surface of the fourth lens group, $r_{G1o}$ denotes the radius of curvature of the most object-side surface of the first lens group, and $r_{G4i}$ denotes the radius of curvature of the most image-side surface of the fourth lens group.

As described above, it is preferred that the zoom optical system according to the present invention is formed in such a way that the shape factor for the most object-side surface of the first lens group and the most image-side surface of the fourth lens group which is defined as the condition (4) satisfies the condition (5), that is to say, the radius of curvature of the most object-side surface of the first lens group is as large as that of the most image-side surface of the fourth lens group, or the radius of curvature of the most object-side surface of the first lens group is slightly larger than that of the most image-side surface of the fourth lens group.

Accordingly, when the zoom optical system according to the present invention has such a constitution, the radiuses of curvature of the most object-side surface of the first lens group and the most image-side surface of the fourth lens group also become approximately symmetrical to each other with respect to the stop, so that it is possible to restrain the variation in coma in changing a magnification. In addition, it is possible to restrain the occurrence of large amounts of aberrations in the telephoto end position in which the zoom optical system has high power and in a position of the zoom optical system which is near to the telephoto end position.

Besides, if $SF_{G1o\text{-}G4i}$ is beyond the upper limit of the condition (5), the difference between the radiuses of curvature of the most object-side surface of the first lens group and the most image-side surface of the fourth lens group becomes large, so that the symmetry of the optical system deteriorates. As a result, it is hard to restrain the variation in coma in changing a magnification, and it is also hard to restrain the occurrence of large amounts of aberrations in the telephoto end position in which the zoom optical system has a high power and in a position of the zoom optical system which is near to the telephoto end position. On the other hand, if $SF_{G1o\text{-}G4i}$ is below the lower limit of the condition (5), the radius of curvature of the most object-side surface of the first lens group becomes small, so that amounts of aberrations occurring in the most object-side surface of the first lens group become large.

Also, in a zoom optical system according to the present invention, it is preferred that the second lens group comprises, in order from the object side, a negative single lens, a negative cemented lens, and a positive single lens.

Accordingly, when the zoom optical system according to the present invention has such a constitution, the second lens group includes a cemented lens, so that it is possible to easily correct chromatic aberration occurring mainly in the telephoto end position and in a position of the zoom optical system which is near to the telephoto end position when the variable magnification ratio is changed into a high power of 10 or more with the total length of the optical system kept short.

Also, in a zoom optical system according to the present invention, it is preferred that when the second lens group comprises, in order from the object side, a negative single lens, a negative cemented lens, and a positive single lens, the cemented lens of the second lens group consists of a negative lens and a positive lens and the following condition (6) is satisfied:

$$0.1 \leq \phi_{G2n2}/\phi_{G2n1} \leq 1.0 \quad (6)$$

where $\phi_{G2n2}$ denotes the refractive power of the negative lens of the cemented lens in the second lens group, and $\phi_{G2n1}$ denotes the refractive power of the negative single lens in the second lens group.

As described above, it is preferred that the zoom optical system according to the present invention is formed in such a way that the condition (6) is satisfied in the zoom optical system, that is to say, the refractive power of the negative single lens which is arranged nearest to the object side in the second lens group is larger than that of the negative lens of the cemented lens.

Accordingly, when the zoom optical system according to the present invention has such a constitution, the principal point of the second lens group comes nearer to the object side, so that the first and second lens groups can be approximated to each other and it is possible to shorten the total length of the optical system. In addition, when the principal point of the second lens group comes nearer to the object side, the entrance pupil also comes nearer to the object side, so that the heights of light rays become low in the first lens group and the first lens group can have a small diameter. As a result, the first lens group the movement distance of which is large in changing a magnification can be downsized and can be formed in such a way that the weight of the first lens group is light. Accordingly, a motor for moving the first lens group or the like, together with the whole of the optical system, can be also downsized.

Besides, if $\phi_{G2n2}/\phi_{G2n1}$ is beyond the upper limit of the condition (6), the refractive power of the negative single lens is reduced and the principal point of the second lens group comes nearer to the image side, so that the first and second lens groups cannot be approximated to each other and it is hard to shorten the total length of the optical system. In addition, the entrance pupil comes nearer to the image side, so that the diameter of the first lens group becomes large and it is also hard to downsize the whole of the optical system. On the other hand, if $\phi_{G2n2}/\phi_{G2n1}$ is below the lower limit of the condition (6), the refractive power of the negative lens of the cemented lens is reduced, so that the balance between the refractive powers of the negative and positive lenses in the cemented lens is lost and it is hard to correct chromatic aberration well.

Also, in a zoom optical system according to the present invention, it is preferred that when the second lens group comprises, in order from the object side, a negative single lens, a negative cemented lens, and a positive single lens, the following condition (7) is satisfied:

$$0.15 \leq |\phi_{G2p2}/\phi_{G2n1}| \leq 0.45 \quad (7)$$

where $\phi_{G2p2}$ denotes the refractive power of the positive single lens in the second lens group, and $\phi_{G2n1}$ denotes the refractive power of the negative single lens in the second lens group.

As described above, it is preferred that the zoom optical system according to the present invention is formed in such a way that the condition (7) is satisfied in the zoom optical system, that is to say, the absolute value of the refractive power of the positive single lens is smaller than that of the refractive power of the negative single lens in the second lens group.

Accordingly, when the zoom optical system according to the present invention has such a constitution, light rays can be gently bent by the positive single lens in the zoom optical system, so that variations in aberrations occurring in the positive single lens can be made to become small in changing a magnification from the wide angle end position to the telephoto end position.

Besides, if $|\phi_{G2p2}/\phi_{G2n1}|$ is beyond the upper limit of the condition (7), the refractive power of the positive single lens becomes too large, so that variations in the aberrations in changing a magnification easily become large. On the other hand, if $|\phi_{G2p2}/\phi_{G2n1}|$ is below the lower limit of the condition (7), the refractive power of the positive single lens becomes too small, so that it is hard to correct aberrations occurring in the second lens group.

Also, in a zoom optical system according to the present invention, it is preferred that when the second lens group comprises, in order from the object side, a negative single lens, a negative cemented lens, and a positive single lens, the cemented lens of the second lens group consists of a negative lens and a positive lens and the following condition (8) is satisfied:

$$0.05 \leq nd_{G2n2} - nd_{G2p1} \leq 0.2 \quad (8)$$

where $nd_{G2n2}$ denotes the refractive index of the negative lens of the cemented lens in the second lens group at d line, and $nd_{G2p1}$ denotes the refractive index of the positive lens of the cemented single lens in the second lens group at d line.

As described above, it is preferred that the zoom optical system according to the present invention is formed in such a way that the condition (8) is satisfied in the zoom optical system, that is to say, the refractive index of the negative lens at d line is larger than the refractive index of the positive lens at d line in the negative cemented lens of the second lens group. Accordingly, when the zoom optical system according to the present invention has such a constitution, the Petzval sum can be easily made to become small.

Besides, if $nd_{Gn2} - nd_{Gp1}$ is beyond the upper limit of the condition (8), the refractive index of the negative lens becomes too large, so that the Petzval sum has a large negative value and a large amount of curvature of image easily occurs. On the other hand, if $nd_{Gn2} - nd_{Gp1}$ is below the lower limit of the condition (8), the refractive index of the negative lens becomes too small, so that the Petzval sum cannot be made to become small and a large amount of curvature of image easily occurs.

Also, in a zoom optical system according to the present invention, it is preferred that when the second lens group comprises, in order from the object side, a negative single lens, a negative cemented lens, and a positive single lens, the cemented lens of the second lens group consists of a negative lens and a positive lens and the following condition (9) is satisfied:

$$20 \leq vd_{G2n2} - vd_{G2p1} 50 \quad (9)$$

where $vd_{G2n2}$ denotes the Abbe's number of the negative lens of the cemented lens in the second lens group at d line, and $vd_{G2p1}$ denotes the Abbe's number of the positive lens of the cemented lens in the second lens group at d line.

As described above, it is preferred that the zoom optical system according to the present invention is formed in such a way that the condition (9) is satisfied in the zoom optical system, that is to say, the difference between the Abbe's numbers of the negative and positive lenses that form the cemented lens is large. Accordingly, when the zoom optical system according to the present invention has such a constitution, chromatic aberration is easy to correct well.

Besides, if $vd_{G2n2} - vd_{G2p1}$ is beyond the upper limit of the condition (9), materials which can be used for the cemented lens are restricted, so that the cemented lens is hard to make. On the other hand, if $vd_{G2n2} - vd_{G2p1}$ is below the lower limit of the condition (9), the difference between the Abbe's numbers becomes too small, so that it is hard to correct chromatic aberration well.

Also, in a zoom optical system according to the present invention, it is preferred that when $f_w$ denotes the focal length of the whole of the optical system in the wide angle end position, $f_t$ denotes the focal length of the whole of the optical system in the telephoto end position, and $\sqrt{(f_w \times f_t)}$ denotes the focal length of the whole of the optical system in the middle position, the position of the second lens group in the middle position is nearer to the object side than the positions of the second lens group in the wide angle end position and the telephoto end position.

In the constitution as a zoom optical system according to the present invention has it, the height of off-axis chief ray is high in the first lens group in the range from the wide angle end position to the middle position, and, in particular, the shorter the focal length in the wide angle end position is, the more easily the heights of light rays become high. Also, even though the focal length is fixed in the wide angle end position, the wider the distance between the first and second lens groups is, the more easily the heights of light rays become high in the first lens group. Accordingly, when the zoom optical system is formed in such a way that the distance between the first and second lens groups is sharply widened in changing a magnification from the wide angle end position to the middle position, the outer diameters of the lenses in the first lens group have to be large, and, in addition, the thicknesses of the lenses in the first lens group have to be thick. As a result, the total length of the zoom optical system easily becomes large in the both states of the zoom optical system retracting and not retracting.

Accordingly, in a zoom optical system according to the present invention, it is preferred that the zoom optical system is formed in such a way that the position of the second lens group in the middle position is nearer to the object side than the positions of the second lens group in the wide angle end position and the telephoto end position. Accordingly, when the zoom optical system according to the present invention has such a constitution, the variation in the distance between the first and second lens groups becomes small in changing from the wide angle end position to the middle position, and the variation in the distance between the first and second lens groups becomes large in changing from the middle position to the telephoto end position. As a result, the distance between the first and second lens groups is not sharply widened in changing a magnification from the wide angle end position to the middle position, so that it is hard for the height of off-axis chief ray to become high in the first lens group. As a result, the first lens group does not have to have a large size, and the total length of the zoom optical system is easy to shorten in the both states of the zoom optical system retracting and not retracting.

Also, in a zoom optical system according to the present invention, it is preferred that when $f_w$ denotes the focal length of the whole of the optical system in the wide angle end position, $f_t$ denotes the focal length of the whole of the optical system in the telephoto end position, $\sqrt{(f_w \times f_t)}$ denotes the focal length of the whole of the optical system in the middle position, and the position of the second lens group in the middle position is nearer to the object side than the positions of the second lens group in the wide angle end position and the telephoto end position, the following condition (10) is satisfied:

$$-7.0 \leq \Delta V_{G2w\text{-}m}/\Delta V_{G2m\text{-}t} \leq -1.2 \quad (10)$$

where $\Delta_{G2w\text{-}m} = |V_{G2m} - V_{G2w}|$ and $\Delta V_{G2m\text{-}t} = |V_{G2t} - V_{G2m}|$, $V_{G2w}$ denotes the position of the second lens group in the wide angle end position, $V_{G2m}$ denotes the position of the second lens group in the middle position, $V_{G2t}$ denotes the position of the second lens group in the telephoto end position, and the signs of $\Delta V_{G2w\text{-}m}$ and $\Delta V_{G2m\text{-}t}$ are regarded as positive when the second lens group moves from the image side to the object side.

As described above, it is preferred that the zoom optical system according to the present invention is formed in such a way that the condition (10) is satisfied in the zoom optical system, that is to say, the movement distance of the second lens group in changing a magnification from the wide angle end position to the middle position is larger than that of the second lens group in changing a magnification from the middle position to the telephoto end position.

Accordingly, when the zoom optical system according to the present invention has such a constitution, the variation in the distance between the first and second lens groups does not become too large in changing a magnification from the wide angle end position to the middle position, and the heights of light rays do not become too high in the first lens group. Also, when the zoom optical system has such a constitution, the position of the second lens group in the wide angle end position is compared with the position of the second lens group in the telephoto end position so that the position of the second lens group in the telephoto end position becomes nearer to the object side. As a result, the third lens group which is responsible for changing a magnification can easily move to the object side in the telephoto end position, and an optical system of high power is easy to achieve.

Besides, if $\Delta V_{G2w\text{-}m}/\Delta V_{G2m\text{-}t}$ is beyond the upper limit of the condition (10), the position of the second lens group in the wide angle end position becomes near to the position of the second lens group in the telephoto end position, or the position of the second lens in the telephoto end position becomes nearer to the image side than that of the second lens group in the wide angle end position, so that it becomes hard for the third lens group to move to the object side in the telephoto end position, and it is hard to achieve an optical system of high power. On the other hand, if $\Delta V_{G2w\text{-}m}/\Delta V_{G2m\text{-}t}$ is below the lower limit of the condition (10), the movement distance of the second lens group becomes large in changing from the wide angle end position to the middle position, so that the variation in the distance between the first and second lens groups becomes too small, and it is hard to change a magnification.

Also, in a zoom optical system according to the present invention, it is preferred that the position of the second lens group in the telephoto end position is nearer to the object side than that of the second lens group in the wide angle end position.

Accordingly, when the zoom optical system according to the present invention has such a constitution, the third lens group which is responsible for changing a magnification can easily move to the object side in the telephoto end position. As a result, it is possible to make a variable magnification ratio high.

Also, in a zoom optical system according to the present invention, it is preferred that when the second lens group comprises, in order from the object side, a negative single lens, a negative cemented lens, and a positive single lens, the cemented surface in the cemented lens of the second lens group is aspherical.

In the wide angle end position, off-axis light flux the image height of which is high enters the second lens group with the height of the light flux high. Accordingly, when the zoom optical system according to the present invention has such a constitution, it is easy to correct off-axis aberrations, in particular, such as chromatic aberration of magnification, well in the wide angle end position.

Also, in a zoom optical system according to the present invention, it is preferred that when the second lens group comprises, in order from the object side, a negative single lens, a negative cemented lens, and a positive single lens, all the surfaces of the cemented lens in the second lens group are aspherical.

In the wide angle end position, off-axis light flux the image height of which is high enters the second lens group with the height of the light flux high. Accordingly, when the zoom optical system according to the present invention has such a constitution, it is easy to correct off-axis aberrations, such as coma, well in the wide angle end position. Also, the second lens group becomes near to a stop in the telephoto end position, so that every light flux enters the negative cemented lens at a position which is near to the stop, independently of the height of light flux. Accordingly, when the zoom optical system according to the present invention has such a constitution, it is easy to correct on-axis aberrations, such as spherical aberration, well.

Also, in a zoom optical system according to the present invention, it is preferred that when the second lens group comprises, in order from the object side, a negative single lens, a negative cemented lens, and a positive single lens, all the surfaces of the cemented lens in the second lens group are aspherical, and the direction from the object side to the image side on the optical axis is regarded as a positive direction, the aspherical quantities in the effective radiuses of all the surfaces of the cemented lens in the second lens group have negative values.

In a zoom optical system having a constitution as the present invention discloses, it is desired that the most object-side surface of the cemented lens in the second lens group has a low negative refractive power and the most image-side surface of the cemented lens in the second lens group has a high negative refractive power when a near-axial arrangement of refractive powers is taken into consideration. Accordingly, when the zoom optical system according to the present invention has such a constitution, a principal point of the cemented lens comes nearer to the image side, so that it is possible to shorten the distance between the cemented lens and the positive lens that is arranged on the image side of and adjacently to the cemented lens. As a result, it is possible to thin the thickness of the second lens group. In addition, the negative refractive power of the second lens group can be intensified, so that it is also possible to shorten the total length of the optical system.

However, if light flux is largely bent by only one surface, a large amount of aberration occurs in the areas in which image heights are high and in which the heights of the rays of an on-axis light flux are high. In particular, large amounts of astigmatism and coma occur, and, in addition, a large amount of spherical aberration occurs in a position of the zoom optical system that is near to the telephoto end position. In order to restrain the occurrence of such aberrations to gently bend light rays, the refractive powers in the cemented lens must be arranged well-balancedly so that the negative refractive power of the most object-side surface of the cemented lens becomes high in the area of the most object-side surface which is removed from the optical axis and the negative refractive power of the most image-side surface of the cemented lens becomes low in the area of the most image-side surface which is removed from the optical axis.

Accordingly, in the cemented lens of the second lens group, it is preferred that the area of the most object-side surface of the cemented lens which is removed from the optical axis is given a negative aspherical quantity in order to intensify the negative refractive power and the area of the most image-side surface of the cemented lens which is removed from the optical axis is given a negative aspherical quantity in order to reduce the negative refractive power. Also, unless the cemented surface is also given a negative aspherical quantity in order to balance the refractive powers of the cemented lens in this case, a large amount of chromatic aberration occurs in the area of the cemented surface in which the heights of the light rays of on-axis light flux are high. Accordingly, it is preferred that the area of the cemented surface which is removed from the optical axis is also given negative aspherical quantities.

Also, in a zoom optical system according to the present invention, it is preferred that when the second lens group comprises, in order from the object side, a negative single lens, a negative cemented lens, and a positive single lens and all the surfaces of the cemented lens in the second lens group are aspherical, the following condition (11) is satisfied:

$$10 \leq (ASP_{22c} \times |\Delta vd_{22}|)/(ASP_{22o} + ASP_{22i}) \leq 90 \quad (11)$$

where $ASP_{22c}$ denotes the aspherical quantity in the effective radius of the cemented surfaces of the cemented lens in the second lens group, $\Delta vd_{22}$ denotes the difference between the Abbe's numbers of the two lenses which form the cemented lens of the second lens group, $ASP_{22o}$ denotes the aspherical quantity in the effective radius of the object-side surface of the cemented lens in the second lens group, and $ASP_{22i}$ denotes the aspherical quantity in the effective radius of the image-side surface of the cemented lens in the second lens group. Besides, the effective radius is the smallest of the effective radiuses of the surfaces of the cemented lens in the second lens group.

Both of the object and image sides of the cemented surface of the cemented lens come into contact with lenses respectively, so that the difference between the refractive indexes of the lens mediums on the object side and image side of the cemented surface is smaller than the difference between the refractive indexes on the object side and image side of a lens surface one side of which comes into contact with air. That is to say, even though the cemented surface of the cemented lens is given the same aspherical quantity as a lens surface one side of which comes into contact with air is given, the refractive power obtained by aspherical surface in the cemented surface becomes smaller than that in the surface one side of which comes into contact with air. Accordingly, the cemented surface of the cemented lens must be given a large aspherical quantity in order to make the cemented surface have the same refractive power as that of the surface one side of which comes into contact with air. Also, when the balance between the corrections of chromatic aberration and another aberrations in the cemented surface is taken into consideration, it is desired that an aspherical quantity for the cemented surface in the case of a large difference between the Abbe's numbers of materials for the two lenses which form the cemented lens is made to become smaller than an aspherical quantity for the cemented surface in the case of a small difference between the Abbe's numbers of materials for the two lenses which form the cemented lens Accordingly, it is preferred that the zoom optical system according to the present invention is formed in such a way that the condition (11) is satisfied in the zoom optical system. When the zoom optical system according to the present invention has a constitution in which the condition (11) is satisfied, the aspherical quantity of the cemented surface of the cemented lens becomes larger than the aspherical quantities of the object-side and image-side surfaces of the cemented lens. Also, when the difference between Abbe's numbers of materials for the two lenses that form the cemented lens is small, the aspherical quantity of the cemented surface becomes large, and when the difference between Abbe's numbers of materials for the two lenses that form the cemented lens is large, the aspherical quantity of the cemented surface becomes small. As a result, it is possible to correct spherical aberration, coma, chromatic aberration of magnification, chromatic aberration of coma, and so on well-balancedly.

Besides, if $(ASP_{22c} \times |\Delta vd_{22}|)/(ASP_{22o} + ASP_{22i})$ is beyond the upper limit of the condition (11), the aspherical quantity of the cemented surface becomes too large, so that large amounts of various aberrations, in particular, chromatic aberration of magnification and chromatic aberration of coma, easily occur. In addition, the difference between Abbe's numbers of materials for the two lenses that form the cemented lens becomes too large, so that materials which can be used for the cemented lens are restricted, and the cemented lens is hard to make. On the other hand, if $(ASP_{22c} \times |\Delta vd_{22}|)/(ASP_{22o} + ASP_{22i})$ is below the lower limit of the condition (11), the aspherical quantity of the cemented surface becomes too small, so that various aberrations, in particular, chromatic aberration of magnification and chromatic aberration of coma, are hard to correct. In addition, the difference between Abbe's numbers of materials for the two lenses that form the cemented lens becomes too small, so that chromatic aberration is hard to correct.

Also, in a zoom optical system according to the present invention, it is preferred that the fourth lens group consists of only one lens element.

Accordingly, when the zoom optical system according to the present invention has such a constitution, it is possible to thin the thickness of the fourth lens group. As a result, the total length of the zoom optical system can be easily made to become short in the both states of the zoom optical system retracting and not retracting.

Also, when the fourth lens group consists of only one lens element in the zoom optical system according to the present invention, it is preferred that the fourth lens group consists of only one positive singly lens.

Accordingly, when the zoom optical system according to the present invention has such a constitution, it is possible to thin the thickness of the fourth lens group more. As a result, the total length of the zoom optical system can be easily made to become shorter in the both states of the zoom optical system retracting and not retracting. In addition, the shape factor of this one positive single lens has a positive value. That is to say, the radius of curvature of the image-side surface of the positive single lens is smaller than that of the object-side surface of the positive single lens, so that the angle between light flux incident on the image-side surface and the normal to the image-side surface becomes small, and it is hard for aberrations to occur.

Also, in a zoom optical system according to the present invention, it is preferred that the following condition (12) is satisfied:

$$0 \leq |\Delta V_{G4w} \cdot f_w| \leq 0.1 \quad (12)$$

where $\Delta V_{G4w-t}=|V_{G4t}-V_{G4w}|$, $V_{G4}$ denotes the position of the fourth lens group in the wide angle end position, $V_{G4t}$ denotes the position of the fourth lens group in the telephoto end position, $f_w$ denotes the focal length of the whole of the optical system in the wide angle end position, and the sign of $\Delta V_{G4w-t}$ is regarded as positive when the fourth lens group moves from the image side to the object side.

As described above, it is preferred that the zoom optical system according to the present invention is formed in such a way that the condition (12) is satisfied in the zoom optical system, that is to say, changes in the positions of the fourth lens group in the wide angle end position and the telephoto end position becomes very small. Accordingly, when the zoom optical system according to the present invention has such a constitution, variation in curvature of image in changing a magnification can be easily made to become small.

Besides, if $|\Delta V_{G4w-t}/f_w|$ is beyond the upper limit of the condition (12), the movement distance of the fourth lens group becomes too large, so that the total length of the zoom optical system is apt to become long. In addition, the variation in curvature of image in changing a magnification easily becomes large.

Also, in a zoom optical system according to the present invention, it is preferred that the fourth lens group does not move in changing a magnification from the wide angle end position to the telephoto end position.

Accordingly, when the zoom optical system according to the present invention has such a constitution, the variation in curvature of image in changing a magnification can be easily made to become small because the fourth lens group does not move in changing a magnification from the wide angle end position to the telephoto end position.

In addition, when the zoom optical system has such a constitution, the zoom optical system does not require a mechanism for moving the fourth lens group. Besides, even in the case where the fourth lens group is used for focus, the fourth lens group is moved only in the case of making the zoom optical system in focus, so that a simple mechanism for moving the fourth lens group is sufficient for the zoom optical system. As a result, it is possible to downsize lens barrel, motor, and so on, and the whole of the optical system can be easily downsized.

Also, an electronic pickup apparatus according to the present invention is characterized in that the electronic pickup apparatus includes one of the above-described zoom optical systems.

As described above, a zoom optical system according to the present invention has a high power, the total length of the zoom optical system is short in the both states of the zoom optical system retracting and not retracting, various aberrations are corrected well in the zoom optical system, and variations in various aberrations are small in changing a magnification from the wide angle end position to the telephoto end position. As a result, when such an optical system is used for an electronic pickup apparatus, it is possible to obtain a high image quality, and it is possible to obtain an electronic pickup apparatus which is thin and has a high power.

The embodiments 1 to 8 of a zoom optical system according to the present invention will be explained below with the diagrams referred to.

Besides, subscript numerals in $r_1, r_2, \ldots$ and $d_1, d_2, \ldots$ in sectional views of the optical systems correspond to surface numbers, 1, 2, ... in numerical value data, respectively.

Also, in the numerical value data to lenses in each of the following embodiments, s denotes a surface number, r denotes the radius of curvature of each surface, d denotes spacing between the surfaces, nd denotes the refractive index relating to the d line (wavelength: 587.56 nm), vd denotes the Abbe's number relating to the d line, k denotes a conic constant, and $A_4$, $A_6$, $A_8$, $A_{10}$, and $A_{12}$ denote an aspherical coefficient. In addition, lens surfaces the surface numbers of which are marked with "*" are aspherical surfaces.

Also, in the data for the aspherical surface coefficients in the following numerical value data, E denotes a power of ten. For example, "E-10" denotes "ten to the power of minus one". In addition, the shape of each aspherical surface is expressed by the following equation with aspherical coefficients for each embodiment:

$$Z=(Y^2/r)/[1+\{1-(1+k)(Y/r)^2\}^{1/2}]+A_4Y^4+A_6Y^6+A_8Y^8+A_{10}Y^{10}+A_{12}Y^{12}+\ldots$$

where, the direction from the object side to the image side is regarded as positive, Z is taken as a coordinate in the direction along the optical axis, and Y is taken as a coordinate in the direction perpendicular to the optical axis.

Embodiment 1

The zoom optical system according to the embodiment 1 will be explained below in detail using FIGS. 1 to 4.

Figure 1B:
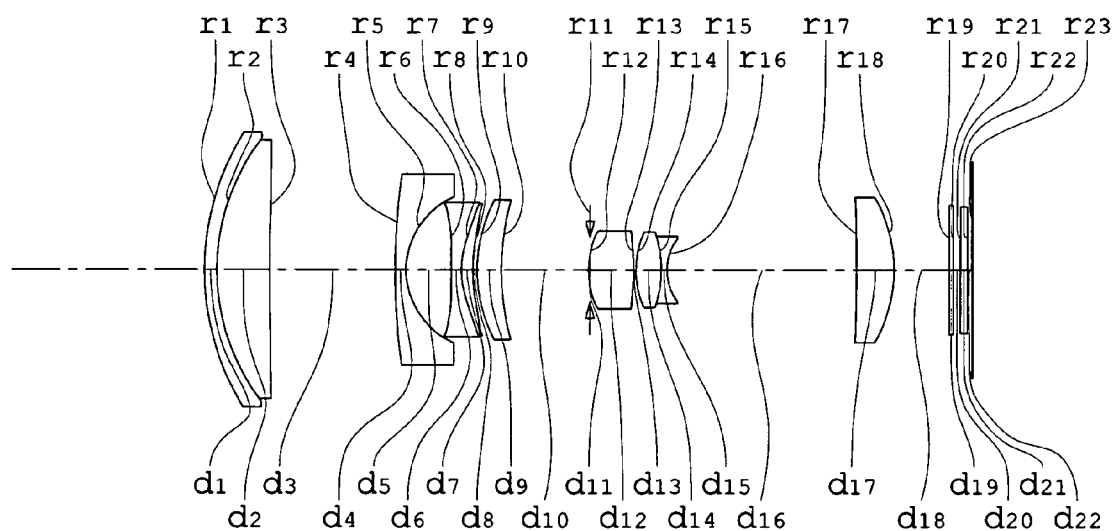
Figure 1C:
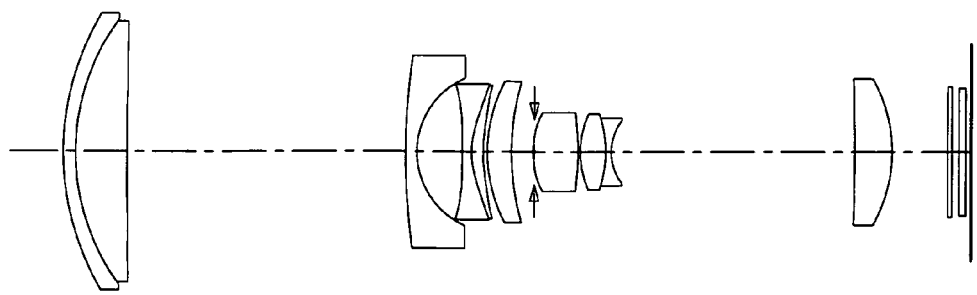
Figure 4A:
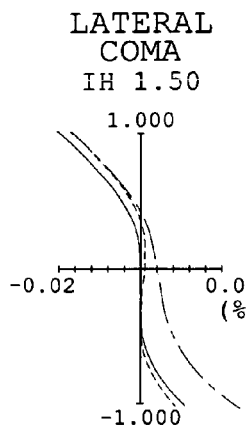
FIGS. 4A-4D, 4E-4H, and 4I-4L are diagrams showing lateral coma in the wide-angle end, middle, and telephoto end positions, respectively, in infinite objective point focusing of the zoom optical system shown in FIG. 1.
Figure 4B:
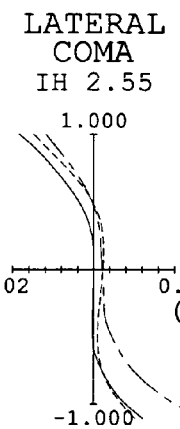
Figure 4C:
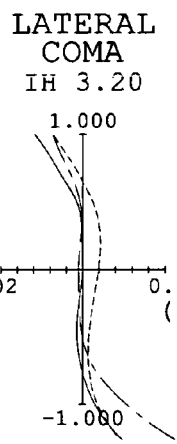
Figure 4D:
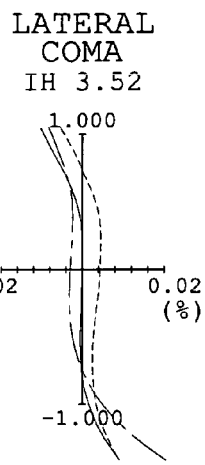
Figure 4E:
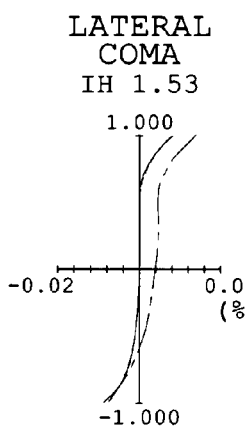
Figure 4F:
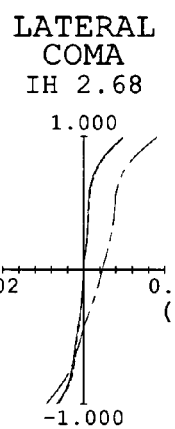
Figure 4G:
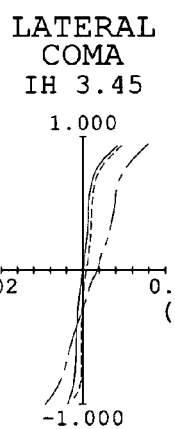
Figure 4H:
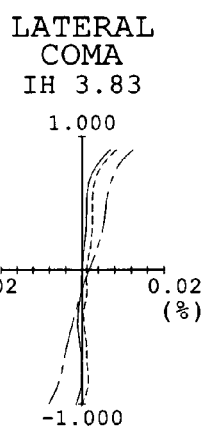
Figure 4I:
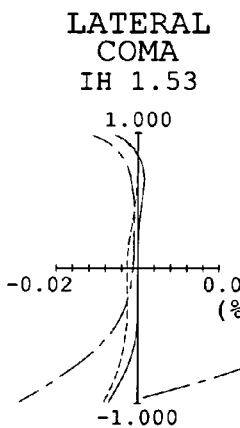
Figure 4J:
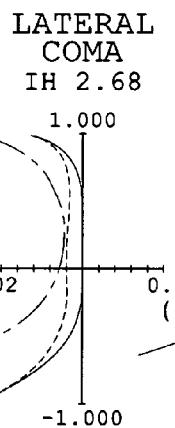
Figure 4K:
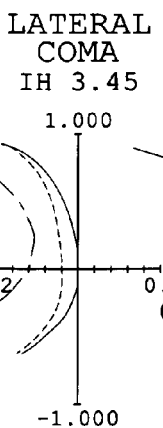
Figure 4L:
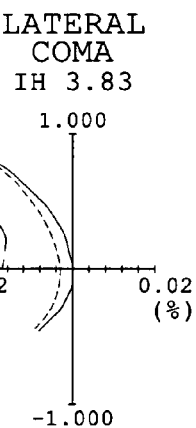

FIGS. 1A, 1B, and 1C are sectional views showing optical constitutions, developed along the optical axis, in the wide-angle end, middle, and telephoto end positions, respectively, in infinite object point focusing of a zoom optical system according to the present embodiment. FIGS. 2A-2D, 2E-2H, and 2I-2L are diagrams showing aberration characteristics in the wide-angle end, middle, and telephoto end positions, respectively, in infinite objective point focusing of the zoom optical system shown in FIG. 1. FIGS. 3A-3D, 3E-3H, and 3I-3L are diagrams showing coma in the wide-angle end, middle, and telephoto end positions, respectively, in infinite objective point focusing of the zoom optical system shown in FIG. 1. FIGS. 4A-4D, 4E-4H, and 4I-4L are diagrams showing lateral coma in the wide-angle end, middle, and telephoto end positions, respectively, in infinite objective point focusing of the zoom optical system shown in FIG. 1.

First, the optical constitution of the zoom optical system of the present embodiment will be explained using FIG. 1. Besides, a lens shape in the explanations of aspherical lenses means the shape of aspherical lens in the vicinity of the optical axis of the light ray from the object side ahead.

The zoom optical system of the present embodiment comprises, in order from the object side, a positive first lens group $G_1$, a negative second lens group $G_2$, a positive third lens group $G_3$, and a positive fourth lens group $G_4$ which are arranged on the optical axis Lc. Also, an aperture stop S which moves integratedly with the third lens group $G_3$ is provided on the object side of the third lens group $G_3$. Besides, a low-pass filter LF, a CCD cover glass CG, and an image sensor having an imaging plane IM are arranged in that order from the object side and on the image side of the fourth lens group $G_4$.

The first lens group $G_1$ comprises only a positive cemented lens which consists of, in order from the object side, a lens $L_{11}$ that is a negative meniscus lens the convex surface of which faces toward the object side, and a lens $L_{12}$ that is a biconvex lens the image-side surface of which is aspherical.

The second lens group $G_2$ comprises in order from the object side: a lens $L_{21}$ which is a negative meniscus lens the convex surface of which faces toward the object side; a negative cemented lens which consists of a lens $L_{22}$ that is a negative meniscus lens the both surfaces of which are aspherical and the convex surface of which faces toward the object side, and a lens $L_{23}$ that is a positive meniscus lens the both surfaces of which are aspherical and the convex surface of which faces toward the object side; and a lens $L_{24}$ which is a positive meniscus lens the convex surface of which faces toward the object side.

The third lens group $G_3$ comprises in order from the object side: a lens $L_{31}$ which is a biconvex lens the both surfaces of which are aspherical; and a negative cemented lens which consists of a lens $L_{32}$ that is a biconvex lens, and a lens $L_{33}$ that is a biconcave lens.

Besides, all the surfaces of the cemented lens in the third lens group $G_3$ are spherical, so that the lenses $L_{32}$ and $L_{33}$ which the cemented lens is composed of can be made by polishing and are cheaper than an aspherical lens which is made by glass forming process or the like.

The fourth lens group $G_4$ comprises only a lens $L_{41}$ which is a biconvex lens the both surfaces of which are aspherical.

Next, the movement of each of the lens groups in the zoom optical system of the present embodiment in changing a magnification will be explained.

In changing a magnification from the wide-angle end position to the telephoto end position, the first lens group $G_1$ moves toward the object side. The second lens group $G_2$ reciprocates on the optical axis Lc in such a way that the second lens group $G_2$ first moves toward the object side and then moves toward the image side, with the distance between the first lens group $G_1$ and the second lens group $G_2$ being widened. The third lens group $G_3$, together with the aperture stop S, moves toward the object side on the optical axis Lc, with the distance between the second lens group $G_2$ and the third lens group $G_3$ being narrowed. The fourth lens group $G_4$ reciprocates on the optical axis Lc in such a way that the fourth lens group $G_4$ first moves toward the image side and then moves toward the object side, with the distance between the third lens group $G_3$ and the fourth lens group $G_4$ being widened.

The numerical value data to the lenses constituting the zoom optical system of the present embodiment are as follows:

Numerical value data 1
Unit: millimeter (mm)

Surface data

| Surface No. | r | d | nd | vd | Effective radius |
|---|---|---|---|---|---|
| Object plane | ∞ | ∞ | | | |
| 1 | 20.0151 | 0.9000 | 1.94595 | 17.98 | 9.600 |
| 2 | 16.5455 | 3.8000 | 1.59201 | 67.02 | 9.123 |
| 3* | −608.4103 | D3 | | | 8.850 |
| 4 | 50.2354 | 0.8000 | 1.88300 | 40.76 | 6.508 |
| 5 | 5.9863 | 3.2849 | | | 4.717 |
| 6* | 5620.2668 | 0.7000 | 1.69350 | 53.21 | 4.545 |
| 7* | 6.1973 | 0.8500 | 1.63387 | 23.38 | 4.432 |
| 8* | 13.2950 | 0.3000 | | | 4.419 |
| 9 | 11.1530 | 1.7900 | 1.92286 | 18.90 | 4.451 |
| 10 | 18.9979 | D10 | | | 4.700 |
| 11 (Stop) | ∞ | −0.1000 | | | 2.317 |
| 12* | 6.1358 | 3.3200 | 1.59201 | 67.02 | 2.395 |
| 13* | −13.3699 | 0.1400 | | | 2.356 |
| 14 | 6.9314 | 1.8800 | 1.49700 | 81.54 | 2.270 |
| 15 | −8.5935 | 0.3900 | 1.61293 | 37.00 | 2.027 |
| 16 | 3.8417 | D16 | | | 1.850 |
| 17* | 58542.8664 | 2.7200 | 1.53071 | 55.69 | 4.693 |
| 18* | −11.2254 | D18 | | | 4.869 |
| 19 | ∞ | 0.3000 | 1.51633 | 64.14 | 4.264 |
| 20 | ∞ | 0.5000 | | | 4.241 |
| 21 | ∞ | 0.5000 | 1.51633 | 64.14 | 4.193 |
| 22 | ∞ | 0.3700 | | | 4.162 |
| Image plane | ∞ | | | | |

-continued

Numerical value data 1
Unit: millimeter (mm)

Aspherical surface data

| Surface No. s | Radius of curvature r | Conic constant k |
|---|---|---|
| 3 | −608.410 | 0.000 |

Aspherical coefficients

| $A_4$ | $A_6$ | $A_8$ |
|---|---|---|
| 8.55615e−06 | −3.58742e−09 | −7.49370e−12 |

| $A_{10}$ | $A_{12}$ | |
|---|---|---|
| 2.26300e−13 | −1.46640e−15 | |

| Surface No. s | Radius of curvature r | Conic constant k |
|---|---|---|
| 6 | 5620.267 | 0.000 |

Aspherical coefficients

| $A_4$ | $A_6$ | $A_8$ |
|---|---|---|
| −1.32033e−03 | 2.12952e−05 | −1.78021e−07 |

| $A_{10}$ | $A_{12}$ | |
|---|---|---|
| 1.18290e−08 | −2.17830e−10 | |

| Surface No. s | Radius of curvature r | Conic constant k |
|---|---|---|
| 7 | 6.197 | 0.000 |

Aspherical coefficients

| $A_4$ | $A_6$ | $A_8$ |
|---|---|---|
| −2.71239e−03 | 2.66916e−05 | −1.63840e−08 |

| Surface No. s | Radius of curvature r | Conic constant k |
|---|---|---|
| 8 | 13.295 | 0.000 |

Aspherical coefficients

| $A_4$ | $A_6$ | $A_8$ |
|---|---|---|
| −1.27786e−03 | 2.66916e−05 | −1.63840e−08 |

| Surface No. s | Radius of curvature r | Conic constant k |
|---|---|---|
| 12 | 6.136 | 0.000 |

Aspherical coefficients

| $A_4$ | $A_6$ | $A_8$ |
|---|---|---|
| −4.75567e−04 | −1.36226e−05 | 1.26882e−06 |

| $A_{10}$ | $A_{12}$ | |
|---|---|---|
| −1.30670e−07 | 4.87140e−09 | |

| Surface No. s | Radius of curvature r | Conic constant k |
|---|---|---|
| 13 | −13.370 | 0.000 |

-continued

Numerical value data 1
Unit: millimeter (mm)

Aspherical coefficients

| $A_4$ | $A_6$ | $A_8$ |
|---|---|---|
| 4.07860e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 17 | 58542.866 | 0.000 |

Aspherical coefficients

| $A_4$ | $A_6$ |
|---|---|
| −1.35928e−06 | −8.57460e−07 |

| Surface No. s | Radius of curvature r | Conic constant k |
|---|---|---|
| 18 | −11.225 | 0.000 |

Aspherical coefficients

| $A_4$ | $A_6$ | $A_8$ |
|---|---|---|
| −4.46926e−05 | −2.76328e−06 | 1.10000e−08 |

Various data
Zoom ratio: 11.518

| | Wide-angle end position | Middle position |
|---|---|---|
| Focal length | 5.086 | 17.107 |
| F-number | 3.257 | 5.446 |
| Toatal angle of view | 75.610 | 25.785 |
| Image height | 3.830 | 3.830 |
| Total length of lens | 43.802 | 55.487 |
| Back focus | 5.994 | 5.388 |
| The distance from object | ∞ | ∞ |
| D3 | 0.300 | 9.064 |
| D10 | 13.620 | 6.523 |
| D16 | 3.113 | 13.737 |
| D18 | 4.596 | 3.991 |
| The radius of stop | 2.317 | 2.317 |
| Entrance pupil position | 11.878 | 32.211 |
| Exit pupil position | −11.283 | −120.092 |
| Position of front principal point | 15.467 | 46.986 |
| Position of rear principal point | −4.716 | −16.737 |

| | Telephoto end position | Position in which the focal length is ten times as large as that in the wide-angle end position |
|---|---|---|
| Focal length | 58.579 | 50.601 |
| F-number | 6.300 | 6.252 |
| Total angle of view | 7.716 | 8.940 |
| Image height | 3.830 | 3.830 |
| Total length of lens | 65.719 | 65.463 |
| Back focus | 5.412 | 5.516 |
| The distance from object | ∞ | ∞ |
| D3 | 20.197 | 19.281 |
| D10 | 1.685 | 2.459 |
| D16 | 17.650 | 17.431 |
| D18 | 4.015 | 4.119 |
| The radius of stop | 2.317 | 2.317 |
| Entrance pupil position | 108.820 | 97.193 |
| Exit pupil position | 620.677 | 869.645 |
| Position of front principal point | 172.977 | 151.757 |
| Position of rear principal point | −58.209 | −50.231 |

-continued

Numerical value data 1
Unit: millimeter (mm)

Single lens data

| Single lens | Object-side surface of lens | Focal length |
|---|---|---|
| $L_{11}$ | 1 | −115.459 |
| $L_{12}$ | 2 | 27.270 |
| $L_{21}$ | 4 | −7.763 |
| $L_{22}$ | 6 | −8.947 |
| $L_{23}$ | 7 | 17.501 |
| $L_{24}$ | 9 | 26.378 |
| $L_{31}$ | 12 | 7.584 |
| $L_{32}$ | 14 | 8.043 |
| $L_{33}$ | 15 | −4.280 |
| $L_{41}$ | 17 | 21.148 |

Zoom lens group data

| Lens group | Object-side surface of lens group | Focal length of lens group | Total length of lens group |
|---|---|---|---|
| $G_1$ | 1 | 36.727 | 4.700 |
| $G_2$ | 4 | −6.054 | 7.725 |
| $G_3$ | 11 | 9.945 | 5.630 |
| $G_4$ | 17 | 21.148 | 2.720 |

| Lens group | Position of front principal point | Position of rear principal point |
|---|---|---|
| $G_1$ | −0.261 | −3.112 |
| $G_2$ | 1.196 | −4.151 |
| $G_3$ | −3.334 | −4.964 |
| $G_4$ | 1.777 | −0.000 |

Magnification of lens group

| | Wide-angle end position | Middle position |
|---|---|---|
| $G_1$ | 0.000 | 0.000 |
| $G_2$ | −0.232 | −0.350 |
| $G_3$ | −0.832 | −1.786 |
| $G_4$ | 0.717 | 0.745 |

| | Telephoto end position | Position in which the focal length is ten times as large as that in the wide-angle end position |
|---|---|---|
| $G_1$ | 0.000 | 0.000 |
| $G_2$ | −0.981 | −0.855 |
| $G_3$ | −2.184 | −2.181 |
| $G_4$ | 0.744 | 0.739 |

Data regarding the above conditions

Condition (1)

$\Delta D_{w-w10}/L_t$: 0.288
Conditions (2), (3)

$SF_{G4} = (r_{G4o} + r_{G4i})/(r_{G4o} - r_{G4i})$: 1.000
Conditions (4), (5)

$SF_{G1o-G4i} = (r_{G1o} + r_{G4i})/(r_{G1o} - r_{G4i})$: 0.281
Condition (6)

$\phi_{G2n2}/\phi_{G2n1}$: 0.868
Condition (7)

$|\phi_{G2p2}/\phi_{G2n1}|$: 0.443
Condition (8)

$nd_{G2n2} - nd_{G2p1}$: 0.060
Condition (9)

$vd_{G2n2} - vd_{G2p1}$: 29.83
Condition (10)

$\Delta V_{G2w-m}/\Delta V_{G2m-t}$: −3.24

-continued

Numerical value data 1
Unit: millimeter (mm)

Condition (11)

$(ASP_{22c} \times |\Delta vd_{22}|)/(ASP_{22o} + ASP_{22i})$: 39.0
Condition (12)

$|\Delta V_{G4w-t}/f_w|$: 0.013

Embodiment 2

The zoom optical system according to the embodiment 2 will be explained below in detail using FIGS. 5 to 8. Besides, because the optical constitution of the zoom optical system and the movement of each of the lens groups in changing a magnification in the present embodiment are approximately the same as those in the embodiment 1, components in the present embodiment which have approximately the same constitutions as components in the embodiment 1 have are given the same reference numeral respectively, and the detailed explanation of those components is omitted.

Figure 5A:
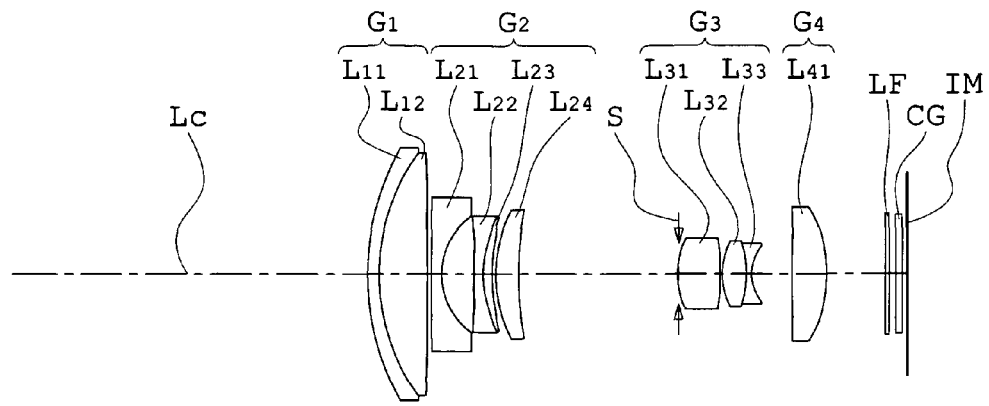
FIGS. 5A, 5B, and 5C are sectional views showing optical constitutions, developed along the optical axis, in the wide-angle end, middle, and telephoto end positions, respectively, in infinite object point focusing of a zoom optical system according to the embodiment 2 of the present invention.
Figure 5B:
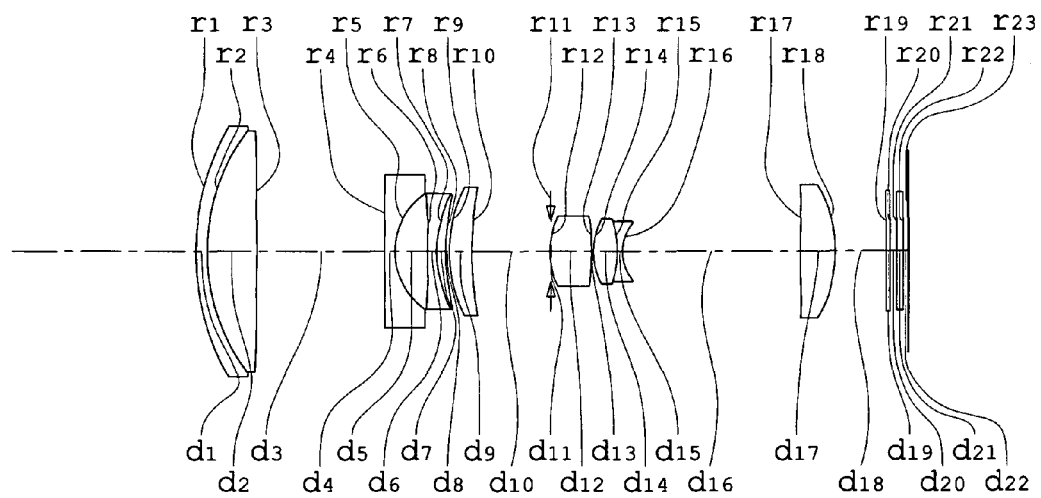
Figure 5C:
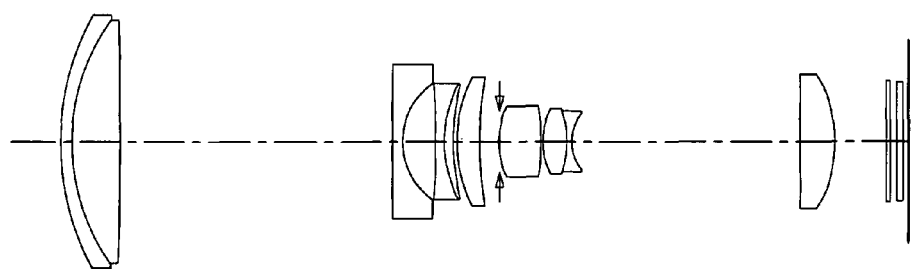

Besides, FIGS. 5A, 5B, and 5C are sectional views showing optical constitutions, developed along the optical axis, in the wide-angle end, middle, and telephoto end positions, respectively, in infinite object point focusing of the zoom optical system according to the present embodiment. FIGS. 6A-6D, 6E-6H, and 6I-6L are diagrams showing aberration characteristics in the wide-angle end, middle, and telephoto end positions, respectively, in infinite objective point focusing of the zoom optical system shown in FIG. 5. FIGS. 7A-7D, 7E-7H, and 7I-7L are diagrams showing coma in the wide-angle end, middle, and telephoto end positions, respectively, in infinite objective point focusing of the zoom optical system shown in FIG. 5. FIGS. 8A-8D, 8E-8H, and 8I-8L are diagrams showing lateral coma in the wide-angle end, middle, and telephoto end positions, respectively, in infinite objective point focusing of the zoom optical system shown in FIG. 5.

The numerical value data to lenses constituting the zoom optical system of the present embodiment are as follows:

Numerical value data 2
Unit: millimeter (mm)

Surface data

| Surface No. | r | d | nd | vd | Effective radius |
|---|---|---|---|---|---|
| Object plane | ∞ | ∞ | | | |
| 1 | 20.8522 | 0.9000 | 1.92286 | 20.88 | 9.600 |
| 2 | 16.6388 | 3.8000 | 1.59201 | 67.02 | 9.105 |
| 3* | −235.3898 | D3 | | | 8.850 |
| 4 | 365.1222 | 0.8000 | 1.88300 | 40.76 | 5.695 |
| 5 | 5.6598 | 2.5701 | | | 4.251 |
| 6* | 26151.9145 | 0.7000 | 1.74250 | 49.27 | 4.183 |
| 7* | 8.1614 | 0.7164 | 1.63387 | 23.38 | 4.140 |
| 8* | 13.5155 | 0.3000 | | | 4.141 |
| 9 | 11.2152 | 1.7900 | 1.92286 | 18.90 | 4.206 |
| 10 | 28.4287 | D10 | | | 4.700 |
| 11 (Stop) | ∞ | −0.1000 | | | 2.321 |
| 12* | 6.0735 | 3.3200 | 1.59201 | 67.02 | 2.411 |
| 13* | −16.2836 | 0.1400 | | | 2.365 |
| 14 | 5.7093 | 1.8800 | 1.49700 | 81.54 | 2.288 |
| 15 | −8.5126 | 0.3900 | 1.61293 | 37.00 | 2.049 |
| 16 | 3.5665 | D16 | | | 1.850 |
| 17* | 15198.3952 | 2.7200 | 1.53071 | 55.69 | 4.698 |
| 18* | −10.6465 | D18 | | | 4.883 |
| 19 | ∞ | 0.3000 | 1.51633 | 64.14 | 4.279 |
| 20 | ∞ | 0.5000 | | | 4.261 |
| 21 | ∞ | 0.5000 | 1.51633 | 64.14 | 4.217 |
| 22 | ∞ | 0.4100 | | | 4.193 |
| Image plane | ∞ | | | | |

Aspherical surface data

| Surface No. s | Radius of curvature r | Conic constant k |
|---|---|---|
| 3 | −235.390 | 0.000 |

Aspherical coefficients

| $A_4$ | $A_6$ | $A_8$ |
|---|---|---|
| 8.44752e−06 | −7.65080e−09 | −7.49370e−12 |

| $A_{10}$ | $A_{12}$ |
|---|---|
| 2.26300e−13 | −1.46640e−15 |

| Surface No. s | Radius of curvature r | Conic constant k |
|---|---|---|
| 6 | 26151.915 | 0.000 |

Aspherical coefficients

| $A_4$ | $A_6$ | $A_8$ |
|---|---|---|
| −5.95515e−04 | 1.04365e−05 | −3.25540e−07 |

| $A_{10}$ | $A_{12}$ |
|---|---|
| 1.18290e−08 | −2.17830e−10 |

| Surface No. s | Radius of curvature r | Conic constant k |
|---|---|---|
| 7 | 8.161 | 0.000 |

Aspherical coefficients

| $A_4$ | $A_6$ |
|---|---|
| −7.36856e−04 | 5.17862e−06 |

| Surface No. s | Radius of curvature r | Conic constant k |
|---|---|---|
| 8 | 13.515 | 0.000 |

Aspherical coefficients

| $A_4$ | $A_6$ |
|---|---|
| −7.36856e−04 | 5.17862e−06 |

| Surface No. s | Radius of curvature r | Conic constant k |
|---|---|---|
| 12 | 6.074 | 0.000 |

Aspherical coefficients

| $A_4$ | $A_6$ | $A_8$ |
|---|---|---|
| −3.15931e−04 | −1.13586e−05 | 9.94380e−07 |

| $A_{10}$ | $A_{12}$ |
|---|---|
| −1.30670e−07 | 4.87140e−09 |

-continued

Numerical value data 2
Unit: millimeter (mm)

| Surface No. s | Radius of curvature r | Conic constant k |
|---|---|---|
| 13 | −16.284 | 0.000 |

Aspherical coefficients

| $A_4$ | $A_6$ | $A_8$ |
|---|---|---|
| 4.76102e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 17 | 15198.395 | 0.000 |

Aspherical coefficients

| $A_4$ | $A_6$ |
|---|---|
| −1.67790e−05 | −8.57460e−07 |

| Surface No. s | Radius of curvature r | Conic constant k |
|---|---|---|
| 18 | −10.646 | 0.000 |

Aspherical coefficients

| $A_4$ | $A_6$ | $A_8$ |
|---|---|---|
| 1.45469e−05 | −1.98510e−06 | 1.10000e−08 |

Various data
Zoom ratio: 11.525

| | wide-angle end position | Middle position |
|---|---|---|
| Focal length | 5.096 | 17.159 |
| F-number | 3.266 | 5.452 |
| Total angle of view | 75.469 | 25.238 |
| Image height | 3.830 | 3.830 |
| Total length of lens | 41.957 | 55.165 |
| Back focus | 5.979 | 5.341 |
| The distance from object | ∞ | ∞ |
| D3 | 0.300 | 9.861 |
| D10 | 12.583 | 6.212 |
| D16 | 3.168 | 13.824 |
| D18 | 4.542 | 3.904 |
| The radius of stop | 2.321 | 2.321 |
| Entrance pupil position | 10.636 | 32.341 |
| Exit pupil position | −11.626 | −177.623 |
| Position of front principal point | 14.257 | 47.891 |
| Position of rear principal point | −4.686 | −16.749 |

| | Telephoto end position | Position in which the focal length is ten times as large as that in the wide-angle end position |
|---|---|---|
| Focal length | 58.731 | 50.642 |
| F-number | 6.300 | 6.082 |
| Total angle of view | 7.561 | 8.731 |
| Image height | 3.830 | 3.830 |
| Total length of lens | 65.758 | 65.491 |
| Back focus | 5.373 | 6.446 |
| The distance from object | ∞ | ∞ |
| D3 | 21.131 | 20.323 |
| D10 | 1.598 | 2.035 |
| D16 | 17.730 | 16.761 |
| D18 | 3.935 | 5.008 |
| The radius of stop | 2.321 | 2.321 |
| Entrance pupil position | 110.693 | 100.267 |
| Exit pupil position | 234.777 | 465.261 |
| Position of front principal point | 184.461 | 156.653 |
| Position of rear principal point | −58.321 | −44.323 |

Single lens data

| Single lens | Object-side surface of lens | Focal length |
|---|---|---|
| $L_{11}$ | 1 | −99.420 |
| $L_{12}$ | 2 | 26.398 |
| $L_{21}$ | 4 | −6.517 |
| $L_{22}$ | 6 | −10.995 |
| $L_{23}$ | 7 | 30.898 |
| $L_{24}$ | 9 | 19.117 |
| $L_{31}$ | 12 | 7.909 |
| $L_{32}$ | 14 | 7.192 |
| $L_{33}$ | 15 | −4.051 |
| $L_{41}$ | 17 | 20.048 |

Zoom lens group data

| Lens group | Object-side surface of lens group | Focal length of lens group | Total length of lens group |
|---|---|---|---|
| $G_1$ | 1 | 36.902 | 4.700 |
| $G_2$ | 4 | −5.951 | 6.877 |
| $G_3$ | 11 | 9.729 | 5.630 |
| $G_4$ | 17 | 20.048 | 2.720 |

| Lens group | Position of front principal point | Position of rear principal point |
|---|---|---|
| $G_1$ | −0.076 | −2.947 |
| $G_2$ | 0.660 | −4.219 |
| $G_3$ | −3.454 | −4.963 |
| $G_4$ | 1.776 | −0.001 |

Magnification of lens group

| | Wide-angle end position | Middle position |
|---|---|---|
| $G_1$ | 0.000 | 0.000 |
| $G_2$ | −0.220 | −0.340 |
| $G_3$ | −0.894 | −1.862 |
| $G_4$ | 0.702 | 0.734 |

| | Telephoto end position | Position in which the focal length is ten times as large as that in the wide-angle end position |
|---|---|---|
| $G_1$ | 0.000 | 0.000 |
| $G_2$ | −0.958 | −0.848 |
| $G_3$ | −2.270 | −2.392 |
| $G_4$ | 0.732 | 0.678 |

Data regarding the above conditions

Condition (1)

$\Delta D_{w-w10}/L_t$: 0.303
Conditions (2), (3)

$SF_{G4} = (r_{G4o} + r_{G4i})/(r_{G4o} - r_{G4i})$: 0.999
Conditions (4), (5)

$SF_{G1o-G4i} = (r_{G1o} + r_{G4i})/(r_{G1o} - r_{G4i})$: 0.324
Condition (6)

$\phi_{G2n2}/\phi_{G2n1}$: 0.593
Condition (7)

$|\phi_{G2p2}/\phi_{G2n1}|$: 0.211
Condition (8)

$nd_{G2n2} - nd_{G2p1}$: 0.109

-continued

Numerical value data 2
Unit: millimeter (mm)

Condition (9)

$vd_{G2n2} - vd_{G2p1}$: 25.89
Condition (10)

$\Delta V_{G2w-m}/\Delta V_{G2m-t}$: −5.39
Condition (11)

$(ASP_{22c} \times |\Delta vd_{22}|)/(ASP_{22o} - ASP_{22i})$: 15.0
Condition (12)

$|\Delta V_{G4w-t}/f_w|$: 0.014

Embodiment 3

The zoom optical system according to the embodiment 3 will be explained below in detail using FIGS. 9 to 12. Besides, because the optical constitution of the zoom optical system and the movement of each of the lens groups in changing a magnification in the present embodiment are approximately the same as those in the embodiments 1 and 2, components in the present embodiment which have approximately the same constitutions as components in the embodiments 1 and 2 have are given the same reference numeral respectively, and the detailed explanation of those components is omitted.

Figure 9A:
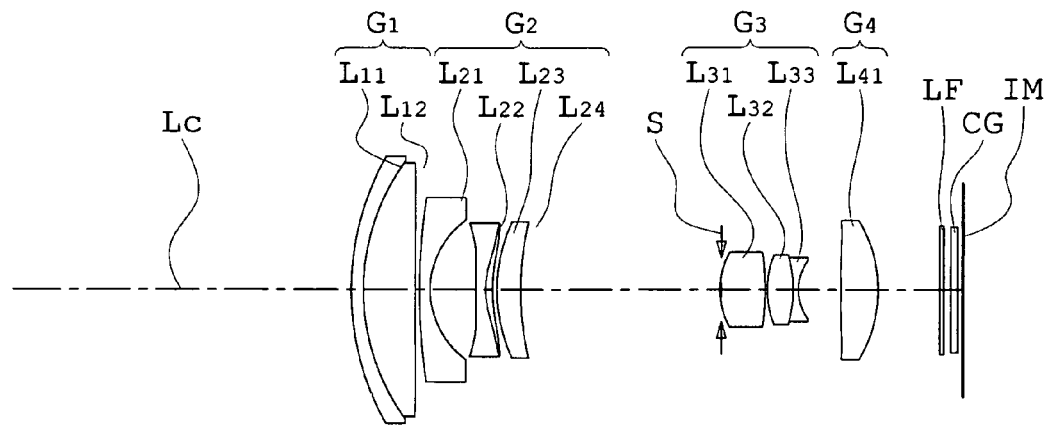
FIGS. 9A, 9B, and 9C are sectional views showing optical constitutions, developed along the optical axis, in the wide-angle end, middle, and telephoto end positions, respectively, in infinite object point focusing of a zoom optical system according to the embodiment 3 of the present invention.
Figure 9B:
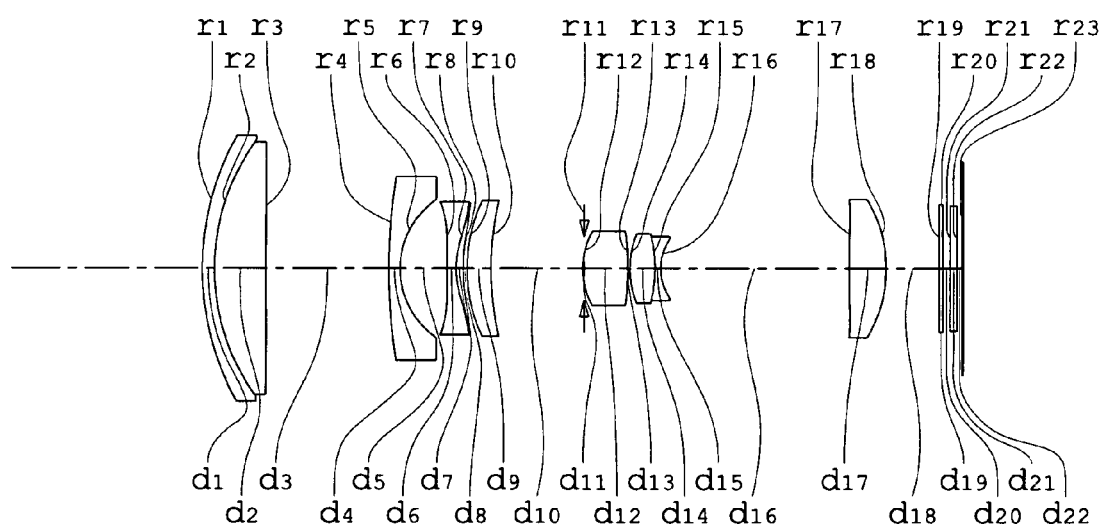
Figure 9C:
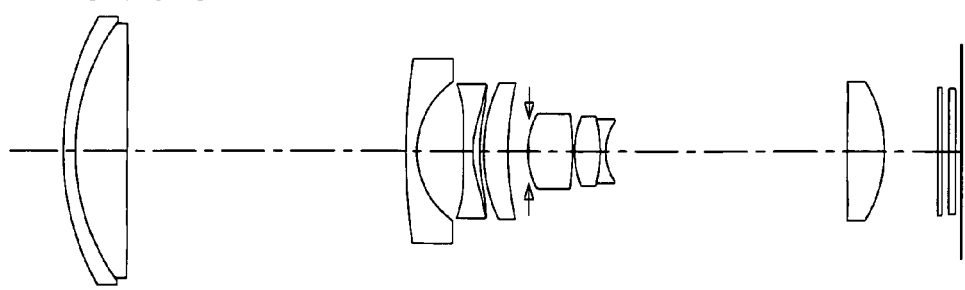

Besides, FIGS. 9A, 9B, and 9C are sectional views showing optical constitutions, developed along the optical axis, in the wide-angle end, middle, and telephoto end positions, respectively, in infinite object point focusing of the zoom optical system according to the present embodiment. FIGS. 10A-10D, 10E-10H, and 10I-10L are diagrams showing aberration characteristics in the wide-angle end, middle, and telephoto end positions, respectively, in infinite objective point focusing of the zoom optical system shown in FIG. 9. FIGS. 11A-11D, 11E-11H, and 11I-11L are diagrams showing coma in the wide-angle end, middle, and telephoto end positions, respectively, in infinite objective point focusing of the zoom optical system shown in FIG. 9. FIGS. 12A-12D, 12E-12H, and 12I-12L are diagrams showing lateral coma in the wide-angle end, middle, and telephoto end positions, respectively, in infinite objective point focusing of the zoom optical system shown in FIG. 9.

The numerical value data to lenses constituting the zoom optical system of the present embodiment are as follows:

Numerical value data 3
Unit: millimeter (mm)

Surface data

| Surface No | r | d | nd | vd | Effective radius |
|---|---|---|---|---|---|
| Object plane | ∞ | ∞ | | | |
| 1 | 20.8017 | 0.9000 | 1.92286 | 20.88 | 9.600 |
| 2 | 16.6932 | 3.8000 | 1.59201 | 67.02 | 9.105 |
| 3* | −319.7700 | D3 | | | 8.850 |
| 4 | 46.1252 | 0.8000 | 1.88300 | 40.76 | 6.473 |
| 5 | 6.4033 | 3.4783 | | | 4.828 |
| 6* | 311235.9057 | 0.7000 | 1.74250 | 49.27 | 4.567 |
| 7* | 7.1050 | 0.5292 | 1.63387 | 23.38 | 4.481 |
| 8* | 13.6297 | 0.3000 | | | 4.478 |
| 9 | 11.9340 | 1.7900 | 1.92286 | 18.90 | 4.523 |
| 10 | 22.8900 | D10 | | | 4.700 |
| 11 (Stop) | ∞ | −0.1000 | | | 2.320 |
| 12* | 6.2026 | 3.3200 | 1.59201 | 67.02 | 2.390 |
| 13* | −14.1286 | 0.1400 | | | 2.339 |
| 14 | 7.1625 | 1.8800 | 1.49700 | 81.54 | 2.259 |
| 15 | −10.2598 | 0.3900 | 1.61293 | 37.00 | 2.015 |
| 16 | 3.8991 | D16 | | | 1.850 |
| 17* | 63517.1399 | 2.7200 | 1.53071 | 55.69 | 4.676 |
| 18* | −11.1448 | D18 | | | 4.855 |
| 19 | ∞ | 0.3000 | 1.51633 | 64.14 | 4.269 |
| 20 | ∞ | 0.5000 | | | 4.251 |
| 21 | ∞ | 0.5000 | 1.51633 | 64.14 | 4.205 |
| 22 | ∞ | 0.4100 | | | 4.175 |
| Image plane | ∞ | | | | |

Aspherical surface data

| Surface No. s | Radius of curvature r | Conic constant k |
|---|---|---|
| 3 | −319.770 | 0.000 |

Aspherical coeficients

| $A_4$ | $A_6$ | $A_8$ |
|---|---|---|
| 8.22246e−06 | −7.65080e−09 | −7.49370e−12 |

| $A_{10}$ | $A_{12}$ |
|---|---|
| 2.26300e−13 | −1.46640e−15 |

| Surface No. s | Radius of curvature r | Conic constant k |
|---|---|---|
| 6 | 311235.906 | 0.000 |

Aspherical coeficients

| $A_4$ | $A_6$ | $A_8$ |
|---|---|---|
| −1.65912e−03 | 2.92159e−05 | −1.86409e−07 |

| $A_{10}$ | $A_{12}$ |
|---|---|
| 1.18290e−08 | −2.17830e−10 |

| Surface No. s | Radius of curvature r | Conic constant k |
|---|---|---|
| 7 | 7.105 | 0.000 |

Aspherical coeficients

| $A_4$ | $A_6$ | $A_8$ |
|---|---|---|
| −2.62854e−03 | 3.59697e−05 | −3.84445e−08 |

| Surface No. s | Radius of curvature r | Conic constant k |
|---|---|---|
| 8 | 13.630 | 0.000 |

Aspherical coeficients

| $A_4$ | $A_6$ | $A_8$ |
|---|---|---|
| −1.55353e−03 | 3.59697e−05 | −3.84445e−08 |

| Surface No. s | Radius of curvature r | Conic constant k |
|---|---|---|
| 12 | 6.203 | 0.000 |

Aspherical coeficients

| $A_4$ | $A_6$ | $A_8$ |
|---|---|---|
| −4.28096e−04 | −1.14287e−05 | 1.26882e−06 |

Numerical value data 3
Unit: millimeter (mm)

| $A_{10}$ | $A_{12}$ |
|---|---|
| −1.30670e−07 | 4.87140e−09 |

| Surface No. s | Radius of curvature r | Conic constant k |
|---|---|---|
| 13 | −14.129 | 0.000 |

Aspherical coeficients

| $A_4$ | $A_6$ | $A_8$ |
|---|---|---|
| 4.52974e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 17 | 63517.140 | 0.000 |

Aspherical coeficients

| $A_4$ | $A_6$ |
|---|---|
| 4.15743e−06 | −8.57460e−07 |

| Surface No. s | Radius of curvature r | Conic constant k |
|---|---|---|
| 18 | −11.145 | 0.000 |

Aspherical coeficients

| $A_4$ | $A_6$ | $A_8$ |
|---|---|---|
| −5.47643e−05 | −1.45284e−06 | 1.10000e−08 |

Various data
Zoom ratio: 11.532

|  | Wide-angle end position | Middle position |
|---|---|---|
| Focal length | 5.096 | 17.165 |
| F-number | 3.253 | 5.438 |
| Total angle of view | 75.467 | 25.600 |
| Image height | 3.830 | 3.830 |
| Total length of lens | 44.927 | 55.669 |
| Back focus | 5.972 | 5.332 |
| The distance from object | ∞ | ∞ |
| D3 | 0.300 | 8.940 |
| D10 | 14.832 | 6.916 |
| D16 | 3.175 | 13.833 |
| D18 | 4.535 | 3.895 |
| The radius of stop | 2.320 | 2.320 |
| Entrance pupil position | 12.368 | 31.903 |
| Exit pupil position | −11.509 | −130.799 |
| Position of front principal point | 15.979 | 46.904 |
| Position of rear principal point | −4.686 | −16.755 |

|  | Telephoto end position | Position in which the focal length is ten times as large as that in the wide-angle end position |
|---|---|---|
| Focal length | 58.771 | 50.785 |
| F-number | 6.300 | 6.142 |
| Total angle of view | 7.667 | 8.870 |
| Image height | 3.830 | 3.830 |
| Total length of lens | 65.757 | 65.465 |
| Back focus | 5.360 | 5.956 |
| The distance from object | ∞ | ∞ |
| D3 | 20.406 | 19.550 |
| D10 | 1.600 | 2.281 |
| D16 | 17.742 | 17.031 |
| D18 | 3.922 | 4.518 |
| The radius of stop | 2.320 | 2.320 |
| Entrance pupil position | 105.916 | 96.660 |
| Exit pupil position | 459.647 | 1520.706 |
| Position of front principal point | 172.290 | 149.148 |
| Position of rear principal point | −58.361 | −44.830 |

Single lens data

| Single lens | Object-side surface of lens | Focal length |
|---|---|---|
| $L_{11}$ | 1 | −102.343 |
| $L_{12}$ | 2 | 26.911 |
| $L_{21}$ | 4 | −8.501 |
| $L_{22}$ | 6 | −9.569 |
| $L_{23}$ | 7 | 22.700 |
| $L_{24}$ | 9 | 25.053 |
| $L_{31}$ | 12 | 7.752 |
| $L_{32}$ | 14 | 8.802 |
| $L_{33}$ | 15 | −4.562 |
| $L_{41}$ | 17 | 20.996 |

Zoom lens group data

| Lens group | Object-side surface of lens group | Focal length of lens group | Total length of lens group |
|---|---|---|---|
| $G_1$ | 1 | 37.510 | 4.700 |
| $G_2$ | 4 | −6.453 | 7.597 |
| $G_3$ | 11 | 10.316 | 5.630 |
| $G_4$ | 17 | 20.996 | 2.720 |

| Lens group | Position of front principal point | Position of rear principal point |
|---|---|---|
| $G_1$ | −0.148 | −3.013 |
| $G_2$ | 1.257 | −4.124 |
| $G_3$ | −3.430 | −5.056 |
| $G_4$ | 1.777 | −0.000 |

Magnification of lens group

|  | Wide-angle end position | Middle position |
|---|---|---|
| $G_1$ | 0.000 | 0.000 |
| $G_2$ | −0.244 | −0.362 |
| $G_3$ | −0.779 | −1.696 |
| $G_4$ | 0.716 | 0.746 |

|  | Telephoto end position | Position in which the focal length is ten times as large as that in the wide-angle end position |
|---|---|---|
| $G_1$ | 0.000 | 0.000 |
| $G_2$ | −1.011 | −0.892 |
| $G_3$ | −2.080 | −2.119 |
| $G_4$ | 0.745 | 0.716 |

Data regarding the above conditions

Condition (1)

$\Delta D_{w-w10}/L_i$: 0.292
Conditions (2), (3)

$SF_{G4} = (r_{G4o} + r_{G4i})/(r_{G4o} - r_{G4i})$: 1.000
Conditions (4), (5)

$SF_{G1o-G4i} = (r_{G1o} + r_{G4i})/(r_{G1o} - r_{G4i})$: 0.302
Condition (6)

$\phi_{G2n2}/\phi_{G2n1}$: 0.889

-continued

Numerical value data 3
Unit: millimeter (mm)

Condition (7)

$|\phi_{G2p2}/\phi_{G2n1}|$: 0.375
Condition (8)

$nd_{G2n2} - nd_{G2p1}$: 0.109
Condition (9)

$vd_{G2n2} - vd_{G2p1}$: 25.89
Condition (10)

$\Delta V_{G2w-m}/\Delta V_{G2m-t}$: −1.52
Condition (11)

$(ASP_{22o} \times |\Delta vd_{22}|)/(ASP_{22o} + ASP_{22i})$: 25.7
Condition (12)

$|\Delta V_{G4w-t}/f_w|$: 0.014

Embodiment 4

The zoom optical system according to the embodiment 4 will be explained below in detail using FIGS. 13 to 16. Besides, because the optical constitution of the zoom optical system and the movement of each of the lens groups in changing a magnification in the present embodiment are approximately the same as those in the embodiments 1 to 3, components in the present embodiment which have approximately the same constitutions as components in the embodiments 1 to 3 have are given the same reference numeral respectively, and the detailed explanation of those components is omitted.

Figure 13A:
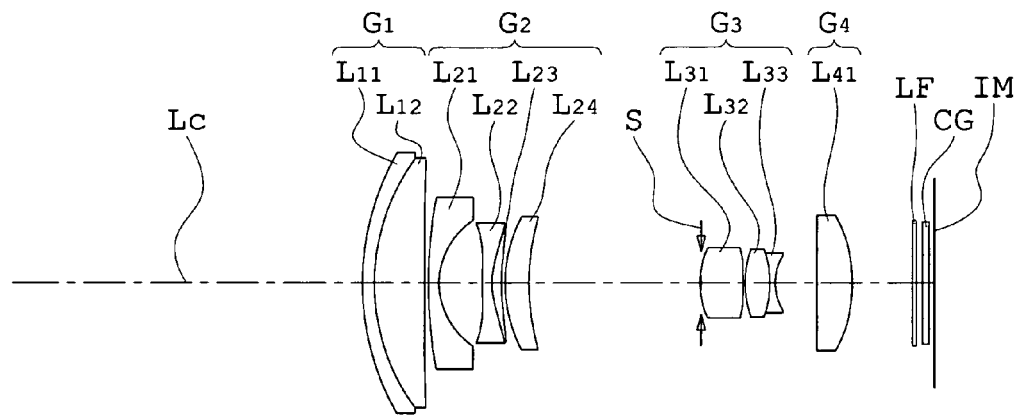
FIGS. 13A, 13B, and 13C are sectional views showing optical constitutions, developed along the optical axis, in the wide-angle end, middle, and telephoto end positions, respectively, in infinite object point focusing of a zoom optical system according to the embodiment 4 of the present invention.
Figure 13B:
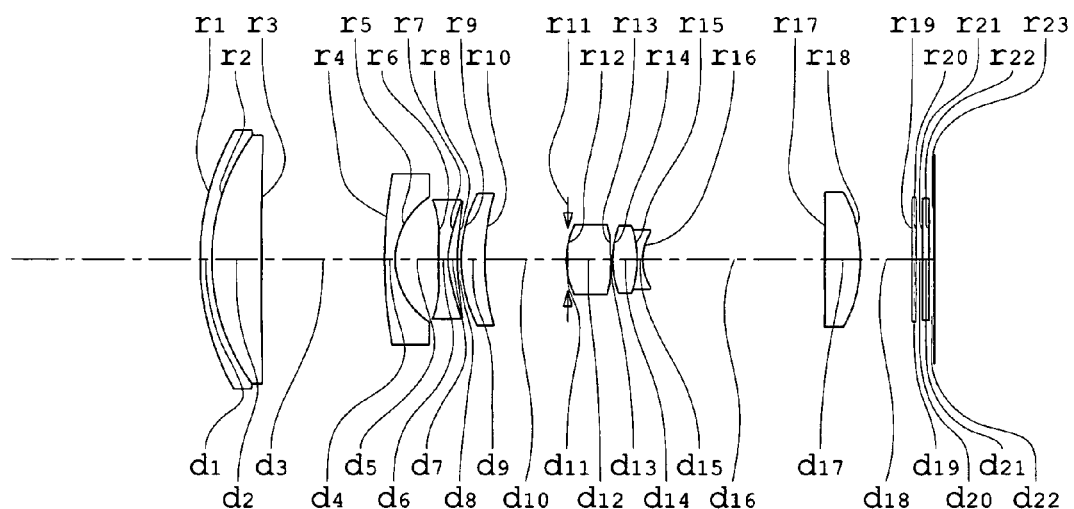
Figure 13C:
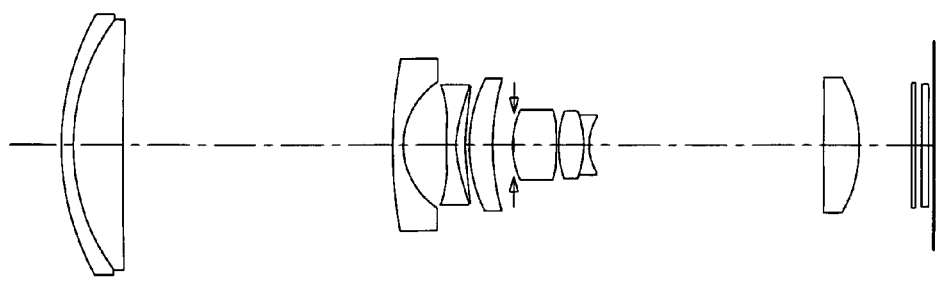
Figures 15A, 15B, 15C, 15D:
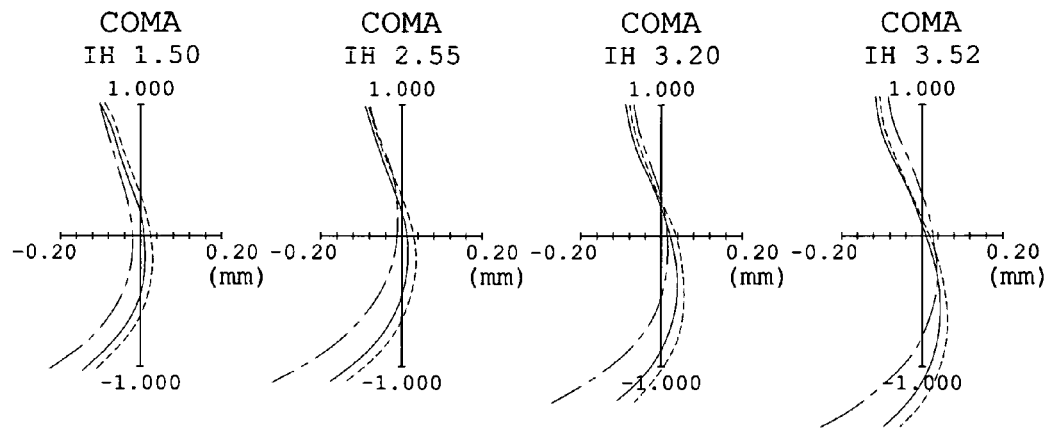
FIGS. 15A-15D, 15E-15H, and 15I-15L are diagrams showing coma in the wide-angle end, middle, and telephoto end positions, respectively, in infinite objective point focusing of the zoom optical system shown in FIG. 13.
Figures 15E, 15F, 15G, 15H:
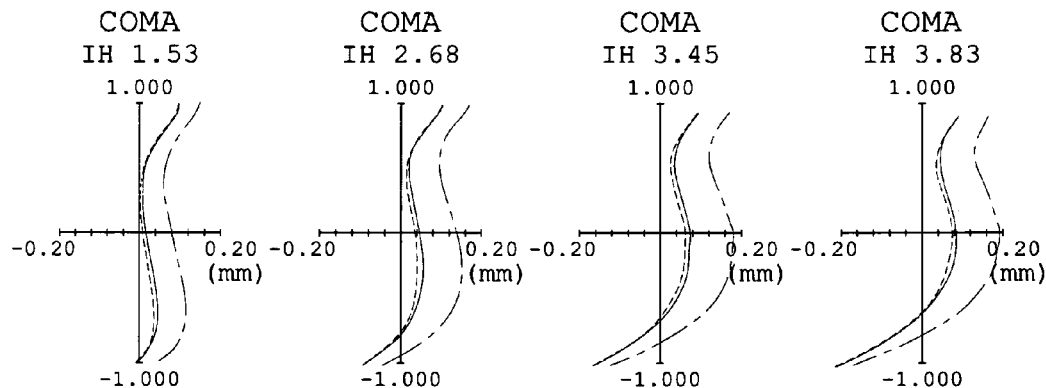
Figures 15I, 15J, 15K, 15L:
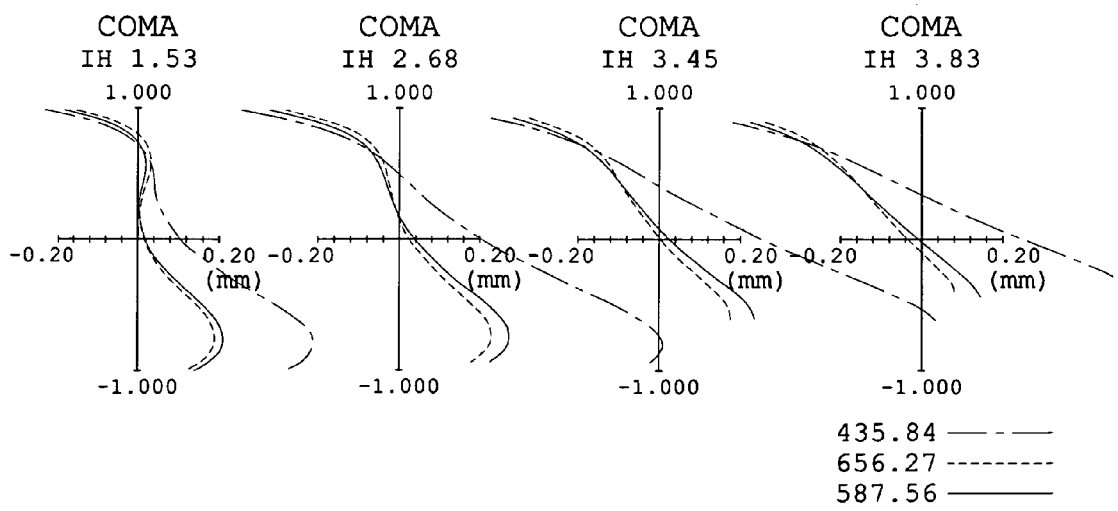

Besides, FIGS. 13A, 13B, and 13C are sectional views showing optical constitutions, developed along the optical axis, in the wide-angle end, middle, and telephoto end positions, respectively, in infinite object point focusing of the zoom optical system according to the present embodiment. FIGS. 14A-14D, 14E-14H, and 14I-14L are diagrams showing aberration characteristics in the wide-angle end, middle, and telephoto end positions, respectively, in infinite objective point focusing of the zoom optical system shown in FIG. 13. FIGS. 15A-15D, 15E-15H, and 15I-15L are diagrams showing coma in the wide-angle end, middle, and telephoto end positions, respectively, in infinite objective point focusing of the zoom optical system shown in FIG. 13. FIGS. 16A-16D, 16E-16H, and 16I-16L are diagrams showing lateral coma in the wide-angle end, middle, and telephoto end positions, respectively, in infinite objective point focusing of the zoom optical system shown in FIG. 13.

The numerical value data to lenses constituting the zoom optical system of the present embodiment are as follows:

Numerical value data 4
Unit: millimeter (mm)

Surface data

| Surface No. | r | d | nd | vd | Effective-radius |
|---|---|---|---|---|---|
| Object plane | ∞ | ∞ | | | |
| 1 | 20.4547 | 0.9000 | 1.92286 | 20.88 | 9.600 |
| 2 | 16.3748 | 3.8000 | 1.59201 | 67.02 | 9.114 |
| 3* | −303.0106 | D3 | | | 8.850 |
| 4 | 37.0720 | 0.8000 | 1.88300 | 40.76 | 6.242 |
| 5 | 5.8165 | 3.3069 | | | 4.524 |
| 6* | 12019.2977 | 0.7000 | 1.69350 | 53.21 | 4.273 |
| 7* | 6.1926 | 0.7000 | 1.63387 | 23.38 | 4.165 |
| 8* | 12.9491 | 0.3000 | | | 4.159 |
| 9 | 11.2636 | 1.7900 | 1.92286 | 18.90 | 4.183 |
| 10 | 18.5001 | D10 | | | 4.700 |
| 11 (Stop) | ∞ | −0.1000 | | | 2.290 |
| 12* | 6.1785 | 3.3200 | 1.59201 | 67.02 | 2.361 |
| 13* | −11.1135 | 0.1400 | | | 2.330 |
| 14 | 8.1838 | 1.8800 | 1.49700 | 81.54 | 2.242 |
| 15 | −7.7822 | 0.3900 | 1.61293 | 37.00 | 2.008 |
| 16 | 4.0990 | D16 | | | 1.850 |
| 17* | 63697.7428 | 2.7200 | 1.53071 | 55.69 | 4.679 |
| 18* | −11.1066 | D18 | | | 4.853 |
| 19 | ∞ | 0.3000 | 1.51633 | 64.14 | 4.260 |
| 20 | ∞ | 0.5000 | | | 4.242 |
| 21 | ∞ | 0.5000 | 1.51633 | 64.14 | 4.196 |
| 22 | ∞ | 0.4000 | | | 4.165 |
| Image plane | ∞ | | | | |

Aspherical surface data

| Surface No. s | Radius of curvature r | Conic constant k |
|---|---|---|
| 3 | −303.011 | 0.000 |

Aspherical coeficients

| $A_4$ | $A_6$ | $A_8$ |
|---|---|---|
| 8.68825e−06 | −7.65080e−09 | −7.49370e−12 |

| $A_{10}$ | $A_{12}$ |
|---|---|
| 2.26300e−13 | −1.46640e−15 |

| Surface No. s | Radius of curvature r | Conic constant k |
|---|---|---|
| 6 | 12019.298 | 0.000 |

Aspherical coeficients

| $A_4$ | $A_6$ | $A_8$ |
|---|---|---|
| −1.95119e−03 | 2.58482e−05 | 7.62847e−08 |

| $A_{10}$ | $A_{12}$ |
|---|---|
| 1.18290e−08 | −2.17830e−10 |

| Surface No. s | Radius of curvature r | Conic constant k |
|---|---|---|
| 7 | 6.193 | 0.000 |

Aspherical coeficients

| $A_4$ | $A_6$ | $A_8$ |
|---|---|---|
| −3.26104e−03 | 3.69617e−05 | 2.40345e−07 |

| Surface No. s | Radius of curvature r | Conic constant k |
|---|---|---|
| 8 | 12.949 | 0.000 |

Aspherical coeficients

| $A_4$ | $A_6$ | $A_8$ |
|---|---|---|
| −1.88857e−03 | 3.69617e−05 | 2.40345e−07 |

-continued

Numerical value data 4
Unit: millimeter (mm)

| Surface No. s | Radius of curvature r | Conic constant k |
|---|---|---|
| 12 | 6.178 | 0.000 |

Aspherical coeficients

| $A_4$ | $A_6$ | $A_8$ |
|---|---|---|
| −6.14264e−04 | −1.17654e−05 | 1.26882e−06 |

| $A_{10}$ | $A_{12}$ |
|---|---|
| −1.30670e−07 | 4.87140e−09 |

| Surface No. s | Radius of curvature r | Conic constant k |
|---|---|---|
| 13 | −11.113 | 0.000 |

Aspherical coeficients

| $A_4$ | $A_6$ | $A_8$ |
|---|---|---|
| 4.27589e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 17 | 63697.743 | 0.000 |

Aspherical coeficients

| $A_4$ | $A_6$ |
|---|---|
| 1.70710e−05 | −8.57460e−07 |

| Surface No. s | Radius of curvature r | Conic constant k |
|---|---|---|
| 18 | −11.107 | 0.000 |

Aspherical coeficients

| $A_4$ | $A_6$ | $A_8$ |
|---|---|---|
| −3.71076e−05 | −1.65799e−06 | 1.10000e−08 |

Various data
Zoom ratio: 11.514

| | Wide-angle end position | Middle position |
|---|---|---|
| Focal length | 5.102 | 17.151 |
| F-number | 3.252 | 5.432 |
| Total angle of view | 75.411 | 25.621 |
| Image height | 3.830 | 3.830 |
| Total length of lens | 43.094 | 55.284 |
| Back focus | 5.972 | 5.344 |
| The distance from object | ∞ | ∞ |
| D3 | 0.300 | 9.226 |
| D10 | 13.010 | 6.255 |
| D16 | 3.165 | 13.812 |
| D18 | 4.545 | 3.916 |
| The radius of stop | 2.290 | 2.290 |
| Entrance pupil position | 11.786 | 32.432 |
| Exit pupil position | −11.583 | −134.232 |
| Position of front principal point | 15.405 | 47.476 |
| Position of rear principal point | −4.702 | −16.751 |

-continued

Numerical value data 4
Unit: millimeter (mm)

| | Telephoto end position | Position in which the focal length is ten times as large as that in the wide-angle end position |
|---|---|---|
| Focal length | 58.740 | 50.824 |
| F-number | 6.300 | 6.167 |
| Total angle of view | 7.674 | 8.871 |
| Image height | 3.830 | 3.830 |
| Total length of lens | 65.746 | 65.462 |
| Back focus | 5.364 | 5.908 |
| The distance from object | ∞ | ∞ |
| D3 | 20.410 | 19.557 |
| D10 | 1.597 | 2.204 |
| D16 | 17.728 | 17.146 |
| D18 | 3.937 | 4.480 |
| The radius of stop | 2.290 | 2.290 |
| Entrance pupil position | 109.557 | 99.295 |
| Exit pupil position | 421.087 | 876.434 |
| Position of front principal point | 176.597 | 153.086 |
| Position of rear principal point | −58.340 | −44.916 |

Single lens data

| Single lens | Object-side surface of lens | Focal length |
|---|---|---|
| $L_{11}$ | 1 | −99.490 |
| $L_{12}$ | 2 | 26.358 |
| $L_{21}$ | 4 | −7.908 |
| $L_{22}$ | 6 | −8.934 |
| $L_{23}$ | 7 | 18.000 |
| $L_{24}$ | 9 | 27.891 |
| $L_{31}$ | 12 | 7.223 |
| $L_{32}$ | 14 | 8.353 |
| $L_{33}$ | 15 | −4.326 |
| $L_{41}$ | 17 | 20.925 |

Zoom lens group data

| Lens group | Object-side surface of lens group | Focal length of lens group | Total length of lens group |
|---|---|---|---|
| $G_1$ | 1 | 36.855 | 4.700 |
| $G_2$ | 4 | −5.952 | 7.597 |
| $G_3$ | 11 | 9.777 | 5.630 |
| $G_4$ | 17 | 20.925 | 2.720 |

| Lens group | Position of front principal point | Position of rear principal point |
|---|---|---|
| $G_1$ | −0.141 | −3.007 |
| $G_2$ | 1.298 | −3.952 |
| $G_3$ | −3.062 | −4.845 |
| $G_4$ | 1.777 | −0.000 |

Magnification of lens group

| | Wide-angle end position | Middle position |
|---|---|---|
| $G_1$ | 0.000 | 0.000 |
| $G_2$ | −0.226 | −0.343 |
| $G_3$ | −0.856 | −1.824 |
| $G_4$ | 0.715 | 0.745 |

| | Telephoto end position | Position in which the focal length is ten times as large as that in the wide-angle end position |
|---|---|---|
| $G_1$ | 0.000 | 0.000 |
| $G_2$ | −0.962 | −0.845 |
| $G_3$ | −2.228 | −2.273 |
| $G_4$ | 0.744 | 0.718 |

-continued

Numerical value data 4
Unit: millimeter (mm)

Data regarding the above conditions

Condition (1)

$\Delta D_{w-w10}/L_t$: 0.292
Conditions (2), (3)

$SF_{G4} = (r_{G4o} + r_{G4i})/(r_{G4o} - r_{G4i})$: 1.000
Conditions (4), (5)

$SF_{G1o-G4i} = (r_{G1o} + r_{G4i})/(r_{G1o} - r_{G4i})$: 0.296
Condition (6)

$\phi_{G2n2}/\phi_{G2n1}$: 0.885
Condition (7)

$|\phi_{G2p2}/\phi_{G2n1}|$: 0.440
Condition (8)

$nd_{G2n2} - nd_{G2p1}$: 0.060
Condition (9)

$vd_{G2n2} - vd_{G2p1}$: 29.83
Condition (10)

$\Delta V_{G2w-m}/\Delta V_{G2m-t}$: −4.52
Condition (11)

$(ASP_{22c} \times |\Delta vd_{22}|)/(ASP_{22o} + ASP_{22i})$: 29.1
Condition (12)

$|\Delta V_{G4w-t}/f_w|$: 0.014

Embodiment 5

The zoom optical system according to the embodiment 5 will be explained below in detail using FIGS. 17 to 20. Besides, because the optical constitution of the zoom optical system and the movement of each of the lens groups except the fourth lens group in changing a magnification in the present embodiment are approximately the same as those in the embodiments 1 to 4, components in the present embodiment which have approximately the same constitutions as components in the embodiments 1 to 4 have are given the same reference numeral respectively, and the detailed explanation of those components is omitted.

Figure 17A:
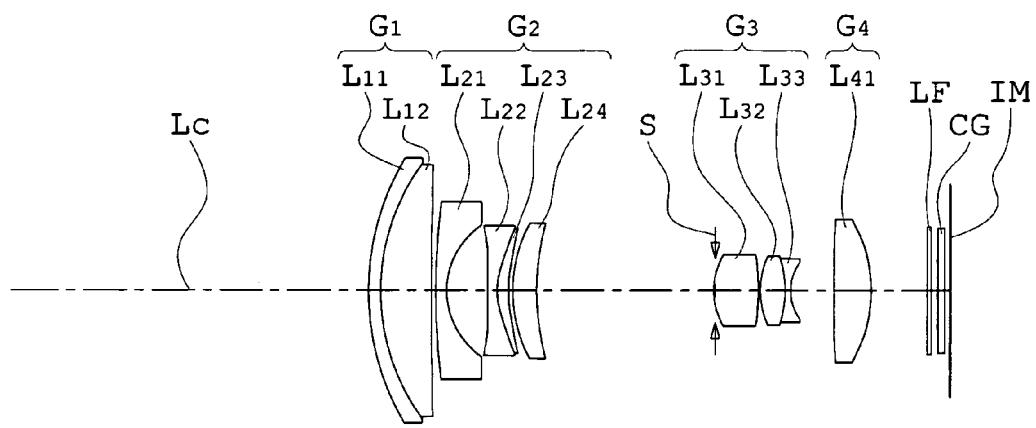
FIGS. 17A, 17B, and 17C are sectional views showing optical constitutions, developed along the optical axis, in the wide-angle end, middle, and telephoto end positions, respectively, in infinite object point focusing of a zoom optical system according to the embodiment 5 of the present invention.
Figure 17B:
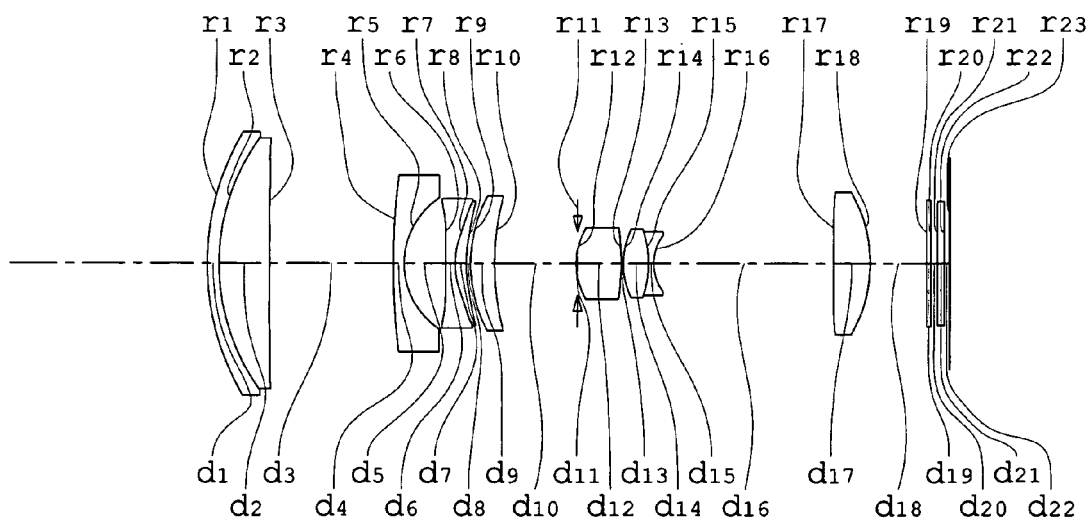
Figure 17C:
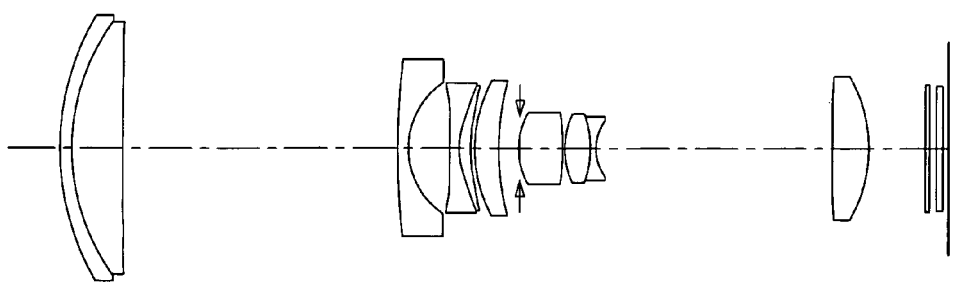
Figures 19A, 19B, 19C, 19D:
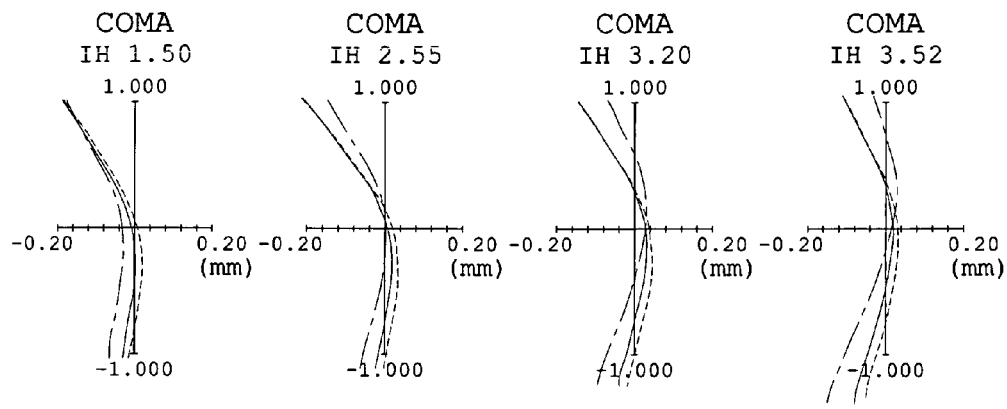
FIGS. 19A-19D, 19E-19H, and 19I-19L are diagrams showing coma in the wide-angle end, middle, and telephoto end positions, respectively, in infinite objective point focusing of the zoom optical system shown in FIG. 17.
Figures 19E, 19F, 19G, 19H:
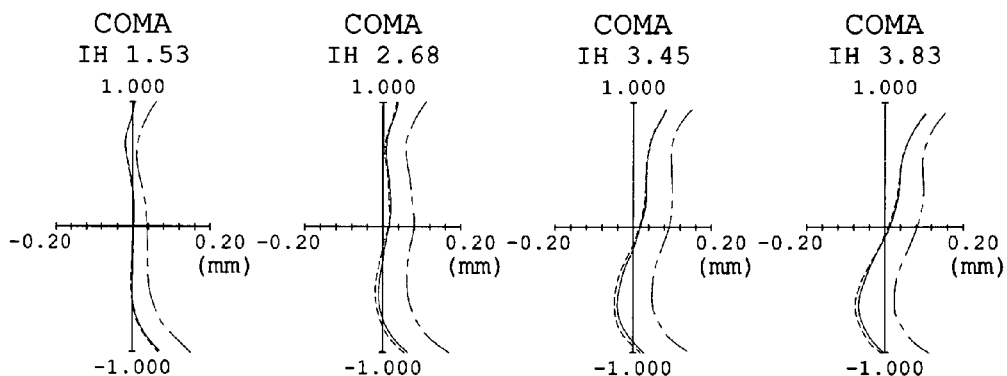
Figures 19I, 19J, 19K, 19L:
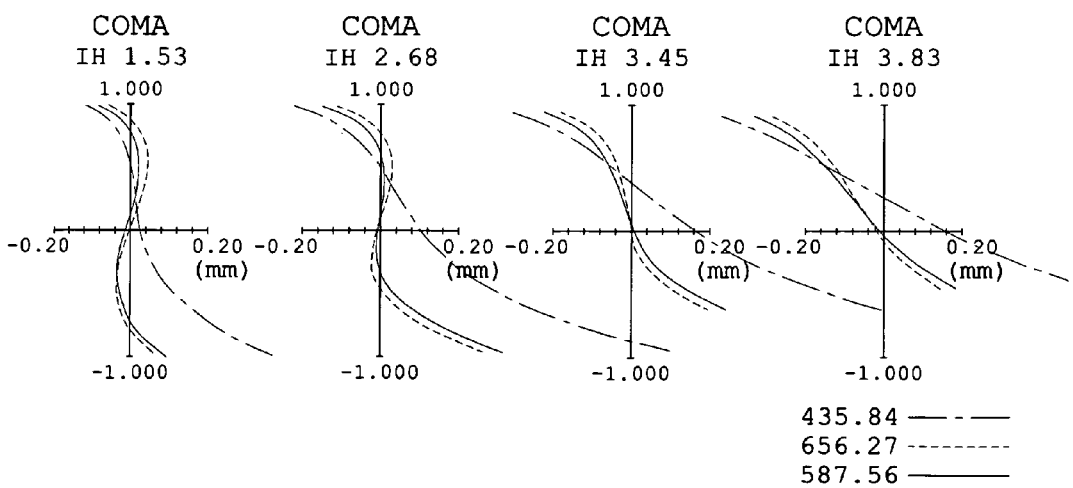

Besides, FIGS. 17A, 17B, and 17C are sectional views showing optical constitutions, developed along the optical axis, in the wide-angle end, middle, and telephoto end positions, respectively, in infinite object point focusing of the zoom optical system according to the present embodiment. FIGS. 18A-18D, 18E-18H, and 18I-18L are diagrams showing aberration characteristics in the wide-angle end, middle, and telephoto end positions, respectively, in infinite objective point focusing of the zoom optical system shown in FIG. 17. FIGS. 19A-19D, 19E-19H, and 19I-19L are diagrams showing coma in the wide-angle end, middle, and telephoto end positions, respectively, in infinite objective point focusing of the zoom optical system shown in FIG. 17. FIGS. 20A-20D, 20E-20H, and 20I-20L are diagrams showing lateral coma in the wide-angle end, middle, and telephoto end positions, respectively, in infinite objective point focusing of the zoom optical system shown in FIG. 17.

First, the movement of each of the lens groups in the zoom optical system of the present embodiment in changing a magnification will be explained.

In changing a magnification from the wide-angle end position to the telephoto end position, the first lens group $G_1$ moves toward the object side. The second lens group $G_2$ reciprocates on the optical axis Lc in such a way that the second lens group $G_2$ first moves toward the object side and then moves toward the image side, with the distance between the first lens group $G_1$ and the second lens group $G_2$ being widened. The third lens group $G_3$, together with the aperture stop S, moves toward the object side on the optical axis Lc, with the distance between the second lens group $G_2$ and the third lens group $G_3$ being narrowed. The fourth lens group $G_4$ does not move.

The numerical value data to lenses constituting the zoom optical system of the present embodiment are as follows:

Numerical value data 5
Unit: millimeter (mm)

Surface data

| Surface No. | r | d | nd | vd | Effective radius |
|---|---|---|---|---|---|
| Object plane | ∞ | ∞ | | | |
| 1 | 19.9393 | 0.9000 | 1.94595 | 17.98 | 9.600 |
| 2 | 16.5045 | 3.8000 | 1.59201 | 67.02 | 9.130 |
| 3* | −1023.5356 | D3 | | | 8.850 |
| 4 | 57.8193 | 0.8000 | 1.88300 | 40.76 | 6.346 |
| 5 | 6.0512 | 3.0813 | | | 4.657 |
| 6* | 13937.0727 | 0.7000 | 1.69350 | 53.21 | 4.504 |
| 7* | 6.0041 | 0.8500 | 1.63387 | 23.38 | 4.369 |
| 8* | 12.3693 | 0.3000 | | | 4.353 |
| 9 | 10.9029 | 1.7900 | 1.92286 | 18.90 | 4.389 |
| 10 | 19.3733 | D10 | | | 4.700 |
| 11 | ∞ | −0.1000 | | | 2.306 |
| (Stop) | | | | | |
| 12* | 5.9431 | 3.3200 | 1.59201 | 67.02 | 2.398 |
| 13* | −14.3881 | 0.1400 | | | 2.358 |
| 14 | 6.3074 | 1.8800 | 1.49700 | 81.54 | 2.276 |
| 15 | −8.0245 | 0.3900 | 1.61293 | 37.00 | 2.038 |
| 16 | 3.6314 | D16 | | | 1.850 |
| 17* | 34988.2749 | 2.7200 | 1.53071 | 55.69 | 4.895 |
| 18* | −10.5779 | D18 | | | 5.037 |
| 19 | ∞ | 0.3000 | 1.51633 | 64.14 | 4.296 |
| 20 | ∞ | 0.5000 | | | 4.271 |
| 21 | ∞ | 0.5000 | 1.51633 | 64.14 | 4.208 |
| 22 | ∞ | 0.4100 | | | 4.170 |
| Image plane | ∞ | | | | |

Aspherical surface data

| Surface No. s | Radius of curvature r | Conic constant k |
|---|---|---|
| 3 | −1023.536 | 0.000 |

Aspherical coeficients

| $A_4$ | $A_6$ | $A_8$ |
|---|---|---|
| 8.35195e−06 | −2.29098e−09 | −7.49370e−12 |

| $A_{10}$ | $A_{12}$ |
|---|---|
| 2.26300e−13 | −1.46640e−15 |

| Surface No. s | Radius of curvature r | Conic constant k |
|---|---|---|
| 6 | 13937.073 | 0.000 |

Aspherical coeficients

| $A_4$ | $A_6$ | $A_8$ |
|---|---|---|
| −1.37173e−03 | 3.18973e−05 | −4.05423e−07 |

| $A_{10}$ | $A_{12}$ |
|---|---|
| 1.18290e−08 | −2.17830e−10 |

Numerical value data 5
Unit: millimeter (mm)

| Surface No. s | Radius of curvature r | Conic constant k |
|---|---|---|
| 7 | 6.004 | 0.000 |

Aspherical coefficients

| $A_4$ | $A_6$ | $A_8$ |
|---|---|---|
| −2.83242e−03 | 3.83610e−05 | −3.39659e−07 |

| Surface No. s | Radius of curvature r | Conic constant k |
|---|---|---|
| 8 | 12.369 | 0.000 |

Aspherical coefficients

| $A_4$ | $A_6$ | $A_8$ |
|---|---|---|
| −1.33210e−03 | 3.83610e−05 | −3.39659e−07 |

| Surface No. s | Radius of curvature r | Conic constant k |
|---|---|---|
| 12 | 5.943 | 0.000 |

Aspherical coefficients

| $A_4$ | $A_6$ | $A_8$ |
|---|---|---|
| −4.24607e−04 | −1.37556e−05 | 1.26882e−06 |

| $A_{10}$ | $A_{12}$ |
|---|---|
| −1.30670e−07 | 4.87140e−09 |

| Surface No. s | Radius of curvature r | Conic constant k |
|---|---|---|
| 13 | −14.388 | 0.000 |

Aspherical coefficients

| $A_4$ | $A_6$ | $A_8$ |
|---|---|---|
| 4.80281e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 17 | 34988.275 | 0.000 |

Aspherical coeficients

| $A_4$ | $A_6$ |
|---|---|
| 1.15108e−04 | −8.57460e−07 |

| Surface No. s | Radius of curvature r | Conic constant k |
|---|---|---|
| 18 | −10.578 | 0.000 |

Aspherical coeficients

| $A_4$ | $A_6$ | $A_8$ |
|---|---|---|
| 6.41007e−05 | −2.25212e−06 | 1.10000e−08 |

Numerical value data 5
Unit: millimeter (mm)

Various data
Zoom ratio: 11.585

| | Wide-angle end position | Middle position |
|---|---|---|
| Focal length | 5.083 | 17.168 |
| F-number | 3.245 | 5.407 |
| Total angle of view | 75.649 | 25.822 |
| Image height | 3.830 | 3.830 |
| Total length of lens | 43.015 | 54.979 |
| Back focus | 5.593 | 5.597 |
| The distance from object | ∞ | ∞ |
| D3 | 0.300 | 9.193 |
| D10 | 13.255 | 6.212 |
| D16 | 3.296 | 13.406 |
| D18 | 4.160 | 4.160 |
| The radius of stop | 2.306 | 2.306 |
| Entrance pupil position | 11.700 | 32.120 |
| Exit pupil position | −12.003 | −150.773 |
| Position of front principal point | 15.314 | 47.403 |
| Position of rear principal point | −4.677 | −16.758 |

| | Telephoto end position | Position in which the focal length is ten times as large as that in the wide-angle end position |
|---|---|---|
| Focal length | 58.893 | 50.830 |
| F-number | 6.300 | 6.285 |
| Total angle of view | 7.762 | 9.004 |
| Image height | 3.830 | 3.830 |
| Total length of lens | 65.792 | 65.522 |
| Back focus | 5.601 | 5.597 |
| The distance from object | ∞ | ∞ |
| D3 | 20.456 | 19.485 |
| D10 | 1.598 | 2.378 |
| D16 | 17.565 | 17.491 |
| D18 | 4.160 | 4.160 |
| The radius of stop | 2.306 | 2.306 |
| Entrance pupil position | 109.109 | 97.896 |
| Exit pupil position | 236.494 | 245.574 |
| Position of front principal point | 183.024 | 159.493 |
| Position of rear principal point | −58.479 | −45.233 |

Single lens data

| Single lens | Object-side surface of lens | Focal length |
|---|---|---|
| $L_{11}$ | 1 | −116.070 |
| $L_{12}$ | 2 | 27.474 |
| $L_{21}$ | 4 | −7.710 |
| $L_{22}$ | 6 | −8.662 |
| $L_{23}$ | 7 | 17.500 |
| $L_{24}$ | 9 | 24.533 |
| $L_{31}$ | 12 | 7.564 |
| $L_{32}$ | 14 | 7.429 |
| $L_{33}$ | 15 | −4.028 |
| $L_{41}$ | 17 | 19.926 |

Zoom lens group data

| Lens group | Object-side surface of lens group | Focal length of lens group | Total length of lens group |
|---|---|---|---|
| $G_1$ | 1 | 37.042 | 4.700 |
| $G_2$ | 4 | −5.985 | 7.521 |
| $G_3$ | 11 | 9.669 | 5.630 |
| $G_4$ | 17 | 19.926 | 2.720 |

| Lens group | Position of front principal point | Position of rear principal point |
|---|---|---|
| $G_1$ | −0.306 | −3.153 |
| $G_2$ | 1.170 | −4.008 |

-continued

Numerical value data 5
Unit: millimeter (mm)

| | | |
|---|---|---|
| $G_3$ | −3.461 | −4.967 |
| $G_4$ | 1.776 | −0.001 |

Magnification of lens group

| | Wide-angle end position | Middle position |
|---|---|---|
| $G_1$ | 0.000 | 0.000 |
| $G_2$ | −0.226 | −0.341 |
| $G_3$ | −0.843 | −1.889 |
| $G_4$ | 0.719 | 0.719 |

| | Telephoto end position | Position in which the focal length is ten times as large as that in the wide-angle end position |
|---|---|---|
| $G_1$ | 0.000 | 0.000 |
| $G_2$ | −0.953 | −0.826 |
| $G_3$ | −2.320 | −2.312 |
| $G_4$ | 0.719 | 0.719 |

Data regarding the above conditions

Condition (1)

$\Delta D_{w-w10}/L_t$: 0.290
Conditions (2), (3)

$SF_{G4} = (r_{G4o} + r_{G4i})/(r_{G4o} - r_{G4i})$: 0.999
Conditions (4), (5)

$SF_{G1o-G4i} = (r_{G1o} + r_{G4i})/(r_{G1o} - r_{G4i})$: 0.307
Condition (6)

$\phi_{G2n2}/\phi_{G2n1}$: 0.891
Condition (7)

$|\phi_{G2p2}/\phi_{G2n1}|$: 0.315
Condition (8)

$nd_{G2n2} - nd_{G2p1}$: 0.060
Condition (9)

$vd_{G2n2} - vd_{G2p1}$: 29.83
Condition (10)

$\Delta V_{G2w-m}/\Delta V_{G2m-t}$: −6.75
Condition (11)

$(ASP_{22c} \times |\Delta vd_{22}|)/(ASP_{22o} + ASP_{22i})$: 41.8
Condition (12)

$|\Delta V_{G4w-t}/f_w|$: 0.000

Embodiment 6

The zoom optical system according to the embodiment 6 will be explained below in detail using FIGS. 21 to 24. Besides, because the optical constitution of the zoom optical system except the third lens group and the movement of each of the lens groups in changing a magnification in the present embodiment are approximately the same as those in the embodiments 1 to 5, components in the present embodiment which have approximately the same constitutions as components in the embodiments 1 to 5 have are given the same reference numeral respectively, and the detailed explanation of those components is omitted.

Figure 21A:
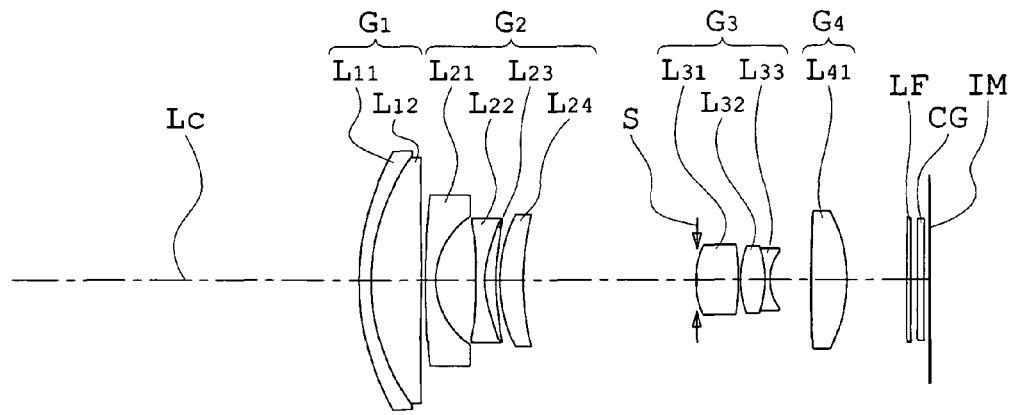
FIGS. 21A, 21B, and 21C are sectional views showing optical constitutions, developed along the optical axis, in the wide-angle end, middle, and telephoto end positions, is respectively, in infinite object point focusing of a zoom optical system according to the embodiment 6 of the present invention.
Figure 21B:
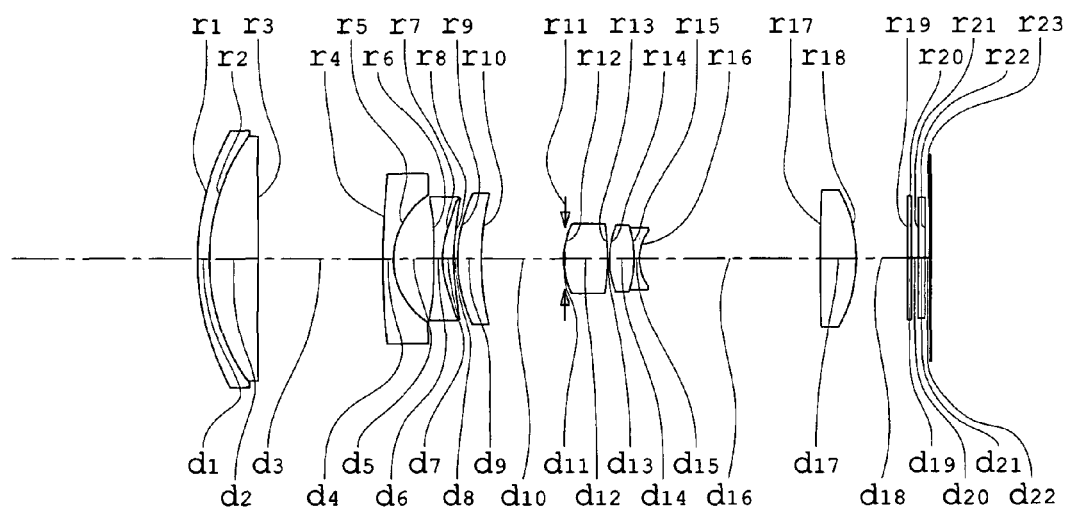
Figure 21C:
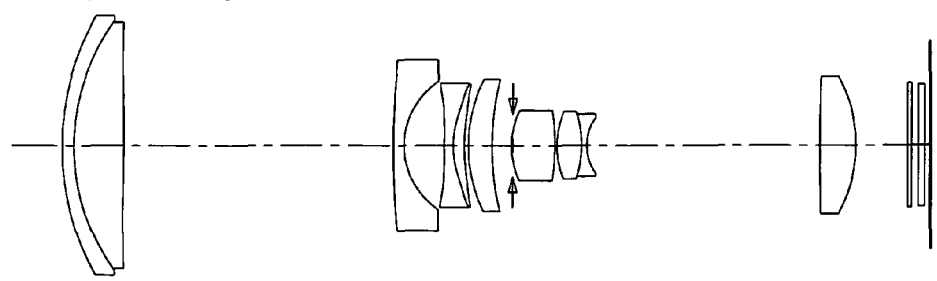
Figures 23A, 23B, 23C, 23D:
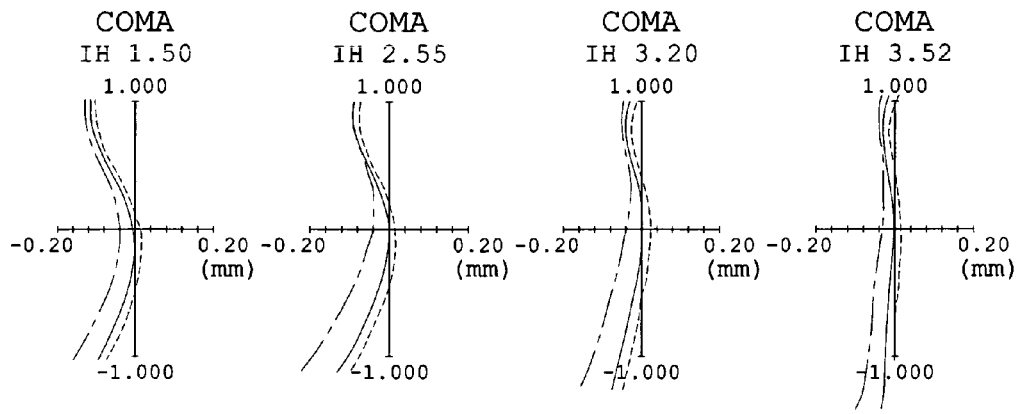
FIGS. 23A-23D, 23E-23H, and 23I-23L are diagrams showing coma in the wide-angle end, middle, and telephoto end positions, respectively, in infinite objective point focusing of the zoom optical system shown in FIG. 21.
Figures 23E, 23F, 23G, 23H:
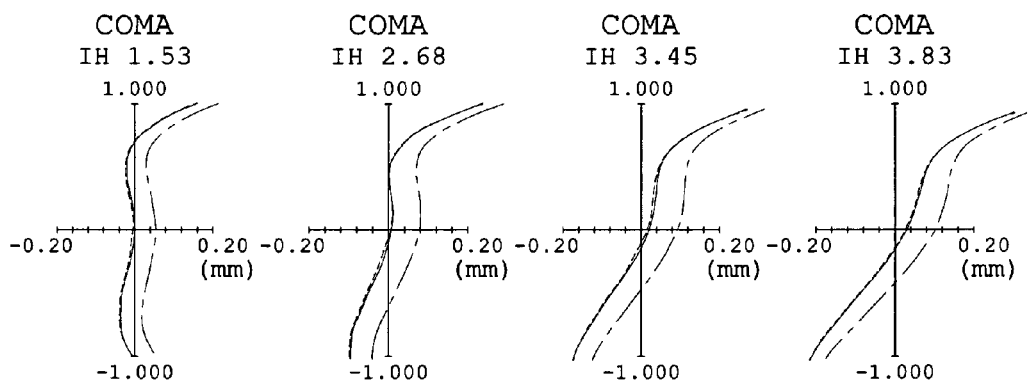
Figures 23I, 23J, 23K, 23L:
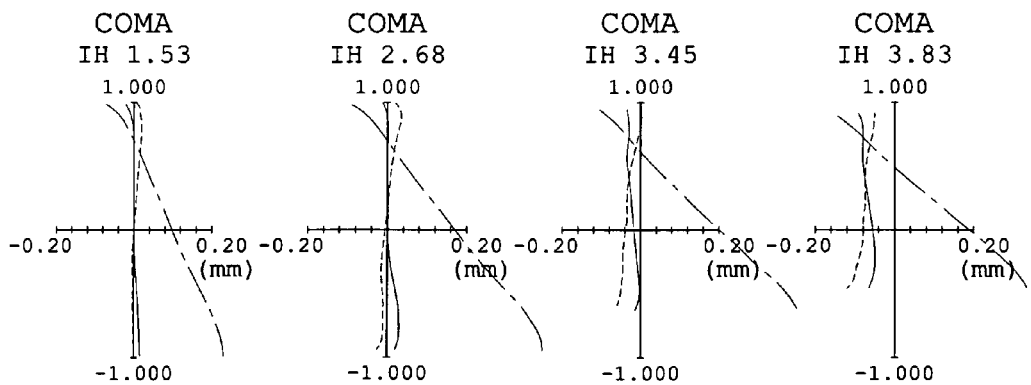

Besides, FIGS. 21A, 21B, and 21C are sectional views showing optical constitutions, developed along the optical axis, in the wide-angle end, middle, and telephoto end positions, respectively, in infinite object point focusing of the zoom optical system according to the present embodiment. FIGS. 22A-22D, 22E-22H, and 22I-22L are diagrams showing aberration characteristics in the wide-angle end, middle, and telephoto end positions, respectively, in infinite objective point focusing of the zoom optical system shown in FIG. 21. FIGS. 23A-23D, 23E-23H, and 23I-23L are diagrams showing coma in the wide-angle end, middle, and telephoto end positions, respectively, in infinite objective point focusing of the zoom optical system shown in FIG. 21. FIGS. 24A-24D, 24E-24H, and 24I-24L are diagrams showing lateral coma in the wide-angle end, middle, and telephoto end positions, respectively, in infinite objective point focusing of the zoom optical system shown in FIG. 21.

First, the optical constitution of the zoom optical system of the present embodiment will be explained using FIG. 21. Besides, a lens shape in the explanations of aspherical lenses means the shape of aspherical lens in the vicinity of the optical axis of the light ray from the object side ahead.

The zoom optical system of the present embodiment comprises, in order from the object side, a positive first lens group $G_1$, a negative second lens group $G_2$, a positive third lens group $G_3$, and a positive fourth lens group $G_4$ which are arranged on the optical axis Lc. Also, an aperture stop S which moves integratedly with the third lens group $G_3$ is provided on the object side of the third lens group $G_3$. Besides, a low-pass filter LF, a CCD cover glass CG, and an image sensor having an imaging plane IM are arranged in that order from the object side and on the image side of the fourth lens group $G_4$.

The first lens group $G_1$ comprises only a positive cemented lens which consists of, in order from the object side, a lens $L_{11}$ that is a negative meniscus lens the convex surface of which faces toward the object side, and a lens $L_{12}$ that is a biconvex lens the image-side surface of which is aspherical.

The second lens group $G_2$ comprises in order from the object side: a lens $L_{21}$ which is a negative meniscus lens the convex surface of which faces toward the object side; a negative cemented lens which consists of a lens $L_{22}$ that is a negative meniscus lens the both surfaces of which are aspherical and the convex surface of which faces toward the object side, and a lens $L_{23}$ that is a positive meniscus lens the both surfaces of which are aspherical and the convex surface of which faces toward the object side; and a lens $L_{24}$ which is a positive meniscus lens the convex surface of which faces toward the object side.

The third lens group $G_3$ comprises in order from the object side: a lens $L_{31}$ which is a biconvex lens the both surfaces of which are aspherical; and a negative cemented lens which consists of a lens $L_{32}$ that is a biconvex lens, and a lens $L_{33}$ that is a biconcave lens the image-side surface of which is aspherical.

Besides, only the most image-side surface of the cemented lens of the third lens group $G_3$ is aspherical, so that coma, spherical aberration, and so on that occur in the third lens group $G_3$ can be effectively corrected by this aspherical surface of the cemented lens to make coma, spherical aberration and so on small.

The fourth lens group $G_4$ comprises only a lens $L_{41}$ which is a biconvex lens the both surfaces of which are aspherical.

The numerical value data to lenses constituting the zoom optical system of the present embodiment are as follows:

Numerical value data 6
Unit: millimeter (mm)

Surface data

| Surface No. | r | d | nd | vd | Effective radius |
|---|---|---|---|---|---|
| Object plane | ∞ | ∞ | | | |
| 1 | 20.8145 | 0.9000 | 1.92286 | 20.88 | 9.600 |
| 2 | 16.5877 | 3.8000 | 1.59201 | 67.02 | 9.119 |
| 3* | −225.6054 | D3 | | | 8.850 |

Numerical value data 6
Unit: millimeter (mm)

| | | | | | |
|---|---|---|---|---|---|
| 4 | 69.9769 | 0.8000 | 1.88300 | 40.76 | 6.258 |
| 5 | 6.0251 | 3.0241 | | | 4.594 |
| 6* | 863.6638 | 0.7000 | 1.74250 | 49.27 | 4.444 |
| 7* | 6.6265 | 0.8451 | 1.63387 | 23.38 | 4.350 |
| 8* | 15.2235 | 0.3000 | | | 4.345 |
| 9 | 11.6966 | 1.7900 | 1.92286 | 18.90 | 4.378 |
| 10 | 21.5616 | D10 | | | 4.700 |
| 11 (Stop) | ∞ | −0.1000 | | | 2.310 |
| 12* | 6.0023 | 3.3200 | 1.59201 | 67.02 | 2.395 |
| 13* | −13.8703 | 0.1400 | | | 2.353 |
| 14 | 7.1798 | 1.8800 | 1.49700 | 81.54 | 2.266 |
| 15 | −8.1988 | 0.3900 | 1.61293 | 37.00 | 2.025 |
| 16* | 3.9435 | D16 | | | 1.850 |
| 17* | 104006.0363 | 2.7200 | 1.53071 | 55.69 | 4.733 |
| 18* | −10.9002 | D18 | | | 4.907 |
| 19 | ∞ | 0.3000 | 1.51633 | 64.14 | 4.296 |
| 20 | ∞ | 0.5000 | | | 4.273 |
| 21 | ∞ | 0.5000 | 1.51633 | 64.14 | 4.222 |
| 22 | ∞ | 0.4100 | | | 4.190 |
| Image plane | ∞ | | | | |

Aspherical surface data

| Surface No. s | Radius of curvature r | Conic constant k |
|---|---|---|
| 3 | −225.605 | 0.000 |

Aspherical coeficients

| $A_4$ | $A_6$ | $A_8$ |
|---|---|---|
| 8.62567e−06 | −7.65080e−09 | −7.49370e−12 |

| $A_{10}$ | $A_{12}$ |
|---|---|
| 2.26300e−13 | −1.46640e−15 |

| Surface No. s | Radius of curvature r | Conic constant k |
|---|---|---|
| 6 | 863.664 | 0.000 |

Aspherical coeficients

| $A_4$ | $A_6$ | $A_8$ |
|---|---|---|
| −1.23855e−03 | 1.19059e−05 | 1.01518e−07 |

| $A_{10}$ | $A_{12}$ |
|---|---|
| 1.18290e−08 | −2.17830e−10 |

| Surface No. s | Radius of curvature r | Conic constant k |
|---|---|---|
| 7 | 6.627 | 0.000 |

Aspherical coeficients

| $A_4$ | $A_6$ | $A_8$ |
|---|---|---|
| −2.20526e−03 | 1.46140e−05 | 3.55363e−07 |

| Surface No. s | Radius of curvature r | Conic constant k |
|---|---|---|
| 8 | 15.223 | 0.000 |

Aspherical coeficients

| $A_4$ | $A_6$ | $A_8$ |
|---|---|---|
| −1.17262e−03 | 1.46140e−05 | 3.55363e−07 |

| Surface No. s | Radius of curvature r | Conic constant k |
|---|---|---|
| 12 | 6.002 | 0.000 |

Aspherical coeficients

| $A_4$ | $A_6$ | $A_8$ |
|---|---|---|
| −5.17903e−04 | −2.08079e−05 | 1.26882e−06 |

| $A_{10}$ | $A_{12}$ |
|---|---|
| −1.30670e−07 | 4.87140e−09 |

| Surface No. s | Radius of curvature r | Conic constant k |
|---|---|---|
| 13 | −13.870 | 0.000 |

Aspherical coeficients

| $A_4$ | $A_6$ | $A_8$ |
|---|---|---|
| 1.94464e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 16 | 3.943 | 0.000 |

Aspherical coeficients

| $A_4$ | $A_6$ | $A_8$ |
|---|---|---|
| 5.34119e−04 | 2.65221e−05 | 5.33697e−07 |

| Surface No. s | Radius of curvature r | Conic constant k |
|---|---|---|
| 17 | 104006.036 | 0.000 |

Aspherical coeficients

| $A_4$ | $A_6$ |
|---|---|
| −2.41581e−06 | −8.57460e−07 |

| Surface No. s | Radius of curvature r | Conic constant k |
|---|---|---|
| 18 | −10.900 | 0.000 |

Aspherical coeficients

| $A_4$ | $A_6$ | $A_8$ |
|---|---|---|
| −5.48318e−05 | −1.48866e−06 | 1.10000e−08 |

Various data
Zoom ratio: 11.559

| | Wide-angle end position | Middle position |
|---|---|---|
| Focal length | 5.086 | 17.164 |
| F-number | 3.258 | 5.440 |
| Total angle of view | 75.577 | 25.530 |
| Image height | 3.830 | 3.830 |
| Total length of lens | 43.194 | 55.494 |
| Back focus | 5.988 | 5.332 |
| The distance from object | ∞ | ∞ |
| D3 | 0.300 | 9.415 |
| D10 | 13.237 | 6.404 |

Numerical value data 6
Unit: millimeter (mm)

| | | |
|---|---:|---:|
| D16 | 3.160 | 13.833 |
| D18 | 4.550 | 3.895 |
| The radius of stop | 2.310 | 2.310 |
| Entrance pupil position | 11.454 | 32.426 |
| Exit pupil position | −11.606 | −151.781 |
| Position of front principal point | 15.070 | 47.715 |
| Position of rear principal point | −4.676 | −16.754 |

| | Telephoto end position | Position in which the focal length is ten times as large as that in the wide-angle end position |
|---|---:|---:|
| Focal length | 58.787 | 50.691 |
| F-number | 6.300 | 6.226 |
| Total angle of view | 7.660 | 8.878 |
| Image height | 3.830 | 3.830 |
| Total length of lens | 65.760 | 65.454 |
| Back focus | 5.350 | 5.499 |
| The distance from object | ∞ | ∞ |
| D3 | 20.551 | 19.652 |
| D10 | 1.597 | 2.361 |
| D16 | 17.752 | 17.433 |
| D18 | 3.912 | 4.061 |
| The radius of stop | 2.310 | 2.310 |
| Entrance pupil position | 108.965 | 98.582 |
| Exit pupil position | 307.214 | 386.524 |
| Position of front principal point | 179.200 | 156.017 |
| Position of rear principal point | −58.377 | −45.193 |

Single lens data

| Single lens | Object-side surface of lens | Focal length |
|---|---:|---:|
| $L_{11}$ | 1 | −98.586 |
| $L_{12}$ | 2 | 26.253 |
| $L_{21}$ | 4 | −7.510 |
| $L_{22}$ | 6 | −8.997 |
| $L_{23}$ | 7 | 17.832 |
| $L_{24}$ | 9 | 25.482 |
| $L_{31}$ | 12 | 7.545 |
| $L_{32}$ | 14 | 8.028 |
| $L_{33}$ | 15 | −4.292 |
| $L_{41}$ | 17 | 20.537 |

Zoom lens group data

| Lens group | Object-side surface of lens group | Focal length of lens group | Total length of lens group |
|---|---:|---:|---:|
| $G_1$ | 1 | 36.738 | 4.700 |
| $G_2$ | 4 | −6.040 | 7.459 |
| $G_3$ | 11 | 9.895 | 5.630 |
| $G_4$ | 17 | 20.537 | 2.720 |

| Lens group | Position of front principal point | Position of rear principal point |
|---|---:|---:|
| $G_1$ | −0.066 | −2.938 |
| $G_2$ | 1.050 | −4.130 |
| $G_3$ | −3.312 | −4.960 |
| $G_4$ | 1.777 | −0.000 |

Magnification of lens group

| | Wide-angle end position | Middle position |
|---|---:|---:|
| $G_1$ | 0.000 | 0.000 |
| $G_2$ | −0.229 | −0.349 |
| $G_3$ | −0.854 | −1.807 |
| $G_4$ | 0.708 | 0.740 |

| | Telephoto end position | Position in which the focal length is ten times as large as that in the wide-angle end position |
|---|---:|---:|
| $G_1$ | 0.000 | 0.000 |
| $G_2$ | −0.981 | −0.856 |
| $G_3$ | −2.206 | −2.202 |
| $G_4$ | 0.739 | 0.732 |

Data regarding the above conditions

Condition (1)

$\Delta D_{w-w10}/L_t$: 0.293
Conditions (2), (3)

$SF_{G4} = (r_{G4o} + r_{G4i})/(r_{G4o} - r_{G4i})$: 1.000
Conditions (4), (5)

$SF_{G1o-G4i} = (r_{G1o} + r_{G4i})/(r_{G1o} - r_{G4i})$: 0.313
Condition (6)

$\phi_{G2n2}/\phi_{G2n1}$: 0.835
Condition (7)

$|\phi_{G2p2}/\phi_{G2n1}|$: 0.295
Condition (8)

$nd_{G2n2} - nd_{G2p1}$: 0.109
Condition (9)

$vd_{G2n2} - vd_{G2p1}$: 25.89
Condition (10)

$\Delta V_{G2w-m}/\Delta V_{G2m-t}$: −3.66
Condition (11)

$(ASP_{22c} \times |\Delta vd_{22}|)/(ASP_{22o} + ASP_{22i})$: 27.5
Condition (12)

$|\Delta V_{G4w-t}/f_w|$: 0.015

Embodiment 7

The zoom optical system according to the embodiment 7 will be explained below in detail using FIGS. 25 to 28. Besides, because the optical constitution of the zoom optical system and the movement of each of the lens groups in changing a magnification in the present embodiment are approximately the same as those in the embodiments 1 to 6, components in the present embodiment which have approximately the same constitutions as components in the embodiments 1 to 6 have are given the same reference numeral respectively, and the detailed explanation of those components is omitted.

Figure 25A:
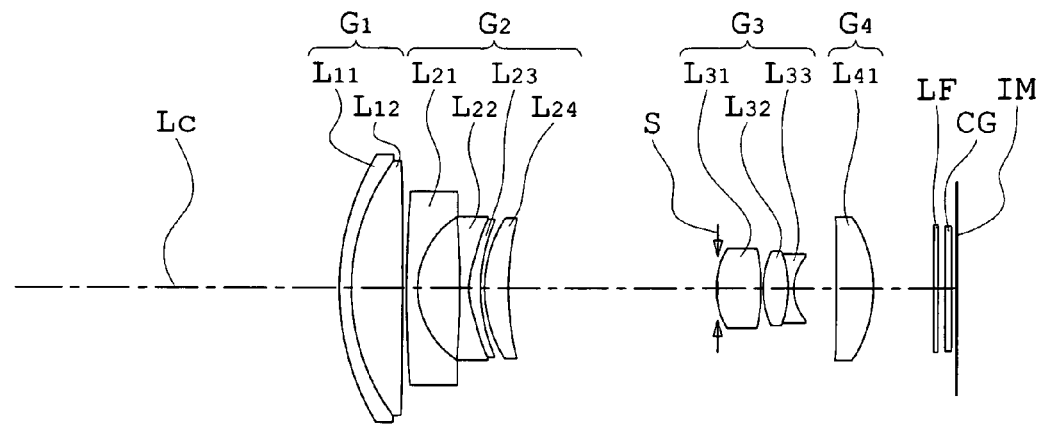
FIGS. 25A, 25B, and 25C are sectional views showing optical constitutions, developed along the optical axis, in the wide-angle end, middle, and telephoto end positions, respectively, in infinite object point focusing of a zoom optical system according to the embodiment 7 of the present invention.
Figure 25B:
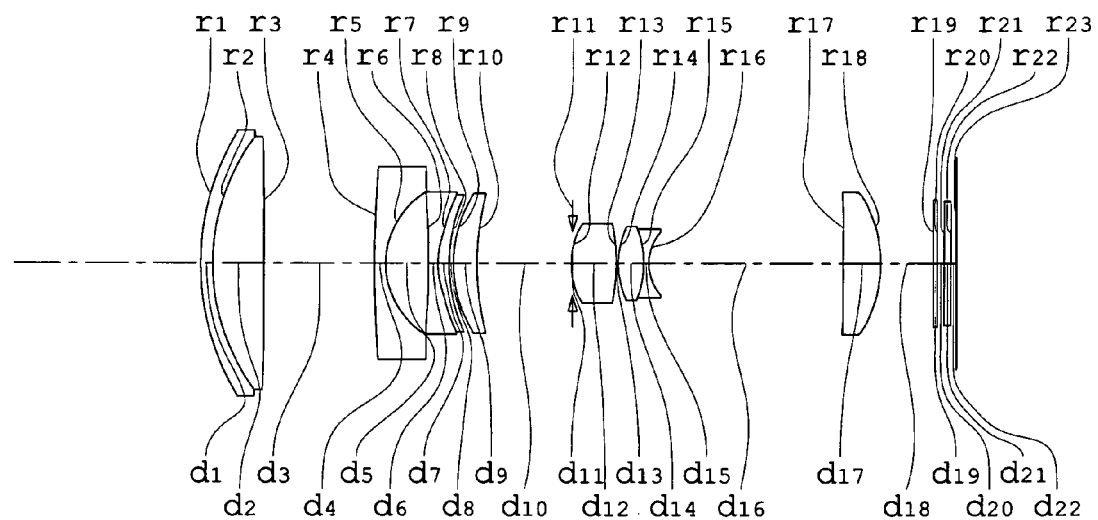
Figure 25C:
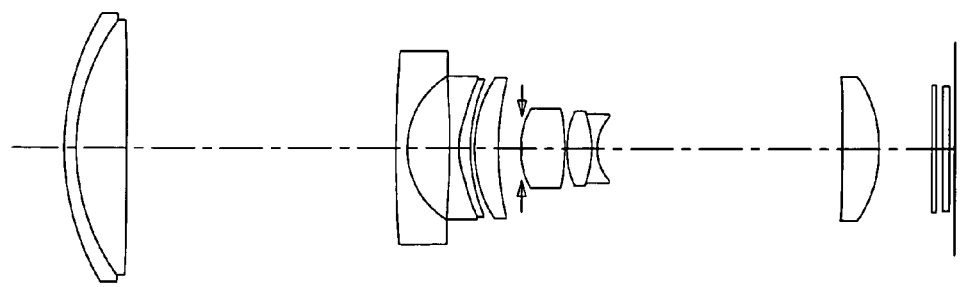

Besides, FIGS. 25A, 25B, and 25C are sectional views showing optical constitutions, developed along the optical axis, in the wide-angle end, middle, and telephoto end positions, respectively, in infinite object point focusing of the zoom optical system according to the present embodiment. FIGS. 26A-26D, 26E-26H, and 26I-26L are diagrams showing aberration characteristics in the wide-angle end, middle, and telephoto end positions, respectively, in infinite objective point focusing of the zoom optical system shown in FIG. 25. FIGS. 27A-27D, 27E-27H, and 27I-27L are diagrams showing coma in the wide-angle end, middle, and telephoto end positions, respectively, in infinite objective point focusing of the zoom optical system shown in FIG. 25. FIGS. 28A-28D, 28E-28H, and 28I-28L are diagrams showing lateral coma in the wide-angle end, middle, and telephoto end positions, respectively, in infinite objective point focusing of the zoom optical system shown in FIG. 25.

The numerical value data to lenses constituting the zoom optical system of the present embodiment are as follows:

Numerical value data 7
Unit: millimeter (mm)

Surface data

| Surface No. | r | d | nd | vd | Effective radius |
|---|---|---|---|---|---|
| Object plane | ∞ | ∞ | | | |
| 1 | 19.8397 | 0.9000 | 1.94595 | 17.98 | 9.600 |
| 2 | 16.4175 | 3.8000 | 1.59201 | 67.02 | 9.126 |
| 3* | −1225.7535 | D3 | | | 8.850 |
| 4 | 105.5527 | 0.8000 | 1.88300 | 40.76 | 6.802 |
| 5 | 6.4409 | 3.1624 | | | 5.013 |
| 6* | 5249.4851 | 0.7000 | 1.76802 | 49.24 | 4.893 |
| 7* | 6.3406 | 0.8500 | 1.72151 | 29.23 | 4.725 |
| 8* | 12.0206 | 0.3000 | | | 4.687 |
| 9 | 9.8776 | 1.7900 | 1.92286 | 18.90 | 4.798 |
| 10 | 21.6457 | D10 | | | 4.700 |
| 11 | ∞ | −0.1000 | | | 2.401 |
| (Stop) | | | | | |
| 12* | 5.9463 | 3.3200 | 1.59201 | 67.02 | 2.482 |
| 13* | −16.1041 | 0.1400 | | | 2.395 |
| 14 | 6.7027 | 1.8800 | 1.49700 | 81.54 | 2.299 |
| 15 | −8.0019 | 0.3900 | 1.61293 | 37.00 | 2.048 |
| 16 | 3.6794 | D16 | | | 1.850 |
| 17* | 116072.0079 | 2.7200 | 1.53071 | 55.69 | 4.755 |
| 18* | −11.0105 | D18 | | | 4.934 |
| 19 | ∞ | 0.3000 | 1.51633 | 64.14 | 4.278 |
| 20 | ∞ | 0.5000 | | | 4.257 |
| 21 | ∞ | 0.5000 | 1.51633 | 64.14 | 4.206 |
| 22 | ∞ | 0.3900 | | | 4.172 |
| Image plane | ∞ | | | | |

Aspherical surface data

| Surface No. s | Radius of curvature r | Conic constant k |
|---|---|---|
| 3 | −1225.754 | 0.000 |

Aspherical coeficients

| $A_4$ | $A_6$ | $A_8$ |
|---|---|---|
| 8.21105e−06 | −2.71619e−09 | −7.49370e−12 |

| $A_{10}$ | $A_{12}$ |
|---|---|
| 2.26300e−13 | −1.46640e−15 |

| Surface No. s | Radius of curvature r | Conic constant k |
|---|---|---|
| 6 | 5249.485 | 0.000 |

Aspherical coeficients

| $A_4$ | $A_6$ | $A_8$ |
|---|---|---|
| −5.04493e−04 | 1.29174e−05 | −2.29383e−07 |

| $A_{10}$ | $A_{12}$ |
|---|---|
| 1.18290e−08 | −2.17830e−10 |

| Surface No. s | Radius of curvature r | Conic constant k |
|---|---|---|
| 7 | 6.341 | 0.000 |

Aspherical coeficients

| $A_4$ | $A_6$ | $A_8$ |
|---|---|---|
| −2.07755e−03 | 1.23964e−05 | −4.35883e−08 |

| Surface No. s | Radius of curvature r | Conic constant k |
|---|---|---|
| 8 | 12.021 | 0.000 |

Aspherical coeficients

| $A_4$ | $A_6$ | $A_8$ |
|---|---|---|
| −4.31903e−04 | 1.23964e−05 | −4.35883e−08 |

| Surface No. s | Radius of curvature r | Conic constant k |
|---|---|---|
| 12 | 5.946 | 0.000 |

Aspherical coeficients

| $A_4$ | $A_6$ | $A_8$ |
|---|---|---|
| −4.13390e−04 | −1.55189e−05 | 1.26882e−06 |

| $A_{10}$ | $A_{12}$ |
|---|---|
| −1.30670e−07 | 4.87140e−09 |

| Surface No. s | Radius of curvature r | Conic constant k |
|---|---|---|
| 13 | −16.104 | 0.000 |

Aspherical coeficients

| $A_4$ | $A_6$ | $A_8$ |
|---|---|---|
| 3.77763e−04 | −1.08520e−05 | 2.13300e−06 |

| $A_{10}$ | $A_{12}$ |
|---|---|
| −2.60270e−07 | 1.08720e−08 |

| Surface No. s | Radius of curvature r | Conic constant k |
|---|---|---|
| 17 | 116072.008 | 0.000 |

Aspherical coeficients

| $A_4$ | $A_6$ |
|---|---|
| −1.50949e−05 | −8.57460e−07 |

| Surface No. s | Radius of curvature r | Conic constant k |
|---|---|---|
| 18 | −11.010 | 0.000 |

Aspherical coeficients

| $A_4$ | $A_6$ | $A_8$ |
|---|---|---|
| −5.38393e−05 | −2.22443e−06 | 1.10000e−08 |

Various data
Zoom ratio: 11.579

| | Wide-angle end position | Middle position |
|---|---|---|
| Focal length | 5.086 | 17.107 |
| F-number | 3.206 | 5.505 |
| Total angle of view | 75.610 | 25.781 |
| Image height | 3.830 | 3.830 |
| Total length of lens | 45.589 | 55.703 |
| Back focus | 5.924 | 5.318 |

Numerical value data 7
Unit: millimeter (mm)

| | | |
|---|---|---|
| The distance from object | ∞ | ∞ |
| D3 | 0.300 | 8.174 |
| D10 | 15.568 | 7.186 |
| D16 | 3.145 | 14.373 |
| D18 | 4.506 | 3.900 |
| The radius of stop | 2.401 | 2.401 |
| Entrance pupil position | 12.214 | 29.417 |
| Exit pupil position | −11.340 | −176.189 |
| Position of front principal point | 15.802 | 44.963 |
| Position of rear principal point | −4.696 | −16.780 |

| | Telephoto end position | Position in which the focal length is ten times as large as that in the wide-angle end position |
|---|---|---|
| Focal length | 58.890 | 50.691 |
| F-number | 6.300 | 6.226 |
| Total angle of view | 7.681 | 8.904 |
| Image height | 3.830 | 3.830 |
| Total length of lens | 65.728 | 65.498 |
| Back focus | 5.284 | 6.027 |
| The distance from object | ∞ | ∞ |
| D3 | 19.938 | 19.085 |
| D10 | 1.780 | 2.437 |
| D16 | 18.074 | 17.296 |
| D18 | 3.866 | 4.609 |
| The radius of stop | 2.401 | 2.401 |
| Entrance pupil position | 103.017 | 93.783 |
| Exit pupil position | 304.743 | 603.766 |
| Position of front principal point | 173.488 | 148.970 |
| Position of rear principal point | −58.500 | −44.833 |

Single lens data

| Single lens | Object-side surface of lens | Focal length |
|---|---|---|
| $L_{11}$ | 1 | −115.366 |
| $L_{12}$ | 2 | 27.396 |
| $L_{21}$ | 4 | −7.798 |
| $L_{22}$ | 6 | −8.266 |
| $L_{23}$ | 7 | 17.500 |
| $L_{24}$ | 9 | 18.348 |
| $L_{31}$ | 12 | 7.771 |
| $L_{32}$ | 14 | 7.664 |
| $L_{33}$ | 15 | −4.061 |
| $L_{41}$ | 17 | 20.745 |

Zoom lens group data

| Lens group | Object-side surface of lens group | Focal length of lens group | Total length of lens group |
|---|---|---|---|
| $G_1$ | 1 | 36.985 | 4.700 |
| $G_2$ | 4 | −6.559 | 7.602 |
| $G_3$ | 11 | 10.483 | 5.630 |
| $G_4$ | 17 | 20.745 | 2.720 |

| Lens group | Position of front principal point | Position of rear principal point |
|---|---|---|
| $G_1$ | −0.317 | −3.164 |
| $G_2$ | 0.961 | −4.368 |
| $G_3$ | −3.928 | −5.267 |
| $G_4$ | 1.777 | −0.000 |

Magnification of lens group

| | Wide-angle end position | Middle position |
|---|---|---|
| $G_1$ | 0.000 | 0.000 |
| $G_2$ | −0.252 | −0.362 |
| $G_3$ | −0.763 | −1.725 |
| $G_4$ | 0.714 | 0.744 |

| | Telephoto end position | Position in which the focal length is ten times as large as that in the wide-angle end position |
|---|---|---|
| $G_1$ | 0.000 | 0.000 |
| $G_2$ | −1.031 | −0.909 |
| $G_3$ | −2.072 | −2.132 |
| $G_4$ | 0.745 | 0.709 |

Data regarding the above conditions

Condition (1)

$\Delta D_{w-w10}/L_t$: 0.285
Conditions (2), (3)

$SF_{G4} = (r_{G4o} + r_{G4i})/(r_{G4o} - r_{G4i})$: 1.000
Conditions (4), (5)

$SF_{G1o-G4i} = (r_{G1o} + r_{G4i})/(r_{G1o} - r_{G4i})$: 0.286
Condition (6)

$\phi_{G2n2}/\phi_{G2n1}$: 0.944
Condition (7)

$|\phi_{G2p2}/\phi_{G2n1}|$: 0.425
Condition (8)

$nd_{G2n2} - nd_{G2p1}$: 0.047
Condition (9)

$vd_{G2n2} - vd_{G2p1}$: 20.01
Condition (10)

$\Delta V_{G2w-m}/\Delta V_{G2m-t}$: −1.29
Condition (11)

$(ASP_{22c} \times |\Delta vd_{22}|)/(ASP_{22o} + ASP_{22i})$: 83.6
Condition (12)

$|\Delta V_{G4w-t}/f_w|$: 0.014

Embodiment 8

Figures 31A, 31B, 31C, 31D:
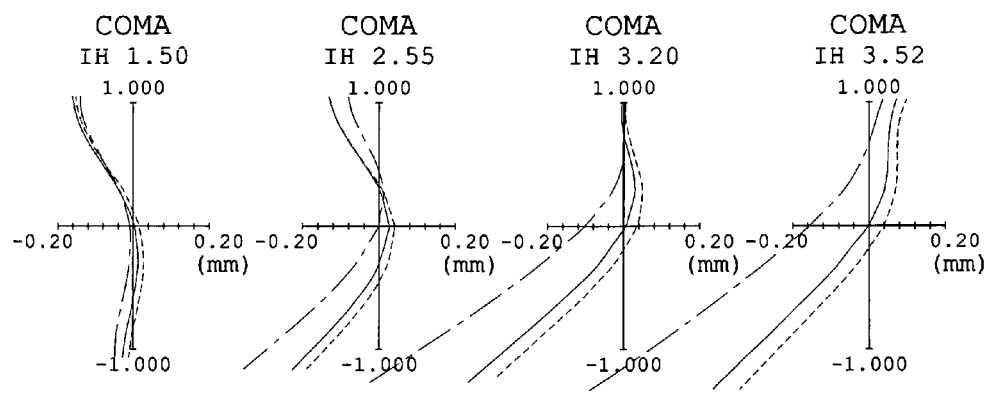
FIGS. 31A-31D, 31E-31H, and 31I-31L are diagrams showing coma in the wide-angle end, middle, and telephoto end positions, respectively, in infinite objective point focusing of the zoom optical system shown in FIG. 29.
Figures 31E, 31F, 31G, 31H:
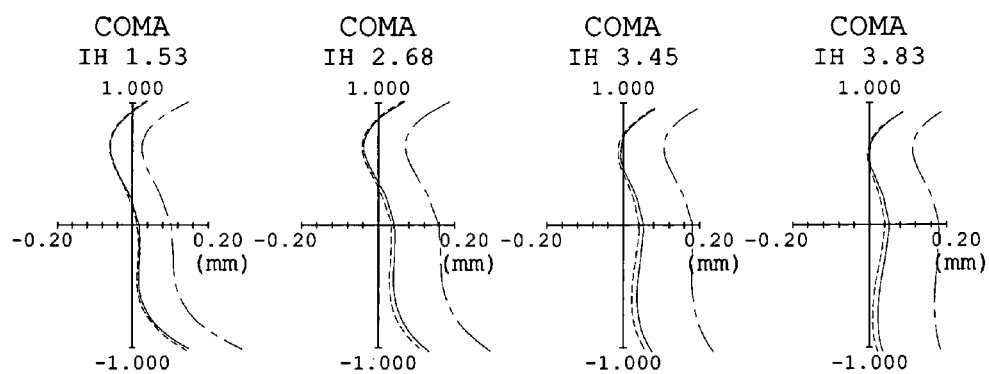
Figures 31I, 31J, 31K, 31L:
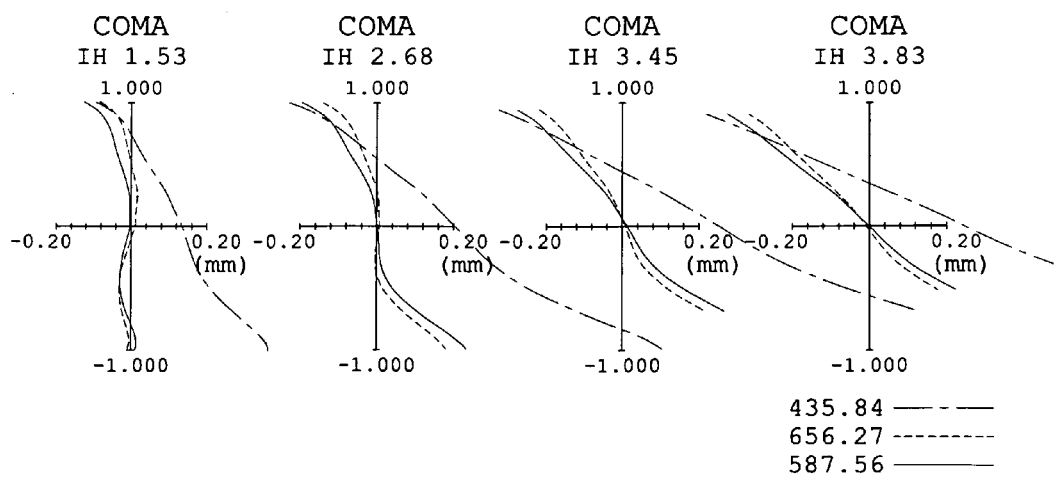

The zoom optical system according to the embodiment 8 will be explained below in detail using FIGS. 29 to 31. Besides, because the optical constitution of the zoom optical system except the second lens group and the movement of each of the lens groups in changing a magnification in the present embodiment are approximately the same as those in the embodiments 1 to 6, components in the present embodiment which have approximately the same constitutions as components in the embodiments 1 to 6 have are given the same reference numeral respectively, and the detailed explanation of those components is omitted.

Figure 29A:
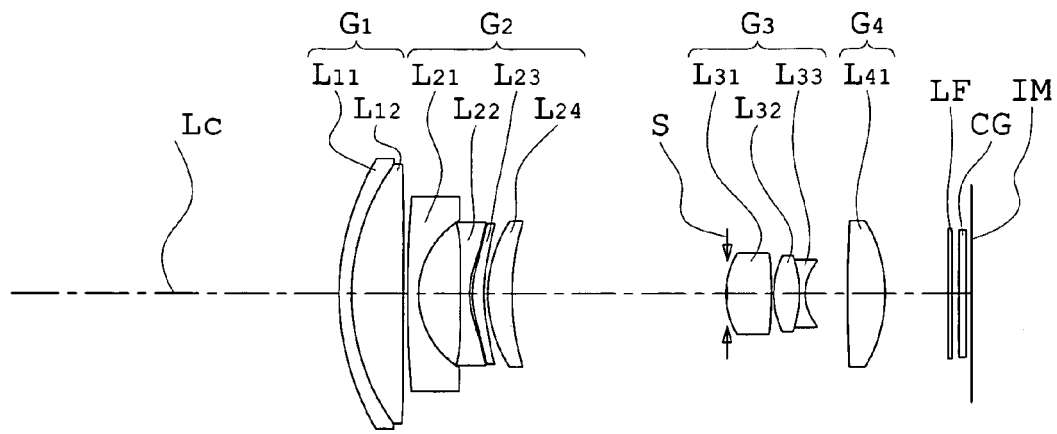
FIGS. 29A, 29B, and 29C are sectional views showing optical constitutions, developed along the optical axis, in the wide-angle end, middle, and telephoto end positions, respectively, in infinite object point focusing of a zoom optical system according to the embodiment 8 of the present invention.
Figure 29B:
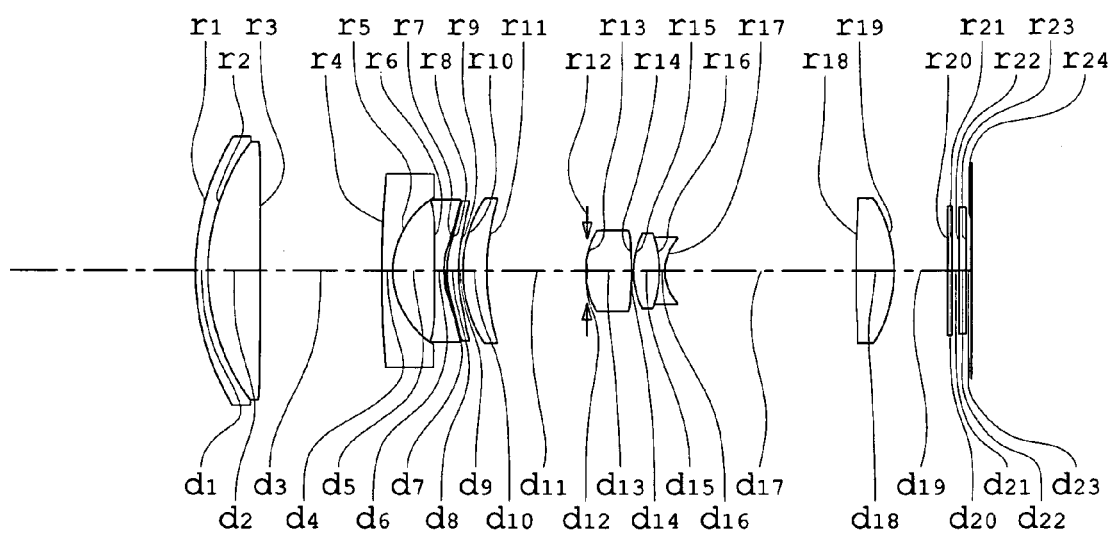
Figure 29C:
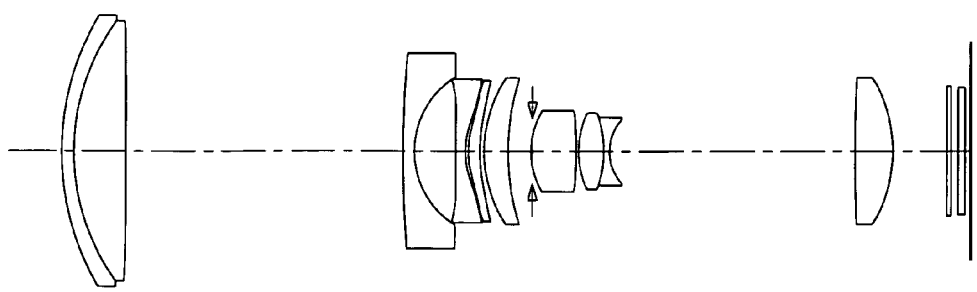

Besides, FIGS. 29A, 29B, and 29C are sectional views showing optical constitutions, developed along the optical axis, in the wide-angle end, middle, and telephoto end positions, respectively, in infinite object point focusing of the zoom optical system according to the present embodiment. FIGS. 30A-30D, 30E-30H, and 30I-30L are diagrams showing aberration characteristics in the wide-angle end, middle, and telephoto end positions, respectively, in infinite objective point focusing of the zoom optical system shown in FIG. 29. FIGS. 31A-31D, 31E-31H, and 31I-31L are diagrams showing coma in the wide-angle end, middle, and telephoto end positions, respectively, in infinite objective point focusing of the zoom optical system shown in FIG. 29. FIGS. 32A-32D, 32E-32H, and 32I-32L are diagrams showing lateral coma in the wide-angle end, middle, and telephoto end positions, respectively, in infinite objective point focusing of the zoom optical system shown in FIG. 29.

First, the optical constitution of the second lens group of the zoom optical system of the present embodiment will be explained using FIG. 29. Besides, a lens shape in the explanations of aspherical lenses means the shape of aspherical lens in the vicinity of the optical axis of the light ray from the object side ahead.

The second lens group $G_2$ of the zoom optical system of the present embodiment comprises, in order from the object side, a lens $L_{21}$ which is a negative meniscus lens the convex surface of which faces toward the object side, a lens $L_{22}$ which is a negative meniscus lens the both surfaces of which are aspherical and the convex surface of which faces toward the object side, a lens $L_{23}$ which is a positive meniscus lens the both surfaces of which are aspherical and the convex surface of which faces toward the object side, and a lens $L_{24}$ which is a positive meniscus lens the convex surface of which faces toward the object side.

The numerical value data to lenses constituting the zoom optical system of the present embodiment are as follows:

Numerical value data 8
Unit: millimeter (mm)

Surface data

| Surface No. | r | d | nd | vd | Effective radius |
|---|---|---|---|---|---|
| Object plane | ∞ | ∞ | | | |
| 1 | 19.8964 | 0.9000 | 1.94595 | 17.98 | 9.600 |
| 2 | 16.5301 | 3.8000 | 1.59201 | 67.02 | 9.132 |
| 3* | −1470.7525 | D3 | | | 8.850 |
| 4 | 89.7363 | 0.8000 | 1.88300 | 40.76 | 6.683 |
| 5 | 6.4923 | 3.0472 | | | 4.950 |
| 6* | 3533.2262 | 0.7000 | 1.77377 | 47.17 | 4.821 |
| 7* | 6.4369 | 0.2000 | | | 4.733 |
| 8* | 6.5171 | 0.8500 | 1.72151 | 29.23 | 4.744 |
| 9* | 12.7331 | 0.3000 | | | 4.740 |
| 10 | 9.7949 | 1.7900 | 1.92286 | 18.90 | 4.860 |
| 11 | 18.3686 | D11 | | | 4.700 |
| 12 (Stop) | ∞ | −0.1000 | | | 2.382 |
| 13* | 5.9399 | 3.3200 | 1.59201 | 67.02 | 2.473 |
| 14* | −16.8713 | 0.1400 | | | 2.387 |
| 15 | 6.5405 | 1.8800 | 1.49700 | 81.54 | 2.297 |
| 16 | −8.4790 | 0.3900 | 1.61293 | 37.00 | 2.045 |
| 17 | 3.6221 | D17 | | | 1.850 |
| 18* | 126339.7743 | 2.7200 | 1.53071 | 55.69 | 4.743 |
| 19* | −10.9935 | D19 | | | 4.919 |
| 20 | ∞ | 0.3000 | 1.51633 | 64.14 | 4.272 |
| 21 | ∞ | 0.5000 | | | 4.252 |
| 22 | ∞ | 0.5000 | 1.51633 | 64.14 | 4.201 |
| 23 | ∞ | 0.4100 | | | 4.167 |
| Image plane | ∞ | | | | |

Aspherical surface data

| Surface No. s | Radius of curvature r | Conic constant k |
|---|---|---|
| 3 | −1470.752 | 0.000 |

Aspherical coeficients

| $A_4$ | $A_6$ | $A_8$ |
|---|---|---|
| 8.34805e−06 | −2.36501e−09 | −7.49370e−12 |

| $A_{10}$ | $A_{12}$ |
|---|---|
| 2.26300e−13 | −1.46640e−15 |

Numerical value data 8
Unit: millimeter (mm)

| Surface No. s | Radius of curvature r | Conic constant k |
|---|---|---|
| 6 | 3533.226 | 0.000 |

Aspherical coeficients

| $A_4$ | $A_6$ | $A_8$ |
|---|---|---|
| −1.21192e−04 | −2.12253e−05 | 2.33239e−07 |

| $A_{10}$ | $A_{12}$ |
|---|---|
| 1.18290e−08 | −2.17830e−10 |

| Surface No. s | Radius of curvature r | Conic constant k |
|---|---|---|
| 7 | 6.437 | 0.000 |

Aspherical coeficients

| $A_4$ | $A_6$ | $A_8$ |
|---|---|---|
| −1.79232e−03 | −2.61352e−05 | 6.28232e−07 |

| Surface No. s | Radius of curvature r | Conic constant k |
|---|---|---|
| 8 | 6.517 | 0.000 |

Aspherical coeficient

| $A_4$ |
|---|
| −2.16063e−03 |

| Surface No. s | Radius of curvature r | Conic constant k |
|---|---|---|
| 9 | 12.733 | 0.000 |

Aspherical coeficient

| $A_4$ |
|---|
| −4.97586e−04 |

| Surface No. s | Radius of curvature r | Conic constant k |
|---|---|---|
| 13 | 5.940 | 0.000 |

Aspherical coeficients

| $A_4$ | $A_6$ | $A_8$ |
|---|---|---|
| −3.96232e−04 | −1.62403e−05 | 1.26882e−06 |

| $A_{10}$ | $A_{12}$ |
|---|---|
| −1.30670e−07 | 4.87140e−09 |

| Surface No. s | Radius of curvature r | Conic constant k |
|---|---|---|
| 14 | −16.871 | 0.000 |

Aspherical coeficients

| $A_4$ | $A_6$ | $A_8$ |
|---|---|---|
| 3.81327e−04 | −1.08520e−05 | 2.13300e−06 |

Numerical value data 8
Unit: millimeter (mm)

| $A_{10}$ | $A_{12}$ |
|---|---|
| −2.60270e−07 | 1.08720e−08 |

| Surface No. s | Radius of curvature r | Conic constant k |
|---|---|---|
| 18 | 126339.774 | 0.000 |

Aspherical coeficients

| $A_4$ | $A_6$ |
|---|---|
| 1.00640e−05 | −8.57460e−07 |

| Surface No. s | Radius of curvature r | Conic constant k |
|---|---|---|
| 19 | −10.993 | 0.000 |

Aspherical coeficients

| $A_4$ | $A_6$ | $A_8$ |
|---|---|---|
| −3.00176e−05 | −2.64213e−06 | 1.10000e−08 |

Various data
Zoom ratio: 11.579

| | Wide-angle end position | Middle position |
|---|---|---|
| Focal length | 5.086 | 17.170 |
| F-number | 3.251 | 5.452 |
| Total angle of view | 75.619 | 25.700 |
| Image height | 3.830 | 3.830 |
| Total length of lens | 45.787 | 56.159 |
| Back focus | 5.980 | 5.332 |
| The distance from object | ∞ | ∞ |
| D3 | 0.300 | 8.860 |
| D11 | 15.630 | 7.390 |
| D17 | 3.139 | 13.840 |
| D19 | 4.542 | 3.894 |
| The radius of stop | 2.382 | 2.382 |
| Entrance pupil position | 12.221 | 31.797 |
| Exit pupil position | −11.311 | −138.373 |
| Position of front principal point | 15.811 | 46.916 |
| Position of rear principal point | −4.676 | −16.760 |

| | Telephoto end position | Position in which the focal length is ten times as large as that in the wide-angle end position |
|---|---|---|
| Focal length | 58.890 | 50.691 |
| F-number | 6.300 | 6.226 |
| Total angle of view | 7.698 | 8.920 |
| Image height | 3.830 | 3.830 |
| Total length of lens | 65.731 | 65.507 |
| Back focus | 5.317 | 5.980 |
| The distance from object | ∞ | ∞ |
| D3 | 20.143 | 19.305 |
| D11 | 1.796 | 2.493 |
| D17 | 17.739 | 16.991 |
| D19 | 3.879 | 4.542 |
| The radius of stop | 2.382 | 2.382 |
| Entrance pupil position | 105.762 | 96.495 |
| Exit pupil position | 377.555 | 964.162 |
| Position of front principal point | 173.968 | 150.060 |
| Position of rear principal point | −58.480 | −44.882 |

Single lens data

| Single lens | Object-side surface of lens | Focal length |
|---|---|---|
| $L_{11}$ | 1 | −118.713 |
| $L_{12}$ | 2 | 27.638 |
| $L_{21}$ | 4 | −7.962 |
| $L_{22}$ | 6 | −8.335 |
| $L_{23}$ | 8 | 17.500 |
| $L_{24}$ | 10 | 20.668 |
| $L_{31}$ | 13 | 7.845 |
| $L_{32}$ | 15 | 7.751 |
| $L_{33}$ | 16 | −4.091 |
| $L_{41}$ | 18 | 20.713 |

Zoom lens group data

| Lens group | Object-side surface of lens group | Focal length of lens group | Total length of lens group |
|---|---|---|---|
| $G_1$ | 1 | 37.077 | 4.700 |
| $G_2$ | 4 | −6.568 | 7.687 |
| $G_3$ | 12 | 10.549 | 5.630 |
| $G_4$ | 18 | 20.713 | 2.720 |

| Lens group | Position of front principal point | Position of rear principal point |
|---|---|---|
| $G_1$ | −0.324 | −3.170 |
| $G_2$ | 0.953 | −4.479 |
| $G_3$ | −4.010 | −5.305 |
| $G_4$ | 1.777 | −0.000 |

Magnification of lens group

| | Wide-angle end position | Middle position |
|---|---|---|
| $G_1$ | 0.000 | 0.000 |
| $G_2$ | −0.252 | −0.375 |
| $G_3$ | −0.766 | −1.664 |
| $G_4$ | 0.711 | 0.743 |

| | Telephoto end position | Position in which the focal length is ten times as large as that in the wide-angle end position |
|---|---|---|
| $G_1$ | 0.000 | 0.000 |
| $G_2$ | −1.052 | −0.928 |
| $G_3$ | −2.031 | −2.079 |
| $G_4$ | 0.743 | 0.711 |

Data regarding the above conditions

Condition (1)

$\Delta D_{w \to w10}/L_t$: 0.288
Conditions (2), (3)

$SF_{G4} = (r_{G4o} + r_{G4i})/(r_{G4o} - r_{G4i})$: 1.000
Conditions (4), (5)

$SF_{G1o-G4i} = (r_{G1o} + r_{G4i})/(r_{G1o} - r_{G4i})$: 0.288
Condition (6)

$\phi_{G2n2}/\phi_{G2n1}$: 0.955
Condition (7)

$|\phi_{G2p2}/\phi_{G2n1}|$: 0.385
Condition (8)

$nd_{G2n2} - nd_{G2p1}$: 0.052
Condition (9)

$vd_{G2n2} - vd_{G2p1}$: 17.94
Condition (10)

$\Delta V_{G2w-m}/\Delta V_{G2m-t}$: −1.06
Condition (12)

$|\Delta V_{G4w-t}/f_w|$: 0.014

Besides, in the above-described embodiments 1 to 7, the lens $L_{23}$ which is constitutes the negative cemented lens of the second lens group $G_2$ and is a positive meniscus lens may be made of glass material or resin material.

In the case where glass materials are used for the lens $L_{23}$, there are much more kinds of glass materials than those of resin materials, and it is possible to select a combination of materials from more combinations of grass materials for the positive and negative lenses constituting the negative cemented lens than those of resin materials for the positive and negative lenses constituting the negative cemented lens, so that a more optimum optical performance can be obtained in the present invention. In addition, the changes of the optical characteristics with respect to variations in temperature and humidity are small in this case, so that it is possible to obtain an optical system the performance of which is hard to deteriorate by a change of the environment.

On the other hand, in the case where resin materials are used for the lens $L_{23}$, it is possible to form the lens $L_{23}$ on the image side of the lens $L_{22}$ which is a negative meniscus lens constituting the negative cemented lens, by direct forming (Such a lens is called compound lens).

Such a direct forming is performed in such a way that one lens is formed by applying or discharging liquid resin to or on the other lens and hardening the liquid resin, so that the middle part or edge of a cemented lens can be made to have a much thinner thickness in this case than in the case where lenses for a cemented lens are made separately. As a result, a cemented lens which is made by direct forming can have the thickness of almost one lens.

Accordingly, when resin materials are used for the lens $L_{23}$, it is possible to shorten the total length of the optical system in the both states of the optical system retracting and not retracting.

In addition, resin materials also have the advantages of having lighter weights and lower costs than those of glass materials.

Besides, it is preferred that energy curable resins and so on are used as a resin material for direct forming. The use of an energy curable resin makes it possible to easily make a compound lens by merely pressing the resin through a mold to give the mold energy after applying or discharging the resin to or on a lens.

Also, any kinds of energy curable resins, such as thermosetting resin and UV-curable resin, may be used in this case. In particular, it is preferred that UV-curable resins are used for direct forming. The use of an UV-curable resin makes it possible to harden the resin without heating the resin, so that materials having low heat resistance, such as plastic, can be used for a lens which is a substrate. In addition, a lens-forming apparatus can be also downsized.

Also, in each of the above-described embodiments, it is preferred that the lens $L_{41}$, which constitutes the fourth lens group $G_4$ and is a biconvex lens the both surface of which is aspherical, is made of resin material.

In general, the fourth lens group $G_4$ which is the last lens group is often made to function as a lens group for focusing. In this case, the fourth lens group $G_4$ must be moved frequently. And, when such a focusing lens group has a light weight, a motor also can be downsized and also have low power consumption.

Accordingly, it is preferred that the lens $L_{41}$ constituting the fourth lens group $G_4$ is made of resin material which is lighter than glass material.

In addition, the optical systems in the above-described embodiments are formed as a zoom optical system. However, these optical systems may be used as a single-focus optical system.

Also, the zoom optical systems of the present embodiments may be formed as described below.

A flare stop, together with an aperture stop, may be arranged in the zoom optical system of each of the present embodiments in order to cut a harmful light beam which causes ghost, flare, or the like. Besides, a flare stop may be arranged on the object side of the first lens group, between the first and second lens groups, between the second and third lens groups, between the third and fourth lens groups, or between the fourth lens group and the imaging plane. Also, a flare stop may be made with a frame member or another member. In addition, a flare stop may be formed by printing the flare stop directly on an optical member, or a flare stop may be formed with paint or adhesive seal. Also, a flare stop may have any shape, for example, circular shape, elliptic shape, rectangular shape, shape of polygon, or shape surrounded by a function curve. Also, a flare stop may be formed in such a way that the flare stop cuts not only the harmful light beam but also a light beam which causes coma flare in the periphery of a screen.

Also, each of lenses for the zoom optical systems of the present embodiments may be given an antireflection coat to reduce ghost and flare. In this case, it is desired that each lens of the zoom optical system is given multi-coating as antireflection coat in order to reduce ghost and flare more effectively. Also, an infrared cut coat may be given not to a low-pass filter, but to the surfaces of each lens, a cover glass, and so on.

Besides, in a lens which is used as a simple element, an antireflection coat is commonly given to a lens surface which is in contact with air in order to prevent the occurrence of ghost and flare. On the other hand, in a cemented lens, the higher a refractive index of a cement on the cemented surface of a cemented lens is, the more seldom the cemented surface of the cemented lens is particularly given an antireflection coat because the layer which is formed by the cement plays the same role as an antireflection coat having a reflectance which is as high as or lower than that of a single layer coat. However, if the cemented surface of the cemented lens also is positively given an antireflective coat, ghost and flare can be reduced more and a better image can be obtained.

In particular, high refractive index grass materials by which the high effect of correction for aberration is obtained have been popularized in recent years and have come to be often used also in optical systems for cameras. However, when the high refractive index glass material is used for the cemented lens, reflection on the cemented surface also ceases to be negligible. In this case, the application of the antireflection coat to the cemented surface is particularly effective.

Such effective use of the coat of the cemented surface is disclosed in each of Japanese patent Kokai Nos. Hei 2-27301, 2001-324676, 2005-92115 and U.S. Pat. No. 7,116,482. It is only necessary that relatively high refractive index coating substances, such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$, or relatively low refractive index coating substances, such as $MgF_2$, $SiO_2$, and $Al_2O$, are properly selected as a coating material in accordance with the refractive index of a lens as a substrate and the refractive index of the cement and is set to a film thickness so as to satisfy a phase condition.

Also, as a matter of course, the coat of the cemented surface, like the coating on a lens surface which is in contact with air, may be formed as a multi-coat. In this case, a proper combination of coat material and film thickness in a coat having two or more films makes it possible to reduce reflectance more and to control the spectral characteristic and the angular characteristic of the reflectance.

Also, in the zoom optical systems of the present embodiments, it is preferred that focusing is performed by the fourth lens group for the sake of a focus adjustment. However, the focusing may be performed by one of the first, second, and third lens groups or by two or more lens groups. Also, the focusing may be performed by moving the whole of the zoom lens or by moving a part of the lenses in the zoom optical system.

Also, in the zoom optical systems of the present embodiments, the deterioration of brightness in the periphery of an image may be reduced by shifting a microlens of a CCD. For example, a design of the microlens of the CCD may be changed so as to be suited to the angle of incidence of light ray in each image height. In addition, the decreased amount of brightness in the periphery of an image may be corrected by imaging process.

The zoom optical systems according to the present embodiments as described above are available for shooting apparatuses in which an object image which is formed by the zoom optical systems is formed on an image sensor like a CCD to perform shooting, in particular, such as digital camera and video camera. Specific examples of the shooting apparatuses will be illustrated below.

Figure 33:
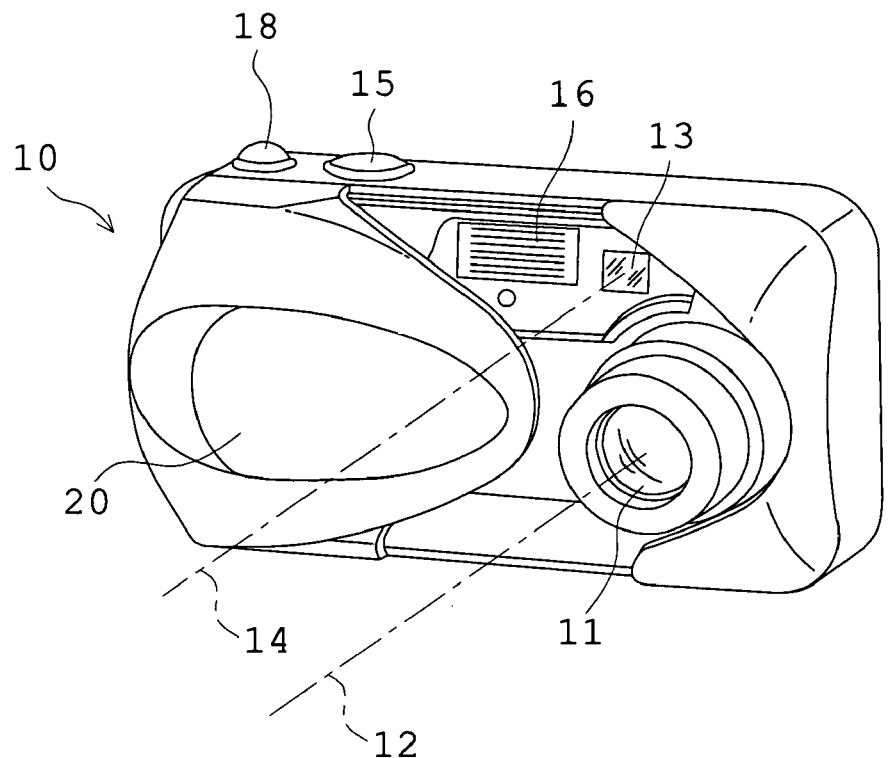
FIG. 33 is a front perspective view showing the external appearance of a digital camera into which a zoom optical system according to the present invention is integrated.
Figure 34:
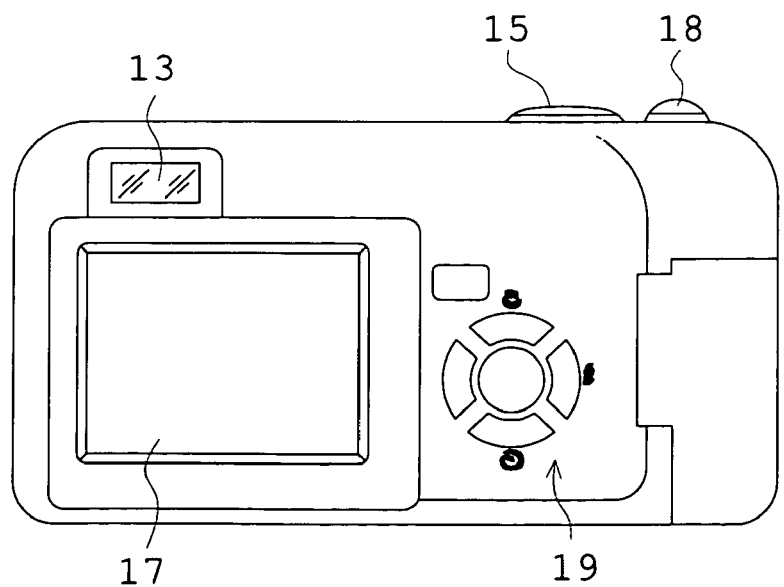
FIG. 34 is a back view showing the digital camera shown in FIG. 33.
Figure 35:
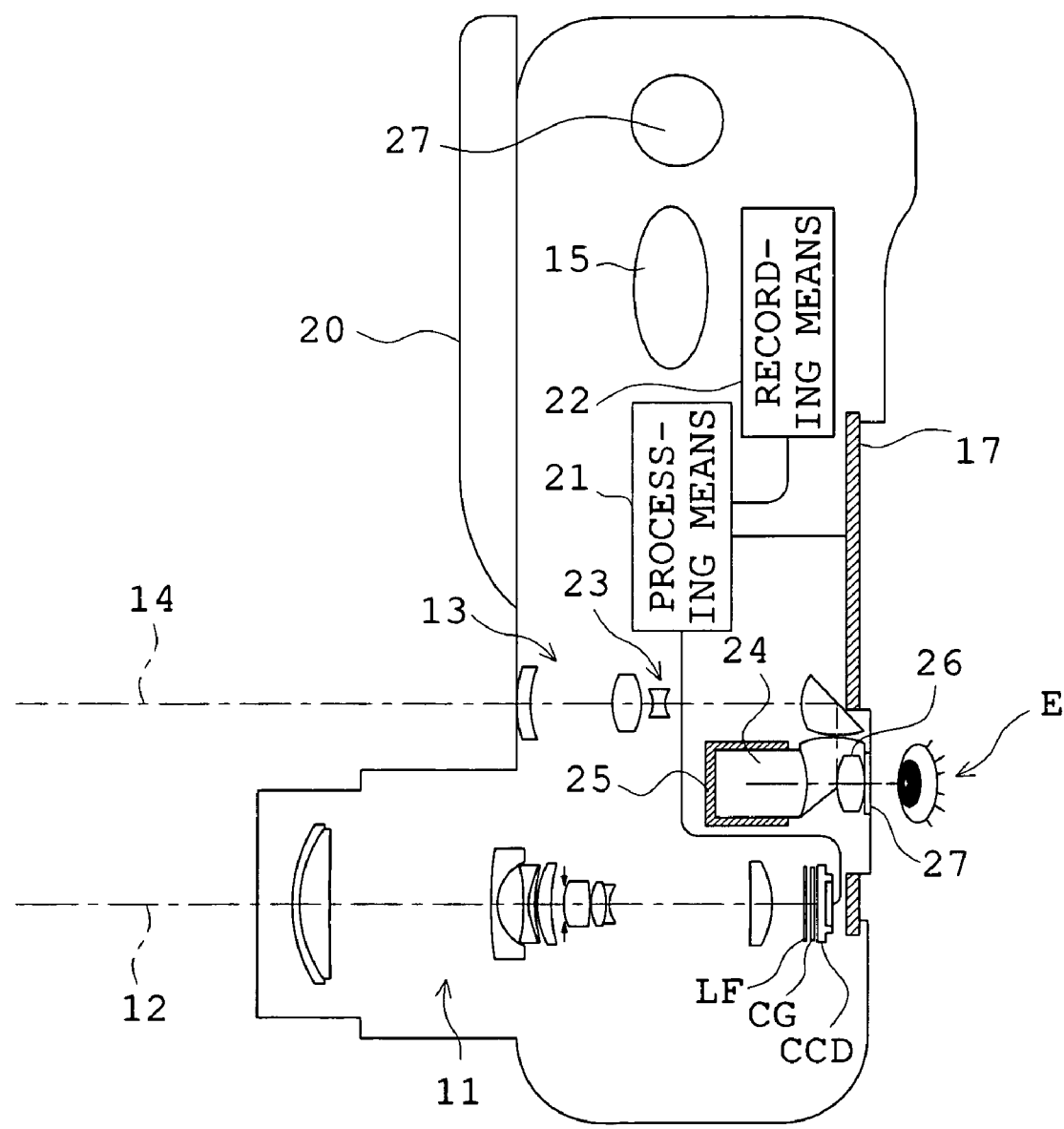
FIG. 35 is a schematic view showing the constitution inside the digital camera shown in FIG. 33.

FIGS. 33, 34, and 35 are schematic views showing the constitution of a digital camera with the zoom optical system of one of the present embodiments. FIG. 33 is a front perspective view showing the external appearance of the digital camera, FIG. 34 is a back view showing the digital camera shown in FIG. 33, FIG. 35 is a perspective plan view schematically showing the constitution of the digital camera shown in FIG. 33. FIGS. 33 and 35 show the state of the zoom lens not retracting.

A digital camera 10 is provided with: a zoom optical system 11 which is arranged on an optical path 12 for shooting; a finder optical system 13 which is arranged on an optical path 14 for finder; a shutter button 15; a flash-light emitting section 16; a liquid crystal display monitor 17; a focal-length changing button 18; a setting-changing switch 19; and so on. In addition, the digital camera 10 is formed in such a way that a cover 20 slides to cover the zoom lens 11 and the finder optical system 13 in the state of the zoom lens 11 retracting.

When the cover 20 is opened and the digital camera 10 is set to a shooting mode, the zoom lens 11 has a state of the zoom lens 11 not retracting, as shown in FIG. 32. When the shutter button 15, which is arranged on the upper portion of the digital camera 10, is pressed in this state, shooting is performed in response to the operation of the press of the shutter button 15, through the zoom lens 11 like the zoom optical system 11 which is described in the embodiment 1 for example. An object image is formed on the imaging plane IM of a solid state image sensor through the zoom optical system 11, the low-pass filter LF, and the cover glass CG. Solid state image sensors for the present invention include CCD and CMOS. However, solid state image sensors are not in particular limited to CCD and CMOS in the present invention. The image information of the object image which is formed on the imaging plane IM of the solid state image sensor is recorded on a recording means 22 through a processing means 21. Also, the recorded image information can be also taken by the processing means 21 to be displayed as an electronic image on the liquid crystal display monitor 17 which is provided on the rear of the digital camera. Besides, the recording means 22 and the processing means 21 may be provided for the digital camera 10 separately from each other, or image information to be recorded may be electronically or magnetically written to a floppy disc, a memory card, MO, or the like. Also, the camera 10 may be formed as a film-based camera which is provided with a silver halide film instead of solid state image sensor.

In addition, a finder objective optical system 23 is arranged on the optical path 14 for finder. The finder objective optical system 23 consists of a plurality of lens groups (three lens groups in FIG. 35) and two prisms, and the focal length of the finder objective optical system 23 changes in response to the operation of the zoom optical system 11. The finder objective optical system 23 forms an object image on a bright frame 25 for an image erecting prism 24 that is an image-erecting member. And, an eyepiece optical system 26 which leads an erect image to an eyeball E of an observer is arranged at the rear of the image electing prism 24. Besides, a cover member 27 is arranged on the exit side of the eyepiece optical system 26.

In the digital camera 10 having such a constitution, because the zoom optical system 11 has a high variable magnification ratio and a small size and can be contained by the digital camera by retracting the zoom optical system 11, it is possible to secure good performance and to achieve the downsizing of the digital camera 10.

What is claimed is:

1. A zoom optical system constituted by a plurality of lens groups and in which magnification is changed by properly changing distances between the lens groups, wherein
a positive first lens group, a negative second lens group, a positive third lens group, and a positive fourth lens group are arranged in that order from the object side,
the first lens group consists of only one lens element,
the second lens group includes, in order from the object side, a negative single lens, a negative cemented lens, and a positive single lens, and
the following condition (1) is satisfied:

$$0.2 \leq \Delta D_{w\text{-}w10}/L_t \leq 0.35 \quad (1)$$

where $\Delta D_{w\text{-}w10}$ denotes the variation in the distance between the first and second lens groups in changing from the wide angle end position to the position in which the focal length is ten times or more as large as that in the wide angle end position, and $L_t$ denotes the total length of the optical system in the telephoto end position.

2. A zoom optical system constituted by a plurality of lens groups and in which magnification is changed by properly changing distances between the lens groups, wherein
a positive first lens group, a negative second lens group, a positive third lens group, and a positive fourth lens group are arranged in that order from the object side,
the most object-side surface of the first lens group has a convex shape which faces toward the object side, and
the following condition (2) is satisfied:

$$SF_{G4}=(r_{G4o}+r_{G4i})/(r_{G4o}-r_{G4i})>0 \quad (2)$$

where $SF_{G4}$ denotes the shape factor of the fourth lens group, $r_{G4o}$ denotes the radius of curvature of the most object-side surface of the fourth lens group, and $r_{G4i}$ denotes the radius of curvature of the most image-side surface of the fourth lens group.

3. A zoom optical system according to claim 2, wherein the following condition (3) is satisfied:

$$0.2 \leq SF_{G4} \leq 5.0 \quad (3).$$

4. A zoom optical system according to claim 1, wherein the third lens group comprises, in order from the object side, a positive single lens and a cemented lens that consists of a positive lens and a negative lens.

5. A zoom optical system according to claim 2, wherein the first lens group consists of only one lens element.

6. A zoom optical system according to claim 2, wherein the following conditions (4) and (5) are satisfied:

$$SF_{G1o-G4i}=(r_{G1o}+r_{G4i})/(r_{G1o}-r_{G4i}) \quad (4)$$

$$0 \leq SF_{G1o-G4i} \leq 0.4 \quad (5)$$

where $SF_{G1o-G4i}$ denotes the shape factor for the most object-side surface of the first lens group and the most image-side surface of the fourth lens group, $r_{G1o}$ denotes the radius of curvature of the most object-side surface of the first lens group, and $r_{G4i}$ denotes the radius of curvature of the most image-side surface of the fourth lens group.

7. A zoom optical system according to claim 2, wherein the second lens group comprises, in order from the object side, a negative single lens, a negative cemented lens, and a positive single lens.

8. A zoom optical system according to claim 1, wherein the cemented lens of the second lens group consists of a negative lens and a positive lens, and the following condition (6) is satisfied:

$$0.1 \leq \phi_{G2n2}/\phi_{G2n1} \leq 1.0 \quad (6)$$

where $\phi_{G2n2}$ denotes the refractive power of the negative lens of the cemented lens in the second lens group, and $\phi_{G2n1}$ denotes the refractive power of the negative single lens in the second lens group.

9. A zoom optical system according to claim 1, wherein the following condition (7) is satisfied:

$$0.15 \leq |\phi_{G2p2}/\phi_{G2n1}| \leq 0.45 \quad (7)$$

where $\phi_{G2p2}$ denotes the refractive power of the positive single lens in the second lens group, and $\phi_{G2n1}$ denotes the refractive power of the negative single lens in the second lens group.

10. A zoom optical system according to claim 1, wherein the cemented lens of the second lens group consists of a negative lens and a positive lens, and the following condition (8) is satisfied:

$$0.05 \leq nd_{G2n2}-nd_{G2p1} \leq 0.2 \quad (8)$$

where $nd_{G2n2}$ denotes the refractive index of the negative lens of the cemented lens in the second lens group at d line, and $nd_{G2p1}$ denotes the refractive index of the positive lens of the cemented lens in the second lens group at d line.

11. A zoom optical system according to claim 1, wherein the cemented lens of the second lens group consists of a negative lens and a positive lens, and the following condition (9) is satisfied:

$$20 \leq vd_{G2n2}-vd_{G2p1} \leq 50 \quad (9)$$

where $vd_{G2n2}$ denotes the Abbe's number of the negative lens of the cemented lens in the second lens group at d line, and $vd_{G2p1}$ denotes the Abbe's number of the positive lens of the cemented lens in the second lens group at d line.

12. A zoom optical system according to claim 1, wherein when $f_w$ denotes the focal length of the whole of the optical system in the wide angle end position, $f_t$ denotes the focal length of the whole of the optical system in the telephoto end position, and $\sqrt{(f_w \times f_t)}$ denotes the focal length of the whole of the optical system in the middle position, the position of the second lens group in the middle position is nearer to the object side than the positions of the second lens group in the wide angle end position and the telephoto end position.

13. A zoom optical system according to claim 12, wherein the following condition (10) is satisfied:

$$-7.0 \leq \Delta V_{G2w-m}/\Delta V_{G2m-t} \leq -1.2 \quad (10)$$

where $\Delta V_{G2w-m}=|V_{G2m}-V_{G2w}|$ and $\Delta V_{G2m-t}=|V_{G2t}-V_{G2m}|$, $V_{G2w}$ denotes the position of the second lens group in the wide angle end position, $V_{G2m}$ denotes the position of the second lens group in the middle position, $V_{G2t}$ denotes the position of the second lens group in the telephoto end position, and the signs of $\Delta V_{G2w-m}$ and $\Delta V_{G2m-t}$ are regarded as positive when the second lens group moves from the image side to the object side.

14. A zoom optical system according claim 1, wherein the position of the second lens group in the telephoto end position is nearer to the object side than that of the second lens group in the wide angle end position.

15. A zoom optical system according to claim 1, wherein the cemented surface of the cemented lens in the second lens group is aspherical.

16. A zoom optical system according to claim 1, wherein all the surfaces of the cemented lens in the second lens group are aspherical.

17. A zoom optical system according to claim 16, wherein when the direction from the object side to the image side on the optical axis is regarded as a positive direction, the aspherical quantities in the effective radiuses of all the surfaces of the cemented lens in the second lens group have negative values.

18. A zoom optical system according to claim 16, wherein the following condition (11) is satisfied:

$$10 \leq (ASP_{22c} \times |\Delta vd_{22}|)/(ASP_{22o}+ASP_{22i}) \leq 90 \quad (11)$$

where $ASP_{22c}$ denotes the aspherical quantity in the effective radius of the cemented surface of the cemented lens in the second lens group, $\Delta vd_{22}$ denotes the difference between the Abbe's numbers of the two lenses which form the cemented lens of the second lens group, $ASP_{22o}$ denotes the aspherical quantity in the effective radius of the object-side surface of the cemented lens in the second lens group, and $ASP_{22i}$ denotes the aspherical quantity in the effective radius of the image-side surface of the cemented lens in the second lens group, wherein the effective radius is the smallest of the effective radiuses of the surfaces of the cemented lens in the second lens group.

19. A zoom optical system according to claim 2, wherein the fourth lens group consists of only one lens element.

20. A zoom optical system according to claim 19, wherein the fourth lens group consists of only one positive single lens.

21. A zoom optical system according to claim 1, wherein the following condition (12) is satisfied:

$$0 \leq |\Delta V_{G4w-t}/f_w| \leq 0.1 \quad (12)$$

where $\Delta V_{G4w-t}=|V_{G4t}-V_{G4w}|$, $V_{G4w}$ denotes the position of the fourth lens group in the wide angle end position, $V_{G4t}$ denotes the position of the fourth lens group in the telephoto end position, $f_w$ denotes the focal length of the whole of the optical system in the wide angle end position, and the sign of $\Delta V_{G4w-t}$ is regarded as positive when the fourth lens group moves from the image side to the object side.

22. A zoom optical system according to claim 1, wherein the fourth lens group does not move in changing a magnification from the wide angle end position to the telephoto end position.

23. An electronic pickup apparatus comprising a zoom optical system according to claim 1.

* * * * *